US012173849B2

(12) United States Patent
Moffat et al.

(10) Patent No.: US 12,173,849 B2
(45) Date of Patent: Dec. 24, 2024

(54) SUBMERGED GAS CONVEYANCE OF CONSTANT PRESSURE AND BUOYANCY

(71) Applicant: LONE GULL HOLDINGS, LTD., Portland, OR (US)

(72) Inventors: Brian Lee Moffat, Portland, OR (US); Garth Alexander Sheldon-Coulson, Portland, OR (US)

(73) Assignee: LONE GULL HOLDINGS, LTD., Portland, OR (US)

(*) Notice: Subject to any disclaimer, the term of this patent is extended or adjusted under 35 U.S.C. 154(b) by 0 days.

(21) Appl. No.: 18/395,413

(22) Filed: Dec. 22, 2023

(65) Prior Publication Data

US 2024/0218981 A1 Jul. 4, 2024

Related U.S. Application Data

(60) Provisional application No. 63/436,474, filed on Dec. 30, 2022.

(51) Int. Cl.
*F17C 1/00* (2006.01)
*B63B 1/24* (2020.01)
(Continued)

(52) U.S. Cl.
CPC .............. *F17C 13/04* (2013.01); *B63B 1/246* (2013.01); *F17C 1/007* (2013.01); *F17C 5/06* (2013.01);
(Continued)

(58) Field of Classification Search
CPC .. F17C 13/04; F17C 1/007; F17C 5/06; F17C 13/082; F17C 2201/0104;
(Continued)

(56) References Cited

U.S. PATENT DOCUMENTS

| | | | | |
|---|---|---|---|---|
| 3,085,533 A * | 4/1963 | Goryl | B63G 8/42 | 114/244 |
| 7,726,911 B1 * | 6/2010 | Dempster | B63B 35/44 | 114/256 |

(Continued)

*Primary Examiner* — Frederick C Nicolas
(74) *Attorney, Agent, or Firm* — Fulwider Patton LLP

(57) ABSTRACT

Disclosed is an apparatus, system, and method, by which a gaseous chemical, e.g., hydrogen gas, can be retrieved by, stored within, and transported by, a low-cost autonomous vessel. The vessel is deployed, and operates, within a body of water. A submerged portion of the vessel is subjected to an ambient hydrostatic pressure that is used to compress the stored gases. A spar buoy that floats adjacent to a surface of the body of water regulates and stabilizes a depth of the submerged portion. A single pressure-tolerant chamber within the submerged portion is used to acquire gas from a gas provider and to equilibrate the pressure of the gas so acquired. The pressure-equilibrated and/or pressure-balanced gas is then drawn into a first gas storage tank through a venting of an approximately equal volume of another gas, e.g., air, from a second gas storage tank, resulting in a gas transfer at an approximately constant pressure. The processing and storage of acquired gases at pressures approximately equal to the ambient hydrostatic pressures permits the use of thin-walled tanks, and makes possible a low-cost gas acquisition, storage, and transportation, vessel.

21 Claims, 31 Drawing Sheets

(51) Int. Cl.

| | |
|---|---|
| ***B63B 22/22*** | (2006.01) |
| ***F17C 5/06*** | (2006.01) |
| ***F17C 13/04*** | (2006.01) |
| ***F17C 13/08*** | (2006.01) |
| *B63G 8/00* | (2006.01) |

(52) U.S. Cl.
CPC ............ *F17C 13/082* (2013.01); *B63B 22/22* (2013.01); *B63G 2008/002* (2013.01); *F17C 2201/0104* (2013.01); *F17C 2227/0192* (2013.01); *F17C 2265/07* (2013.01); *F17C 2270/0102* (2013.01)

(58) Field of Classification Search
CPC .......... F17C 2227/0192; F17C 2265/07; F17C 2270/0102; B63B 1/246; B63B 22/22; B63G 2008/002
See application file for complete search history.

(56) References Cited

U.S. PATENT DOCUMENTS

| | | | | |
|---|---|---|---|---|
| 9,045,209 | B2 * | 6/2015 | Zeren | F04F 5/00 |
| 9,151,448 | B2 * | 10/2015 | Cohen | F17C 5/06 |
| 11,391,261 | B2 * | 7/2022 | Sheldon-Coulson | F03D 9/19 |
| 11,505,297 | B2 * | 11/2022 | Chelaru | B63G 8/001 |

* cited by examiner

SUBMERGED GAS CONVEYANCE OF CONSTANT PRESSURE AND BUOYANCY

CROSS-REFERENCES TO RELATED APPLICATIONS

This application claims priority to U.S. Ser. No. 63/436,474, filed Dec. 30, 2022, the content of which is incorporated by reference herein in its entirety.

BACKGROUND

Disclosed herein is a low-cost apparatus, system, and method for the storage and transportation of compressed gases, especially of compressed hydrogen gases.

The storage and transportation of compressed gases, especially of compressed hydrogen gases, has been expensive in large part due to the relatively thick-walled containment and storage containers required. However, when a compressed gas storage container is submerged at a depth where the outside, surrounding, and/or ambient, hydraulic and/or head pressure is equal to the pressure of the compressed gas within the gas storage container, then the wall of the storage container may be made relatively thin-walled, and thereby be of significantly lower cost.

Some past attempts to store compressed hydrogen gases within submerged storage containers appear to have been motivated by a desire to preclude any accidental ignition and/or explosion of those gases at surface and/or terrestrial locations which might result in a loss of life. These past attempts at submerged storage did not benefit from a significant reduction in the cost of the storage containers for at least one of two reasons.

Some past attempts to store and transport compressed hydrogen gas in a submerged apparatus were unable to benefit from the cost savings derived from the use of thin-walled storage containers because those storage tanks were sealed, e.g., containing only hydrogen gases. Because their storage containers were sealed, storing only hydrogen gas, the significant fluctuations in the pressures of those gases, e.g. during additions of gases to, and removals of gases from, those sealed storage containers, precluded the use of thin-walled containers (which might have imploded during reduced gas pressures associated with removals of gases, and which might have ruptured during increased gas pressures associated with additions of gases) and therefore required the use of relatively expensive thick-walled containers. So, while these hydrogen-gas storage and transport systems were able to maintain stable, if not constant, buoyancies, which would facilitate their control when submerged within a body of water, these systems were expensive due to the high costs of their thick-walled storage containers.

Some past attempts to store and transport compressed hydrogen gas in a submerged apparatus were able to utilize thin-walled, and relatively inexpensive, gas storage containers because their storage containers were not-sealed, and were, by contrast, fluidly connected to the outside, surrounding, and/or ambient waters in which the submerged hydrogen-gas storage and transport systems, and the containers thereof, were comprised. Because their storage containers were fluidly connected to the ambient waters in which the containers were submerged, the pressures of the gases within the containers remained equal to the pressures of the waters outside the containers, when the pressures became imbalanced, water would flow into, or out of, the container thereby restoring and/or equilibrating the inner and outer pressures.

The addition of hydrogen gases to those storage containers caused water within the containers to flow out of the containers, thereby eliminating any significant increase in the pressure of the gases within the containers. And, the removal of hydrogen gases from those storage containers caused water outside the containers to flow into the containers, thereby eliminating any significant decrease in the pressure of the gases within the containers.

Because their storage containers were fluidly connected to the ambient waters in which the containers were submerged, their container walls were thin and relatively inexpensive. However, the addition of hydrogen gases to those storage containers, and the removal of hydrogen gases from those storage containers, tended to significantly alter the buoyancies of those storage containers, and thereby the buoyancies of their respective hydrogen-gas storage and transport systems. Thus, past hydrogen-gas storage and transport systems which utilized gas storage containers fluidly connected to the waters outside the systems were either rendered expensive due to their need for expensive buoyancy regulation and/or compensation systems, or they were rendered immobile by their need to avoid buoyancy compensation through their operation at constantly positive buoyancies in conjunction with firm and immovable linkages to anchors in the earth beneath the body of water within which those systems were submerged.

There exists an unmet need for a low-cost hydrogen gas storage and transportation system which the present disclosure satisfies.

SUMMARY OF THE INVENTION

Disclosed is a novel low-cost hydrogen gas storage and transportation apparatus, system, and methodology, which achieves a low cost by preserving a balanced and steady, if not constant, pressure of the gases stored therein, while doing so within sealed storage containers which maintain balanced and steady, if not constant, buoyancies, thereby permitting movement, mobility, and transportation of hydrogen gases in the absence of expensive buoyancy compensation systems. The hydrogen gas storage and transportation apparatus, system, and methodology, disclosed herein, satisfies the heretofore unmet and/or unrealized need of a low capital cost, which thereby permits a low-cost storage and transportation of compressed hydrogen gases.

Embodiments of the present disclosure may vary with respect to the application, mechanism, machine, process, device, and/or purpose, to which the mechanical energy, or the heat pumping, they produce is applied.

DETAILED DESCRIPTIONS OF THE EMBODIMENTS

For a fuller understanding of the nature and objects of the invention, reference should be made to the preceding Summary of the Invention, taken in connection with the accompanying drawings. The following figures offer explanatory illustrations. The following figures, and the illustrations offered therein, in no way constitute limitations, either explicit or implicit, of the present invention and/or of the present disclosure.

Figure 1:
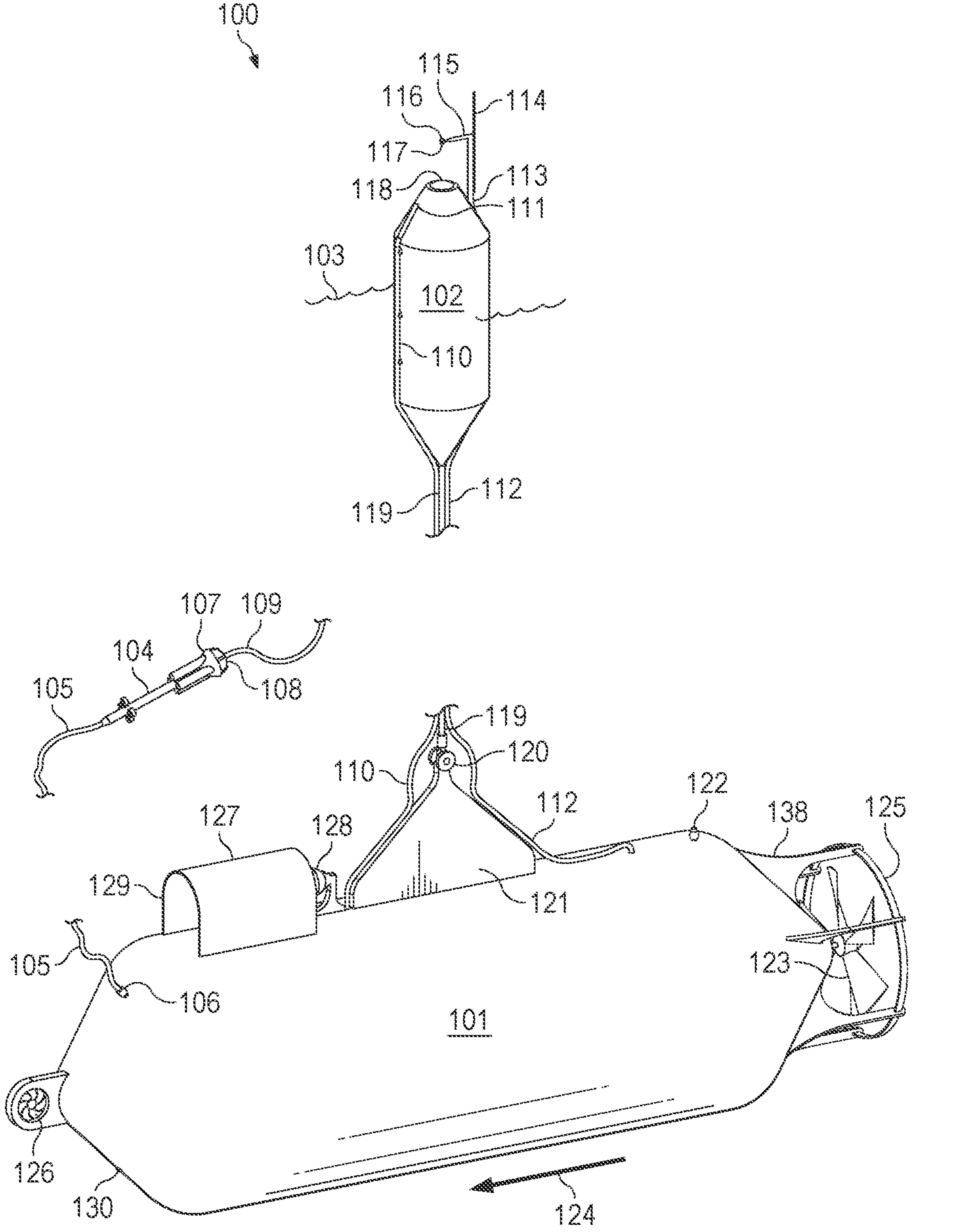
FIG. 1 is a perspective side view of an embodiment of the present invention.

FIG. 1 shows a side perspective view of a first embodiment 100 of the present invention. A submerged self-propelled hydrogen storage vessel 101 is flexibly attached, connected, and/or tethered, to an elongate and/or tubular buoyant canister and/or buoy 102, e.g., a spar buoy, that tends to float adjacent to an upper surface 103 of the body of water within which the storage vessel 101 is submerged.

In an embodiment, a remotely-operated vehicle (ROV) 104 is fluidly connected to a hydrogen gas storage apparatus (not visible) within the storage vessel 101 by a flexible gas transmission hose 105. In an embodiment, the flexible gas transmission hose is connected to the storage vessel by a gas transmission hose connector 106.

In an embodiment, a “bobble” receiving port 107 at a distal end of the ROV 104 is configured, shaped, and/or adapted, to receive and hold a bobble gas exchange connector 108.

In an embodiment, a “bobble” gas exchange connector 108 is a valved fluid connection port that is embedded within a bulbous housing, wherein the bulbous housing is designed, adapted, and configured to mate with, and to facilitate the mating of the bulbous housing with, a complementary “bobble” receiving port 107. The “bobble” receiving port has a concavity, inclusion, and/or hole, that is complementary to the convex and bulbous “bobble” gas exchange connector.

In an embodiment, the bobble gas exchange connector is fluidly connected to a gas exchange hose 109. In an embodiment, the gas exchange hose is connected to a separate hydrogen production, hydrogen storage and/or hydrogen consumption, vessel, apparatus, mechanism, and/or system, including, but not limited to, one of a hydrogen production device (not visible), a hydrogen receiving vessel (not visible), and a terrestrial hydrogen storage facility (not visible).

The spar buoy 102 receives pressurized air from a hydrogen gas storage apparatus (not visible) within the storage vessel 101 through a pressurized air ventilation pipe 110. A portion of the pressurized air received by the spar buoy through the pressurized air ventilation pipe may be released into the atmosphere through a pressurized air exhaust port 111 in an upper end of that pressurized air ventilation pipe.

The spar buoy 102 also receives pressurized hydrogen gas from the hydrogen gas storage apparatus (not visible) within the storage vessel 101 through a pressurized hydrogen supply pipe 112.

In an embodiment, a vertical strut 113 is attached to an upper portion of the spar buoy 102 and projects upward to a position above an upper end of the spar buoy. In an embodiment, attached to a side of the vertical strut is a radio antenna 114. Attached above and below a lateral extension 115 of the vertical strut are upper 116 and lower 117 hemispherical cameras which, respectively, provide the control system (not visible) streaming images of the sky above the spar buoy 102 and the water surfaces around the spar buoy (e.g., out to the horizon and including images of ships and obstacles moving thereon).

In an embodiment, attached to, and/or positioned at, at upper end of the spar buoy 102 is a satellite communications antenna 118.

The spar buoy 102 may be flexibly connected to the hydrogen storage vessel 101 below by a spar buoy connection cable 119, chain, wire, linkage, rope, and/or other type of elongate connector. The buoyancy of the spar buoy typically supports a fraction of the weight of the hydrogen storage vessel 101, e.g., it typically supports between 5 and 95% of the weight of the hydrogen storage vessel, although the scope of the present disclosure is not limited to any particular or specific spar-buoy buoyancy. The tension created within the spar buoy connection cable 119 by the spar-buoy's buoyancy pulling upward, and the weight of the storage vessel pulling downward, tends to stabilize the depth of the hydrogen storage vessel, thereby tending to also stabilize the ambient pressure of the water outside the hydrogen storage vessel. Because the spar buoy has a relatively small cross-sectional area at the water line 103 of the spar buoy, transient changes in the position of that waterline, and/or transient changes in the draft of the spar buoy, do not tend to produce significant alterations in the magnitude of the upward tension within the spar buoy connection cable, and likewise do not tend to significantly alter the depth of the hydrogen storage vessel.

In an embodiment, the spar buoy connection cable 119 connects to the hydrogen storage vessel 101 at a connection cable swivel 120 that is incorporated and/or embedded within, and/or attached to, an upper part, portion, and/or position, on a rigid, and approximately triangular, connection cable projection 121. The connection cable projection may be a planar structural extension of the hull of the hydrogen storage vessel.

A vessel vent 122, when opened, fluidly connects an interior of the hydrogen storage vessel 101 to the body of water 103 in which the hydrogen storage vessel is submerged, thereby releasing any gases trapped within the interior of that storage vessel.

In an embodiment, a primary propeller 123 positioned at a lateral end of the hydrogen storage vessel 101, when rotated by an electric motor (not visible), provides a "forward" thrust to the hydrogen storage vessel thereby tending to push the vessel in a direction 124 laterally and/or longitudinally away from the primary propeller's location. A circumferential and/or cylindrical cage 125 mounted on a plurality of longitudinal struts, e.g., 138, provides a barrier capable of shedding potentially entangling debris (e.g., ropes and fishing nets) that might otherwise ensnare and/or entangle the primary propeller.

A yaw propeller 126 positioned at a "front" lateral end (i.e., an end toward which the hydrogen storage vessel 101 tends to be pushed by its primary propeller) alters the orientation of the hydrogen storage vessel in a clockwise direction (relative to a top-down perspective as might be seen from the vantage point of the spar buoy 102) when the yaw propeller is rotated in a first direction, and alters the orientation of the hydrogen storage vessel in a counterclockwise direction (relative to a top-down perspective as might be seen from the vantage point of the spar buoy 102) when the yaw propeller is rotated in a second direction (opposite the first direction).

An ROV awning 127, canopy, and/or shelter, provides a protected space within which the ROV may be stationed, positioned, and/or secured, when not actively connecting to and/or with the bobble gas exchange connector 108 of a hydrogen gas recipient or provider. The ROV tends to be secured within the ROV awning 127 when the embodiment 100 changes its geospatial location through a rotation of the primary propeller 123 and the production of a forward thrust. An ROV anchor bobble 128 provides an attachment point configured to mate with, and be attached to, the "bobble" receiving port 107 of the embodiment's ROV 104. Thus, when the ROV is to be secured, e.g., prior to a translation of the embodiment to a new geospatial location, the ROV propels itself into the forward aperture 129, gateway, entrance, and/or mouth of the ROV awning, and therethrough to the ROV anchor bobble to which it attaches as though the ROV anchor bobble were a functional hydrogen-gas-conducting bobble gas exchange connector 108 connected to a hydrogen gas recipient or provider.

A first water exchange port 130 at a forward position on the hull of the hydrogen storage vessel 101 and adjacent to, and below, the yaw propeller 126, permits water to be exchanged between the hydrogen gas storage apparatus (not visible) inside the hydrogen storage vessel and the body of water 103 in which the hydrogen storage vessel is submerged.

Embodiments 100 of the present invention include, but are not limited to, those which incorporate, comprise, and/or utilize buoys 102 that are in part cylindrical, tubular, conical, frustoconical, ellipsoidal, spherical, and/or cuboidal. Embodiments 100 of the present invention include, but are not limited to, those which incorporate, comprise, and/or utilize buoys 102 that are fabricated of materials, including, but not limited to: metal, steel, Aluminum, plastic, carbon fiber, fiberglass, acrylic, PVC, and ABS. Embodiments 100 of the present invention include, but are not limited to, those which incorporate, comprise, and/or utilize buoys 102 that are of approximately constant horizontal and/or transverse cross-sectional area, and those that are of an inconstant and/or variable horizontal and/or transverse cross-sectional area. Embodiments 100 of the present invention include, but are not limited to, those which incorporate, comprise, and/or utilize buoys 102 that have vertical and/or longitudinal lengths that, with respect to the horizontal and/or longitudinal lengths of their respective storage vessels 101, are 25%, 50%, 100%, 150%, and 200% as long. Embodiments 100 of the present invention include, but are not limited to, those which incorporate, comprise, and/or utilize buoys 102 that volumes that, with respect to the volumes of their respective storage vessels 101, are 5%, 10%, 25%, 50%, and 100% as voluminous.

Embodiments 100 of the present invention include, but are not limited to, those which incorporate, comprise, and/or utilize storage vessels 101 that are in part cylindrical, tubular, conical, frustoconical, ellipsoidal, spherical, and/or cuboidal. Embodiments 100 of the present invention include, but are not limited to, those which incorporate, comprise, and/or utilize storage vessels 101 that are fabricated of materials, including, but not limited to: metal, steel, Aluminum, plastic, carbon fiber, fiberglass, acrylic, PVC, and ABS. Embodiments 100 of the present invention include, but are not limited to, those which incorporate, comprise, and/or utilize storage vessels 101 that are of approximately constant vertical and/or transverse cross-sectional area, and those that are of an inconstant and/or variable vertical and/or transverse cross-sectional area.

Embodiments 100 of the present invention include, but are not limited to, those which incorporate, comprise, and/or utilize buoys 102 separated from their respective storage vessels 101, by distances equal to 1, 2, 4, 8, 20, 50, 100, 200, 500, and 1,000 the lengths of those respective storage vessels. Embodiments 100 of the present invention include, but are not limited to, those which incorporate, comprise, and/or utilize buoys 102 connected to their respective storage vessels 101, by respective buoy connection cables 119 that are elastic, inelastic, flexible, inflexible, and rigid. Embodiments 100 of the present invention include, but are not limited to, those which incorporate, comprise, and/or utilize buoys 102 connected to their respective storage vessels 101, by respective buoy connection cables 119 that are comprised, at least in part, of fibers, linkages, chains, ropes, synthetic materials, and/or natural materials.

Figure 2:
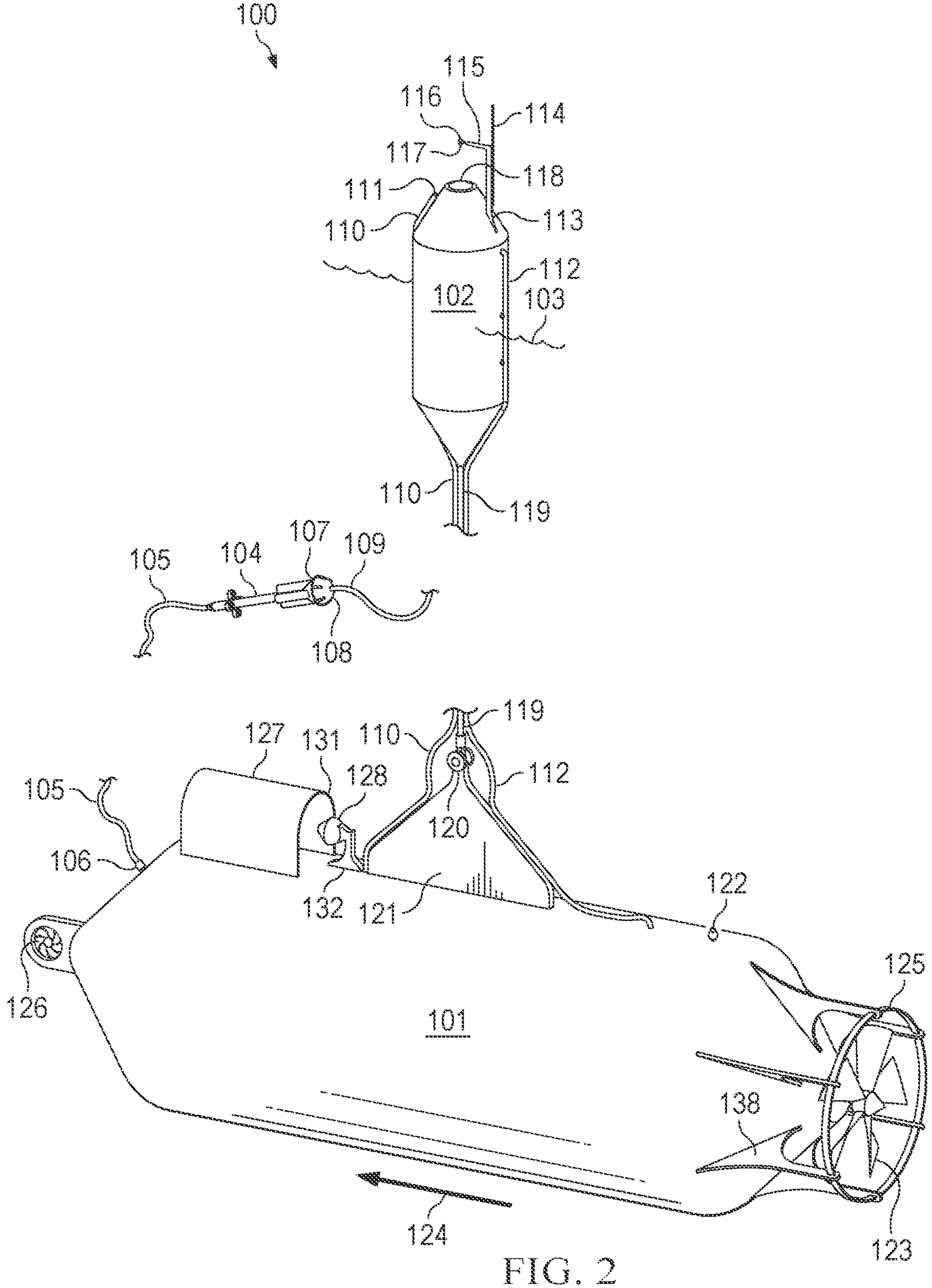
FIG. 2 is a perspective side view of the embodiment of FIG. 1.

FIG. 2 shows a side perspective view of the same first embodiment 100 of the present invention that is illustrated in FIG. 1.

Visible through the rear mouth 131 and/or aperture of the ROV awning is the ROV anchor bobble 128 to which the ROV 104 may secure itself when not engaged in the offloading or uploading of hydrogen gas via the bobble gas exchange connector 108 of another vessel or shore facility. In an embodiment, the ROV anchor bobble is positioned at a centermost radial position of the approximately cylindrical tubular ROV awning 127 enclosure and may be fixedly attached to an anchor bobble strut 132.

Figure 3:
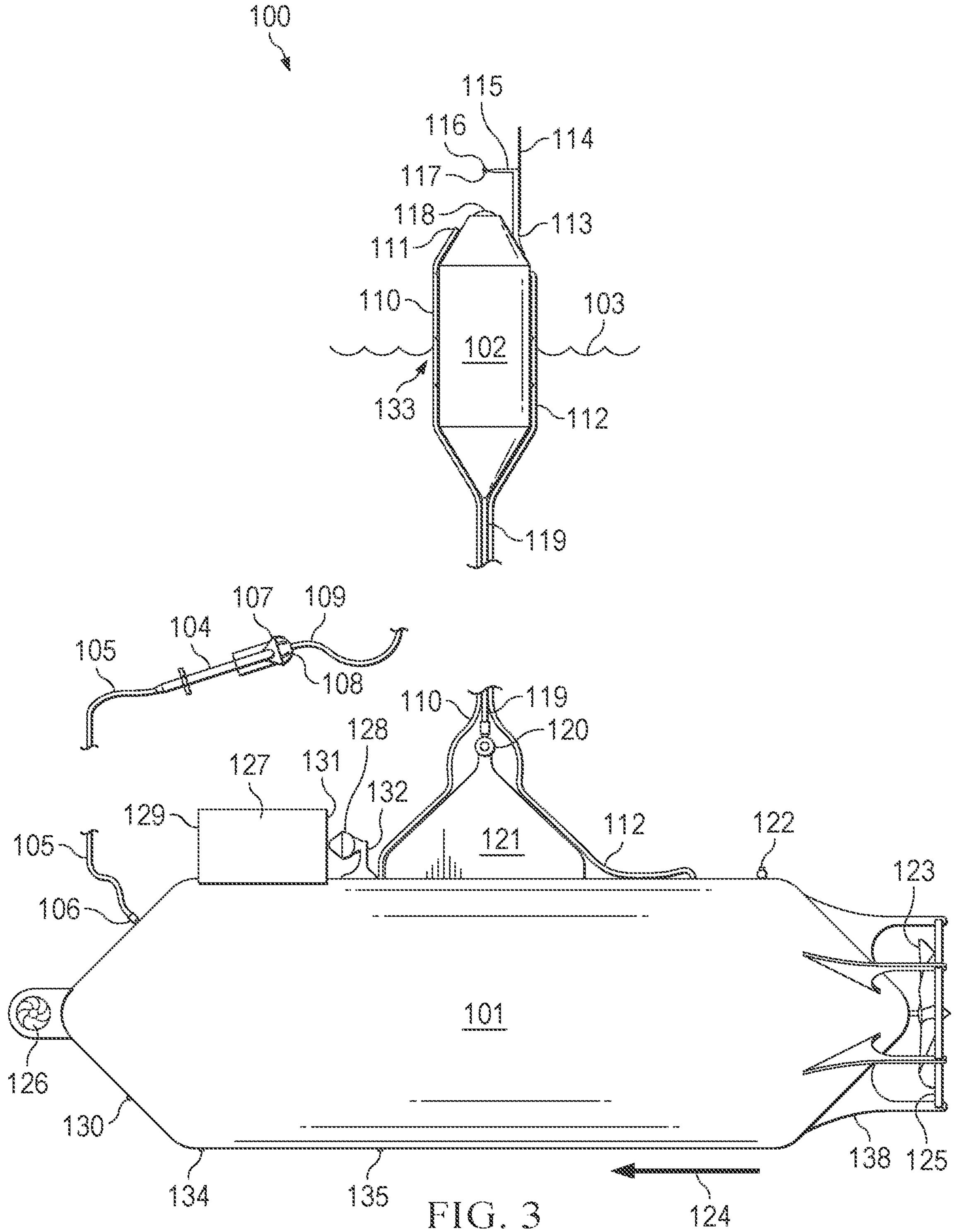
FIG. 3 is a side view of the embodiment of FIG. 1.

FIG. 3 shows a side view of the same first embodiment 100 of the present invention that is illustrated in FIGS. 1 and 2.

In an embodiment, the spar buoy 102 has a relatively small cross-sectional area at its waterline 133, and the buoyancy of the spar buoy typically, although not exclusively, supports a relatively small fraction of the total specific weight of the embodiment 100, therefore transient changes in the position of that waterline, and/or transient changes in the draft of the spar buoy, do not tend to produce significant alterations in the magnitude of the upward, i.e., buoyant, tension within the spar buoy connection cable 119, and likewise do not tend to significantly alter the depth of the hydrogen storage vessel 101. The spar buoy 102 helps to stabilize the ambient hydrostatic pressure surrounding the hydrogen storage vessel 101 by stabilizing the depth of the hydrogen storage vessel, and a stable outer hydrostatic pressure minimizes differences between the pressures of gases stored within the hydrogen storage vessel and the hydrostatic pressures outside the hydrogen storage vessel.

First 130, second 134, and third 135, water exchange ports positioned along a lower portion of the hull of the hydrogen storage vessel 101 permit water to be exchanged between the hydrogen gas storage apparatus (not visible) inside the hydrogen storage vessel and the body of water 103 in which the hydrogen storage vessel is submerged.

Figure 4:
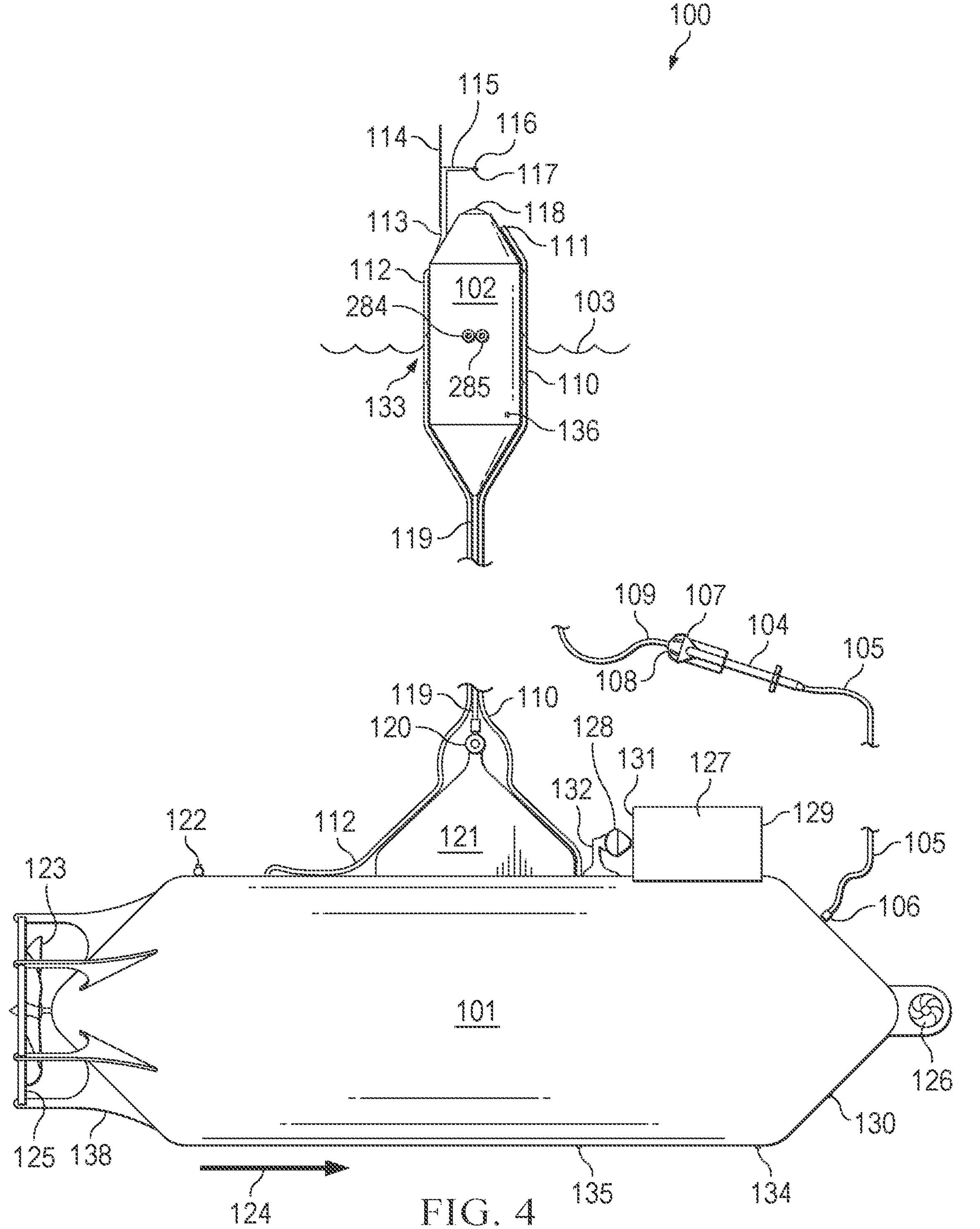
FIG. 4 is a side view of the embodiment of FIG. 1.

FIG. 4 shows a side view of the same first embodiment 100 of the present invention that is illustrated in FIGS. 1-3.

The third water exchange port 135 positioned at a lower portion of the hull of the spar buoy 102 permits water to be exchanged between the an interior of the spar buoy (not visible) and the body of water 103 on which the spar buoy floats.

In an embodiment, a water discharge port 136 of the spar buoy 102 permits water ballast (not visible) from within the spar buoy to be discharged into the body of water 103 on which the spar buoy floats.

In an embodiment, a hydrogen-gas discharge hose connector 284 may permit a fluid connection to be established between the embodiment's hydrogen gas storage apparatus (not visible) and an external consumer of hydrogen gas, e.g., another vessel, a land-based electrical utility, and/or a chemical fuel production facility.

In an embodiment, a pressurized-air receiving hose connector 285 permits a fluid connection to be established between the embodiment's hydrogen gas storage apparatus (not visible) and an external source of pressurized air or oxygen. When discharging the embodiment's stored hydrogen gas, the hydrogen gas may be replaced with another gas of equal pressurization, such as a pressurized air or oxygen gas.

Figure 5:
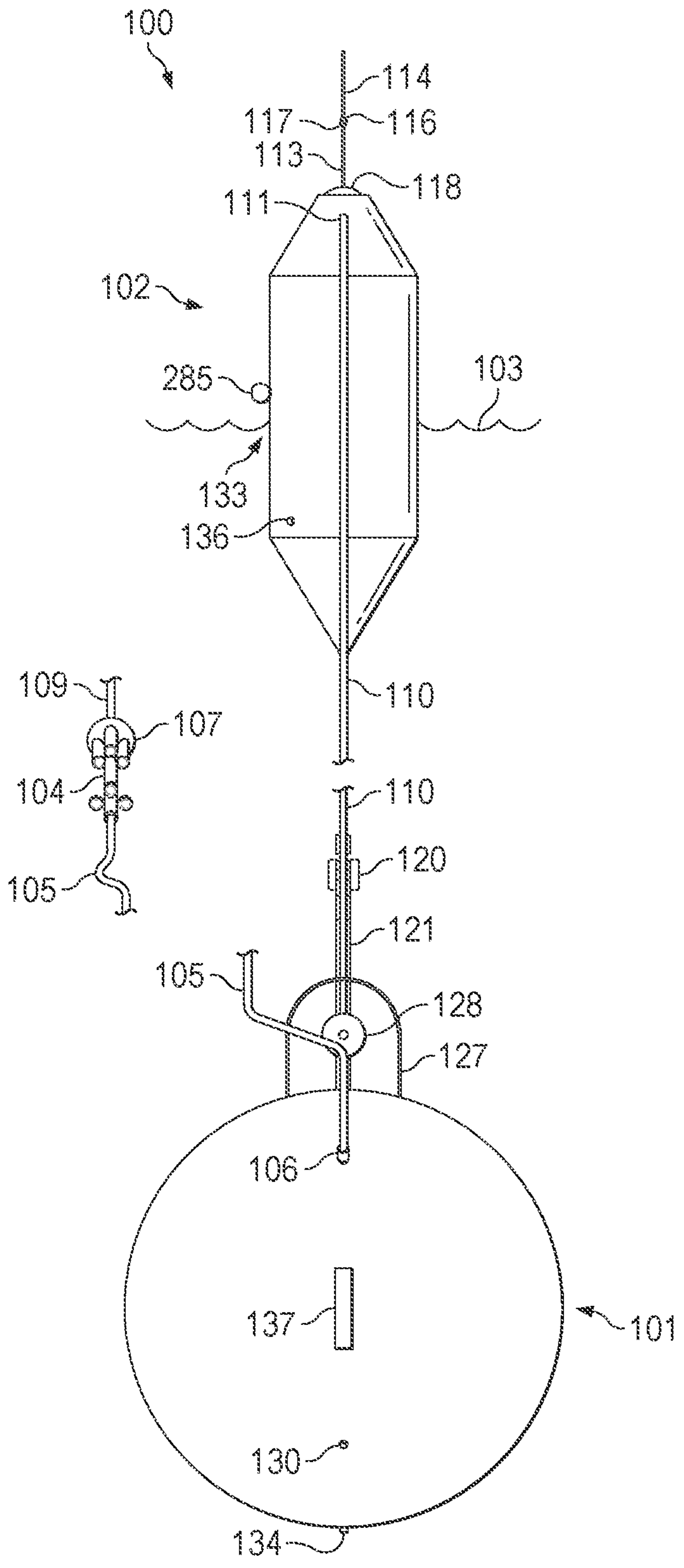
FIG. 5 is a side view of the embodiment of FIG. 1.

FIG. 5 shows a "front" side view of the same first embodiment 100 of the present invention that is illustrated in FIGS. 1-4.

Visible at the forward end of the hydrogen storage vessel 101 is a yaw propeller housing 137 in which the yaw propeller (126 in FIG. 3) is mounted, embedded, and/or affixed.

Figure 6:
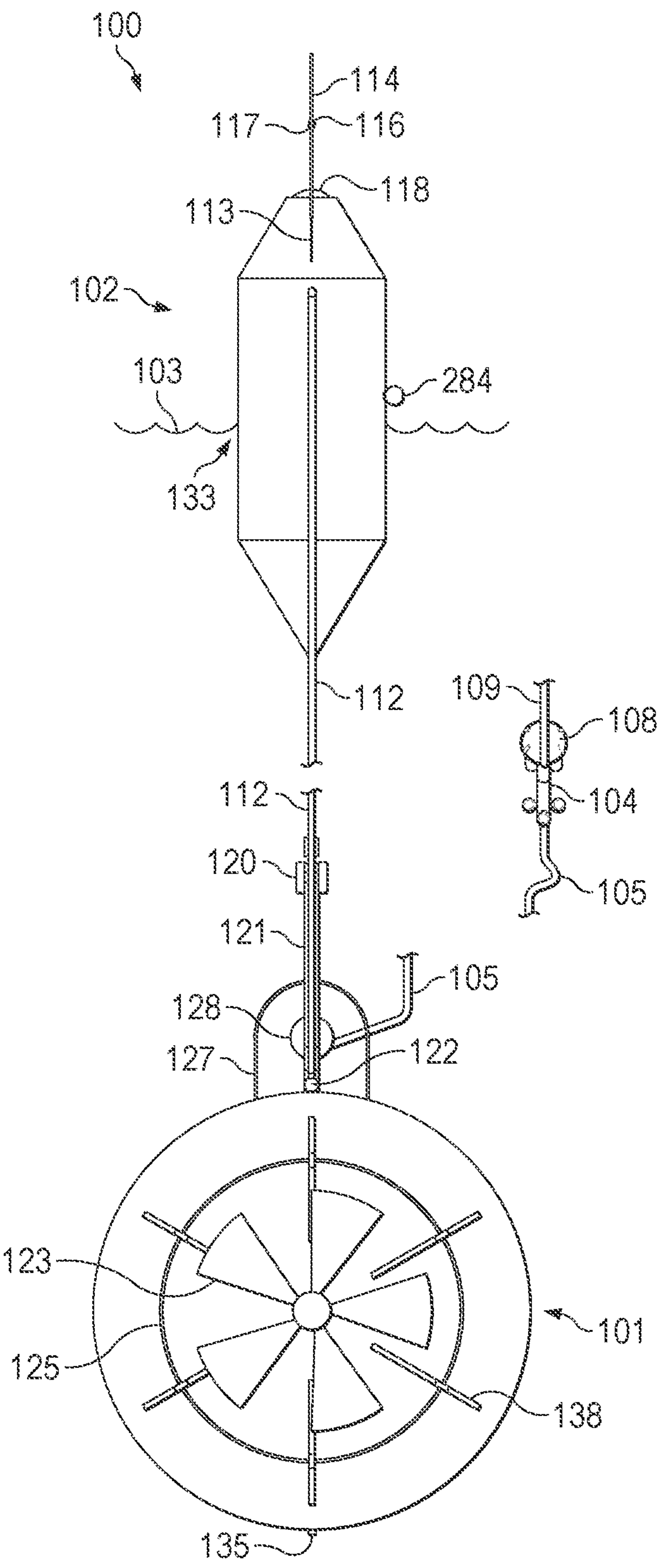
FIG. 6 is a side view of the embodiment of FIG. 1.

FIG. 6 shows a "back" side view of the same first embodiment 100 of the present invention that is illustrated in FIGS. 1-5.

Figure 7:
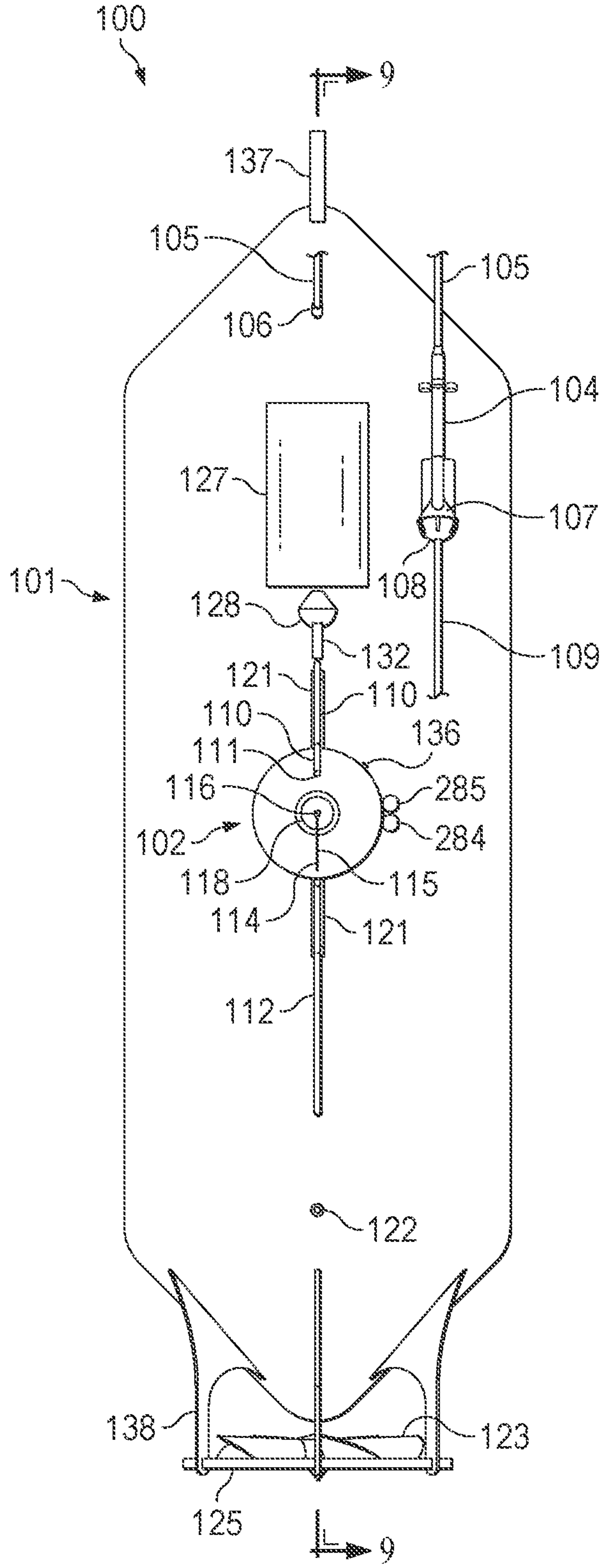
FIG. 7 is a top-down view of the embodiment of FIG. 1.

FIG. 7 shows a top-down view of the same first embodiment 100 of the present invention that is illustrated in FIGS. 1-6.

Figure 8:
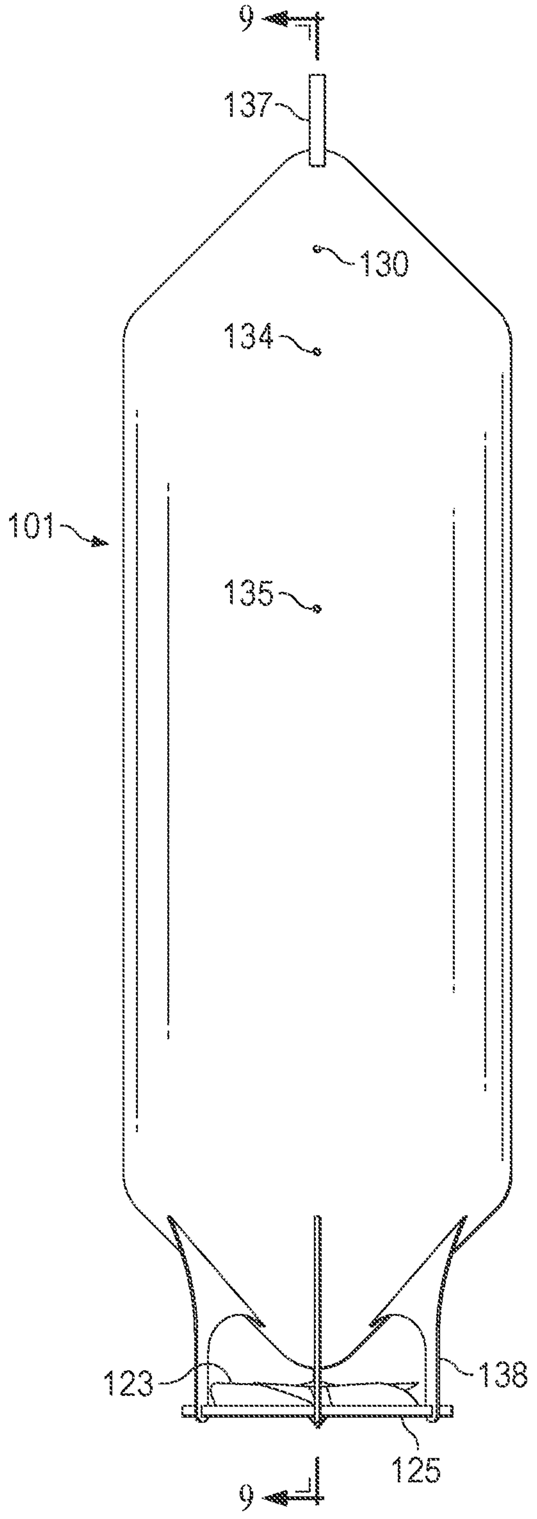
FIG. 8 is a bottom-up view of the embodiment of FIG. 1.

FIG. 8 shows a bottom-up view of the same first embodiment 100 of the present invention that is illustrated in FIGS. 1-7.

Figure 9:
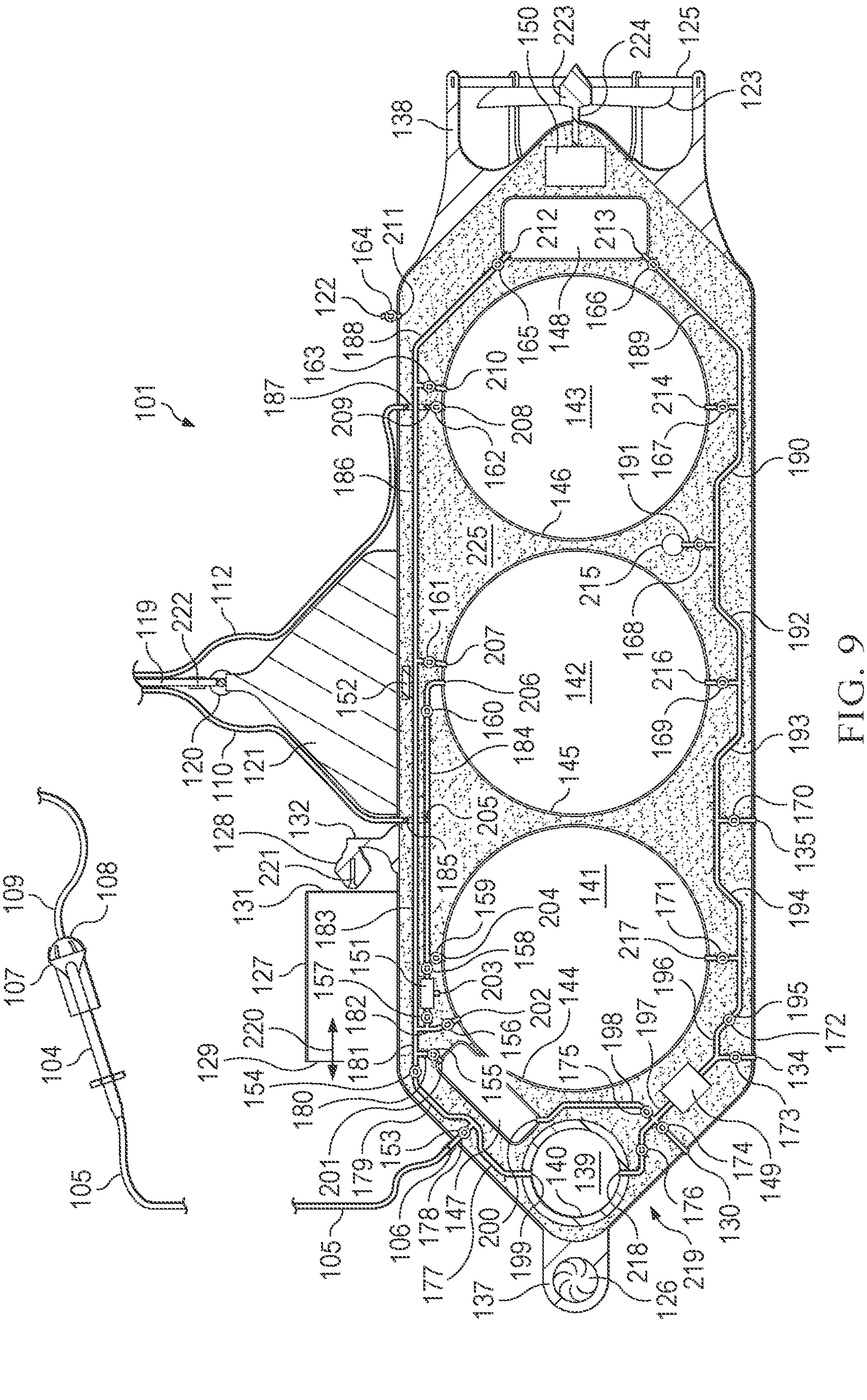
FIG. 9 is a closeup side sectional view of a hydrogen storage vessel of the embodiment of FIG. 1.

FIG. 9 shows a side sectional view of the hydrogen storage vessel 101 of the same first embodiment 100 of the present invention that is illustrated in FIGS. 1-8. The section plane is taken along section line 9-9 of FIGS. 7 and 8.

The internal structure of the hydrogen storage vessel 101, and the structure of the hydrogen gas storage apparatus within the hydrogen storage vessel, are illustrated in FIG. 9. A process by, and/or through, which the hydrogen storage vessel may receive hydrogen gas from an external hydrogen gas production and/or storage apparatus is illustrated and explained in FIGS. 15-20. A method by which the hydrogen storage vessel may offload, impart, and/or transmit, hydrogen gas from its own hydrogen gas storage apparatus to an external hydrogen gas storage and/or consumption apparatus is illustrated and explained in FIG. 21.

In an embodiment, the hydrogen gas storage apparatus within the hydrogen storage vessel 101 is comprised, in part, of pressure-resistant caching chamber 139, compartment, enclosure, tank, and/or vessel. The pressure-resistant caching chamber may have a relatively thick, sturdy, and strong pressure-resistant caching chamber wall 140. In an embodiment, the pressure-resistant caching chamber is made of steel. However, other embodiments included within the scope of this disclosure utilize, incorporate, and/or include, pressure-resistant caching chambers comprised of other materials, including, but not limited to: carbon fiber, titanium, copper, and iron.

The hydrogen gas storage apparatus within the hydrogen storage vessel 101 may be comprised, in part, of three gas storage compartments, enclosures, tanks, and/or vessels 141-143. During operation of the embodiment receiving, storing, and discharging hydrogen gas, these gas storage compartments may contain air or hydrogen, but typically not both. In addition to a gas, each gas storage compartment may also contain water drawn from the body of water 103 in which the hydrogen storage vessel is submerged.

Other embodiments are comprised of different numbers of gas storage compartments, enclosures, tanks, and/or vessels. An embodiment has two gas storage compartments. Another embodiment has four gas storage compartments. Another embodiment has five. And another seven. The scope of the disclosed invention is not limited to a specific number of gas storage compartments. Other embodiments are designed, configured, and/or adapted, to receive, store, and discharge other gases, which may include, but are not limited to: methane, propane, butane, and carbon dioxide. Other embodiments are designed, configured, and/or adapted, to receive, store, and discharge liquids, including, but not limited to: ammonia, methanol, and diesel.

Because the embodiment 100, the hydrogen storage vessel, and the hydrogen gas storage apparatus within the hydrogen storage vessel, preserves an equilibrium, homeostasis, and/or balance, between the pressures of gases stored within each of its gas storage compartments and the pressure of the water surrounding the hydrogen storage vessel and each of those gas storage compartments, the gas storage compartment walls 144-146 of the respective gas storage compartments 141-143 may be, but are not required to be, relatively thin and weak. Such relatively thin and weak gas storage compartment walls will tend to be less costly than relatively thick and strong gas storage compartment walls, and are therefore typically preferable.

While the cost of the embodiment's pressure-resistant caching chamber 139 may be relatively high, great, and/or expensive, with respect to each mole, kilogram, and/or unit volume of gas it may hold, due in part to a relatively thick and pressure-resistant wall 140 that is able to withstand a relatively great pressure difference between its interior and exterior, the relative size and/or volume of that pressure-resistant caching chamber may be relatively small and therefore its actual total cost may be relatively low, small, and/or inexpensive. And, though their sizes and/or volumes may be relatively large, because their walls may be relatively thin, and because the amount of material utilized in the fabrication of those compartment walls may be relatively small, the total cost of the embodiment's three gas storage compartments 140-142 may be likewise relatively low, small, and/or inexpensive.

The scope of the present disclosure includes gas storage compartment walls of any thickness, strength, shape, size, volume, and pressure rating. The scope of the present disclosure includes gas storage compartment walls composed, and/or fabricated of, any material, and/or combination of materials, including, but not limited to: steel, metal, aluminum, bronze, carbon fiber, plastic, PVC, ABS, and/or acrylic. An embodiment has gas storage compartments having different sizes, volumes, shapes, strengths, and pressure ratings, as well as gas storage composed, and/or fabricated of, different materials.

In an embodiment, the hydrogen gas storage apparatus within the hydrogen storage vessel 101 may be comprised, in part, of a pair of ballast and/or trim tanks 147 and 148. A forward trim tank 147 may be positioned near the bow of the hydrogen storage vessel 101, and/or at its forward end. A transfer of a gas from one of the embodiment's three gas storage compartments 140-142 into the forward trim tank may tend to "raise" the bow of the hydrogen storage vessel. In an embodiment, an aft trim tank 148 may be positioned near the stern of the hydrogen storage vessel, and/or at its aft end. A transfer of a gas from one of the embodiment's three gas storage compartments 140-142 into the aft trim tank may tend to "raise" the stern of the hydrogen storage vessel. By regulating, controlling, adjusting, and/or changing, the amounts of gas in each of the forward and aft trim tanks, the pitch of the hydrogen storage vessel may be regulated, controlled, adjusted, and/or altered. The control and/or alteration of the pitch of the hydrogen storage vessel can facilitate the translation, movement, and/or cruising, of the embodiment when it is propelled, and/or as it propels itself, through the water in which the hydrogen storage vessel is submerged.

The pitch of the hydrogen storage vessel 101 may be controlled and/or altered through the control of the volumes of gas in each of the forward 147 and aft 148 trim tanks. The yaw of the hydrogen storage vessel may be controlled and/or altered through the rotation (in either clockwise and counterclockwise directions) of the yaw propeller 126. In an embodiment, the roll of the hydrogen storage vessel is fixed and unalterable due to the suspension of the hydrogen storage vessel from the embodiment's spar buoy 102, i.e., in an embodiment, the hydrogen storage vessel "hangs" in a nominally upright, and/or fixed vertical roll orientation, at the end of the spar buoy connection cable 119, which itself hangs from a lower end of the embodiment's spar buoy.

The hydrogen gas storage apparatus within the hydrogen storage vessel 101 may be comprised, in part, of a bi-directional water pump 149, a primary-propeller engine and/or motor 150, a fuel cell 151 (for converting hydrogen and oxygen into electrical power and water), and an inertial measurement unit (IMU) 152.

In an embodiment, the hydrogen gas storage apparatus, within the embodiment's hydrogen storage vessel 101, is comprised, in part, of a plurality of electrically-actuated, i.e., electrically opened and closed, valves 153-176, and a plurality of pipes, pipe segments, fluid channels, and/or fluid conduits, e.g., 177-198, which fluidly connect a plurality of fluid apertures, e.g., 199-218.

In an embodiment, an interior interstitial space 225 and/or volume within the hydrogen storage vessel 101 is comprised, at least in part, of a negatively buoyant solid material including, but not limited to: stones, gravel, cobbles, sand, cement, rocks, pebbles, and unconsolidated granular mineral materials, quartz. The interior interstitial space and/or volume within the hydrogen storage vessel is also comprised, at least in part, of metals, especially of unconsolidated fragments, pellets, pieces, and/or chunks, of metal, including, but not limited to, unconsolidated fragments of steel and iron. Other embodiments similar to the one illustrated in FIGS. 1-9 may include, within the interstitial spaces within their hydrogen storage vessels, negatively buoyant materials of a great variety of types, including both consolidated structures of such materials, as well as unconsolidated aggregates, packings, and/or collections of such materials. Still other embodiments similar to the one illustrated in FIGS. 1-9 may utilize, incorporate, and/or include, other mechanisms, structures, and/or means of offsetting, correcting, and/or compensating for, the positive buoyancies of the gases stored and/or contained within their respective hydrogen storage vessels, and all such embodiments are included within the scope of the present disclosure.

Furthermore, the interior interstitial space and/or volume within the hydrogen storage vessel 101 may be flooded, at least in part, with water 103 from the body of water within which the hydrogen storage vessel is submerged, and that entrained, contained, and/or integrated internal water, held, positioned, stored, and/or trapped, within, between, and/or among the negatively buoyant solid materials contained within an interior interstitial space and/or volume within the hydrogen storage vessel, may be of an approximately equal hydrostatic pressure with the waters outside the hydrogen storage vessel. The balance of the pressures within and without the embodiment's hydrogen storage vessel may permit the fabrication of the outer hull 219 of the hydrogen storage vessel from relatively inexpensive and thin-walled material, e.g., ⅜" thick steel, thus reducing the cost of the embodiment. The scope of the present disclosure includes hydrogen storage vessels of any size, shape, and volume, as well as hydrogen storage vessels composed, and/or fabricated, of any material, or combination of materials.

In an embodiment, aperture 215 is comprised of a mesh, sieve, screen, and/or perforated sifter through which fluids may pass but stones, gravel, and/or sand may not readily pass. Aperture and/or sieve 215 may permit water to flow into and out from the interstitial spaces within the hydrogen storage vessel 101 without permitting the negatively buoyant stones, metal fragments, and/or other unconsolidated materials, to flow, fall, migrate, move, and/or become lodged and/or stuck within the pipes, e.g., 191, through which fluids flow within the hydrogen storage vessel.

In an embodiment, when not needed, and/or utilized, for forming, maintaining, and/or creating, a fluid connection with a bobble gas exchange connector 108, that is in turn fluidly connected to an external hydrogen gas production and/or storage apparatus, the embodiment's remotely-operated vehicle (ROV) 104 propels itself through 220 a forward aperture 129, gateway, entrance, and/or mouth, of the ROV awning 127, and partially through an aft aperture 131, gateway, entrance, and/or mouth, of that ROV awning, whereafter the ROV connects its bobble receiving port 107 to the ROV anchor bobble 128. The ROV awning may provide lateral protection to the ROV. And, the walls of the ROV awning, in conjunction with the ROV's physical attachment to the ROV anchor bobble, may secure the ROV within the ROV awning, when the ROV is not actively involved in the transfer of hydrogen gas through its gas transmission hose 105.

In an embodiment, an ROV fluid connection port 221 within the ROV anchor bobble 128 permits the ROV's bobble connector (not visible) to be inserted into, and/or to fit within, the ROV anchor bobble. When again needed to form, create, and/or maintain, a fluid connection with a bobble gas exchange connector 108, the ROV 104 detaches its bobble receiving port 107 from the ROV anchor bobble 128 and propels itself 220 out of the ROV awning after which it propels itself to the target bobble gas exchange connector 108 where upon it physically and fluidly connects to that bobble gas exchange connector.

In an embodiment, such as embodiment 100 illustrated in FIGS. 1-9, a microphone and/or hydrophone (not shown) positioned within the ROV's 104 bobble receiving port 107 facilitates the ROV's location of, and homing toward, a target bobble gas exchange connector 108. And, with respect to an embodiment such as the one illustrated in FIGS. 1-9, bobble gas exchange connectors compatible with the embodiment, e.g., connectors to which the embodiment is able to fluidly connect, and with which the embodiment is able to exchange hydrogen gases, contain a transducer, pinger, and/or other acoustic signal emitter (not shown) that emits, produces, and/or broadcasts, acoustic signals detectable by the hydrophone within the ROV's 104 bobble receiving port, and therefore detectable by the embodiment. Other embodiment's of the present disclosure utilize other types, systems, and/or methods, of locating target bobble gas exchange connectors, and likewise require that compatible bobble gas exchange connectors provide and/or produce corresponding and/or compatible types of localization signals to facilitate the acquisition and connection of their respective ROV's with those bobble gas exchange connectors.

In an embodiment, the spar buoy connection cable 119 is connected to the embodiment's connection cable swivel 120 by a spar buoy connection cable connector 222.

In an embodiment, the blades, e.g. 123, of the primary propeller are attached to a central primary propeller hub 223 which is attached to a primary propeller shaft 224. And, when the primary-propeller motor 150 rotates the primary propeller shaft, to which it is operably connected, the primary propeller, i.e., its hub and its propeller blades, rotate thereby generating a thrust that tends to propel the embodiment in a forward direction (124 in FIG. 3).

An embodiment of the present disclosure is similar to the embodiment illustrated in FIGS. 1-9, but omits the outer hull 219 of the hydrogen storage vessel and instead attaches the internal and external components of the hydrogen storage vessel 101 to a framework, skeleton, scaffold, latticework, and/or truss, which may be, in whole or in part, comprised of the various tanks, pipes, and other rigid components of which the operational features, and/or components, of the hydrogen storage vessel 101 are comprised.

Figure 10:
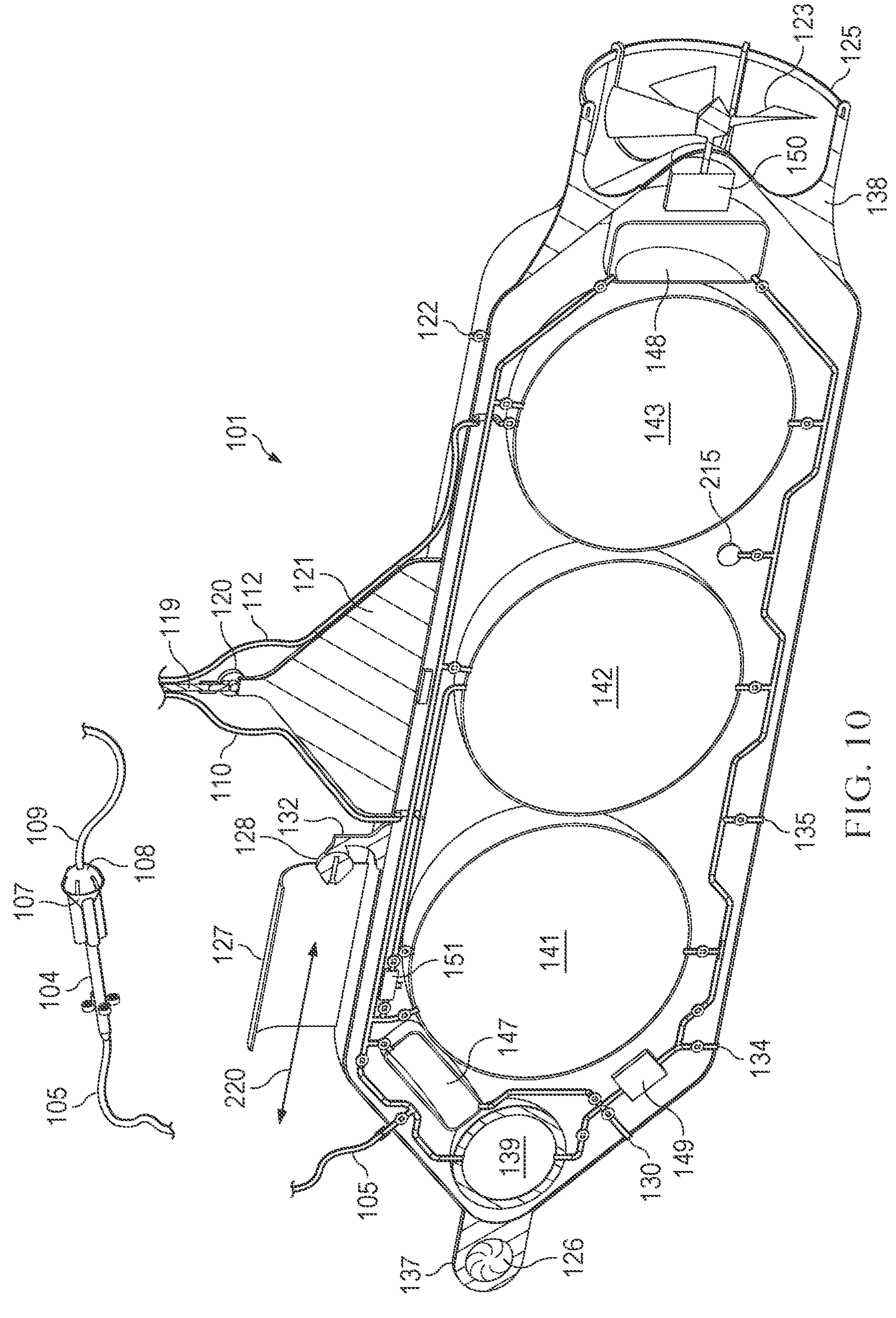
FIG. 10 is a perspective closeup side sectional view of a hydrogen storage vessel of the embodiment of FIG. 1.

FIG. 10 shows a perspective view of the same side sectional view of the hydrogen storage vessel 101 illustrated in FIG. 9, the section plane of which is taken along section line 9-9 of FIGS. 7 and 8.

Figure 11:
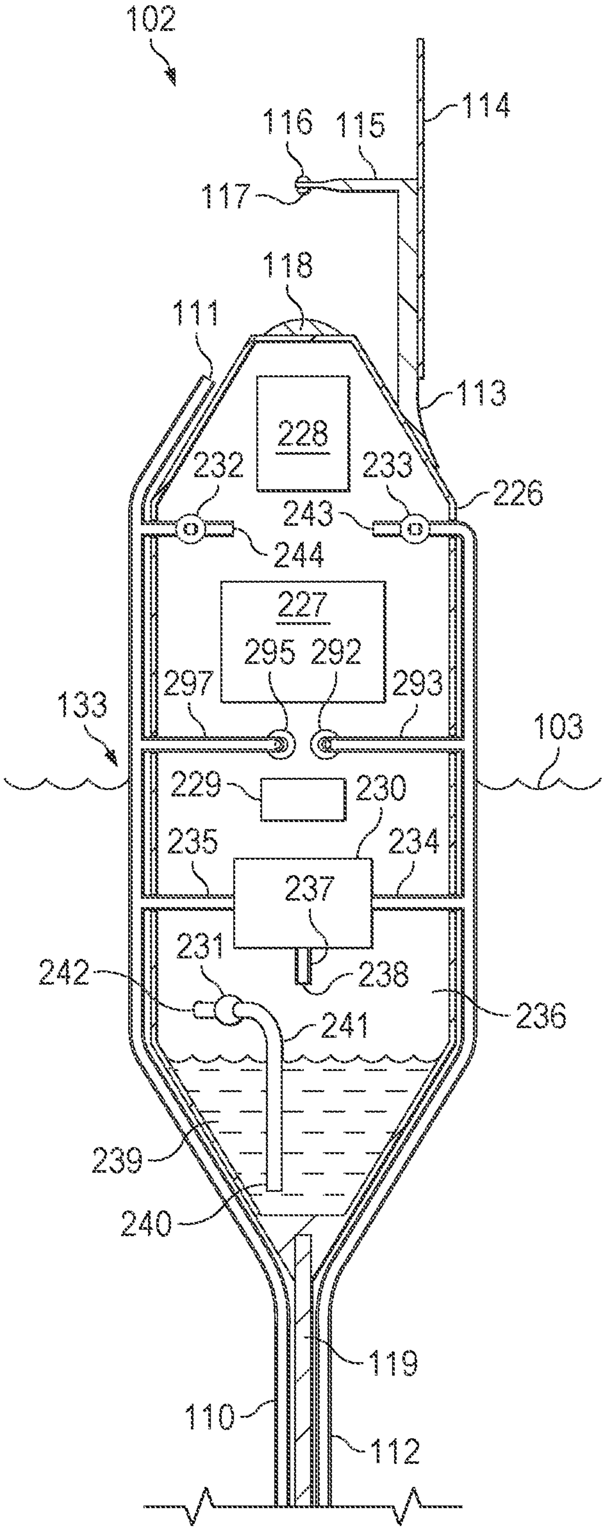
FIG. 11 is a closeup side sectional view of a spar buoy of the embodiment of FIG. 1.

FIG. 11 shows a side sectional view of the spar buoy 102 of the same first embodiment 100 of the present invention that is illustrated in FIGS. 1-8. The section plane is taken along section line 9-9 of FIGS. 7 and 8.

In an embodiment, the spar buoy 102 floats adjacent to an upper surface 103 of a body of water in which the respective hydrogen storage vessel (not visible, 101 in FIGS. 1-8) is submerged. The spar buoy is flexibly connected to the hydrogen storage vessel by a spar buoy connection cable 119, chain, wire, linkage, rope, and/or other type of elongate connector. An upper end of the spar buoy connection cable is fixedly attached to the vessel, chamber, container, enclosure, and/or canister, which comprises the outer hull 226 of the spar buoy.

The spar buoy 102 may support a fraction, e.g., 5%, of the weight of the hydrogen storage vessel (not visible, 101 in FIGS. 1-8), and the upward tension created by the buoyancy of the spar buoy floating at the surface 103 of a body of water, and the downward tension created by the weight of the hydrogen storage vessel suspended below by the spar buoy connection cable 119, may tend to stabilize the depth of the hydrogen storage vessel.

In an embodiment, when the depth of the hydrogen storage vessel (not visible, 101 in FIGS. 1-8) increases, the depth and the buoyancy of the spar buoy 102 are increased, and the resulting increase in an upward buoyant force within the spar buoy connection cable 119 may pull up the hydrogen storage vessel and thereby decrease (and restore) the nominal depth of the hydrogen storage vessel.

In an embodiment, when the depth of the hydrogen storage vessel (not visible, 101 in FIGS. 1-8) decreases, the tension within the spar buoy connection cable 119 tends to decrease, potentially resulting in the spar buoy connection cable becoming slack. When this happens that portion of the weight of the hydrogen storage vessel that had been supported by the spar buoy via the spar buoy connection cable may no longer be supported, and the imbalanced and/or increased effective weight of the hydrogen storage vessel may cause the hydrogen storage vessel to sink back to its nominal depth.

Thus, in an embodiment, the spar buoy, and its flexibly connected spar buoy connection cable 119, tend to stabilize the depth of the hydrogen storage vessel, thereby tending to also stabilize the ambient pressure of the water outside the hydrogen storage vessel.

In an embodiment where the spar buoy has a relatively small cross-sectional area at the water line 133 of the spar buoy, transient changes in the position of that waterline, and/or transient changes in the draft of the spar buoy 102, e.g., such as those caused by passing waves, do not tend to produce significant alterations in the magnitude of the upward tension within the spar buoy connection cable 119, and therefore likewise do not tend to significantly alter the depth of the hydrogen storage vessel (not visible, 101 in FIGS. 1-8).

In an embodiment, pressurized air and/or oxygen released from the embodiment's three gas storage compartments, enclosures, tanks, and/or vessels (not visible, 141-143 in FIGS. 9 and 10), positioned within the embodiment's hydrogen storage vessel (not visible, 101 in FIGS. 1-8), flows, travels, and/or passes, upward to the spar buoy 102 through a pressurized air ventilation pipe 110 and at least a portion of that pressurized air and/or oxygen is released into the atmosphere above the spar buoy through pressurized air exhaust port 111 and/or mouth in an upper end of that pressurized air ventilation pipe.

In an embodiment, pressurized hydrogen released from the embodiment's three gas storage compartments, enclosures, tanks, and/or vessels (not visible, 141-143 in FIGS. 9 and 10), positioned within the embodiment's hydrogen storage vessel (not visible, 101 in FIGS. 1-8), flows, travels, and/or passes, upward to the spar buoy 102 through a pressurized hydrogen supply pipe 112.

In an embodiment, a vertical strut 113 is attached to an upper and outer portion of the spar buoy 102 and projects upward to a position above an upper end of the spar buoy. Attached to a side of the vertical strut is a radio antenna 114. Attached above and below a lateral extension 115 of the vertical strut are upper 116 and lower 117 hemispherical cameras which, respectively, provide a control system 227 streaming images of the sky above the spar buoy 102 and the water surfaces 103 around the spar buoy (e.g., out to the horizon and including images of ships and obstacles moving thereon).

Attached to, and/or positioned at, at upper end of the spar buoy 102 is a satellite communications antenna 118. Signals, messages, and/or data, electronically encoded by a communications module 228, and/or apparatus, are transmitted to external antennas and/or satellites by the communications module through the radio antenna and/or through the satellite communications antenna. Likewise, signals, messages, and/or data, received through and/or by the radio antenna and/or the satellite communications antenna are processed and/or decoded by the communications module.

An inertial measurement unit (IMU) 229 provides the control system 227 with information about the accelerations, orientation, angular rates of movements, orientation with respect to a magnetic north magnetic field, and other gravitational forces acting on the embodiment, and upon the spar buoy 102 in particular. Similarly, the IMU (not visible, 152 in FIG. 9) within the hydrogen storage vessel (not visible, 101 in FIGS. 1-8) provides the control system 227 with information about the accelerations, orientation, angular rates of movements, orientation with respect to a magnetic north magnetic field, and other gravitational forces acting on the embodiment, and upon the hydrogen storage vessel in particular.

A fuel cell 230 provides the communications module 228, the satellite communications antenna 118, the radio antenna 114, the upper 116 and lower 117 hemispherical cameras, the control system 227, the IMU 229, and a plurality of valves, e.g., 231-233, with electrical power. In turn, the fuel cell is provided with hydrogen through a hydrogen inlet pipe 234 that is fluidly connected to the pressurized hydrogen supply pipe 112. The fuel cell is also provided with oxygen (sometimes mixed with, and/or in part comprising, air) through an oxygen inlet pipe 235. The air, and/or oxygen, entering and powering the fuel cell, may originate as pressurized air and/or oxygen released from one of the embodiment's three gas storage compartments, enclosures, tanks, and/or vessels (not visible, 141-143 in FIGS. 9 and 10), positioned within the embodiment's hydrogen storage vessel (not visible, 101 in FIGS. 1-8), and/or it may originate as atmospheric air that flows into the pressurized air ventilation pipe 110 through the pressurized air exhaust port 111 and/or mouth in an upper end of that pressurized air ventilation pipe.

In an embodiment, water produced by the fuel cell is discharged into an interior 236 of the spar buoy 102 through a water outlet pipe 237 and through an aperture 238 and/or mouth at a distal end of the water outlet pipe.

In an embodiment, a water ballast 239 is kept, contained, held, and/or stored, within a lower portion of an interior 236 of the spar buoy 102 in order to provide ballast to the spar buoy, and to provide a surplus buoyancy capacity that can be realized through an expulsion of all, or a part, of that water ballast, thereby affording the embodiment, and its control system 227, an ability to increase the buoyancy of the spar buoy above its nominal buoyancy if and/or when required by the embodiment. Water discharged from the fuel cell is deposited into, and/or added to, the water ballast.

In an embodiment, when opened by the embodiment's control system 227, a water ballast pressurization valve 233 allows pressurized hydrogen gas to flow from one (not visible, 143 in FIGS. 9 and 10) of the embodiment's three gas storage compartments, into and through the pressurized hydrogen supply pipe 112, and therethrough into and through the water ballast pressurization valve 233, and therethrough into and through a water ballast pressurization aperture 243, and therethrough into an interior 236 of the spar buoy 102, thereby pressurizing the water ballast 239. Furthermore, and in a complementary fashion, when the control system opens a water ballast discharge valve 231, the opened water ballast discharge valve permits pressurized water ballast 239 to flow into and through a lower water discharge aperture 240, and therethrough into and through a water discharge pipe 241, and therethrough into and through the open water ballast discharge valve, and therethrough into and through a water ballast release pipe 242, and therethrough into and through the water discharge port (not visible, 136 in FIGS. 4 and 5) wherethrough it flows into and joins the body of water 103 on which the spar buoy 102 floats, thereby increasing the buoyancy of the spar buoy.

In a complementary fashion, when opened by the control system 227, a water ballast pressurization relief valve 232 allows pressurized gas from within an interior 236 of the spar buoy 102 to flow into and through a water ballast depressurization aperture 244, and therethrough into and through the open water ballast pressurization relief valve, and therethrough into and through the pressurized air ventilation pipe 110, and therethrough into and through the pressurized air exhaust port 111, and therethrough into the atmosphere outside the embodiment.

Such a release of pressurized gas from within the interior 236 of the spar buoy 102 reduces the pressure of the gas 236 and water ballast 239 within the spar buoy. Furthermore, and in a complementary fashion, when the control system opens the water ballast discharge valve 231, the opened water ballast discharge valve permits water 103 from outside the embodiment to flow into and through the water discharge port (not visible, 136 in FIGS. 4 and 5), and therethrough into and through the open water ballast discharge valve 231, and therethrough into and through the water discharge pipe 241, and therethrough into and through the water discharge aperture 240, wherethrough the inflowing water is added to the water ballast 239 thereby decreasing the buoyancy of the spar buoy.

Figure 12:
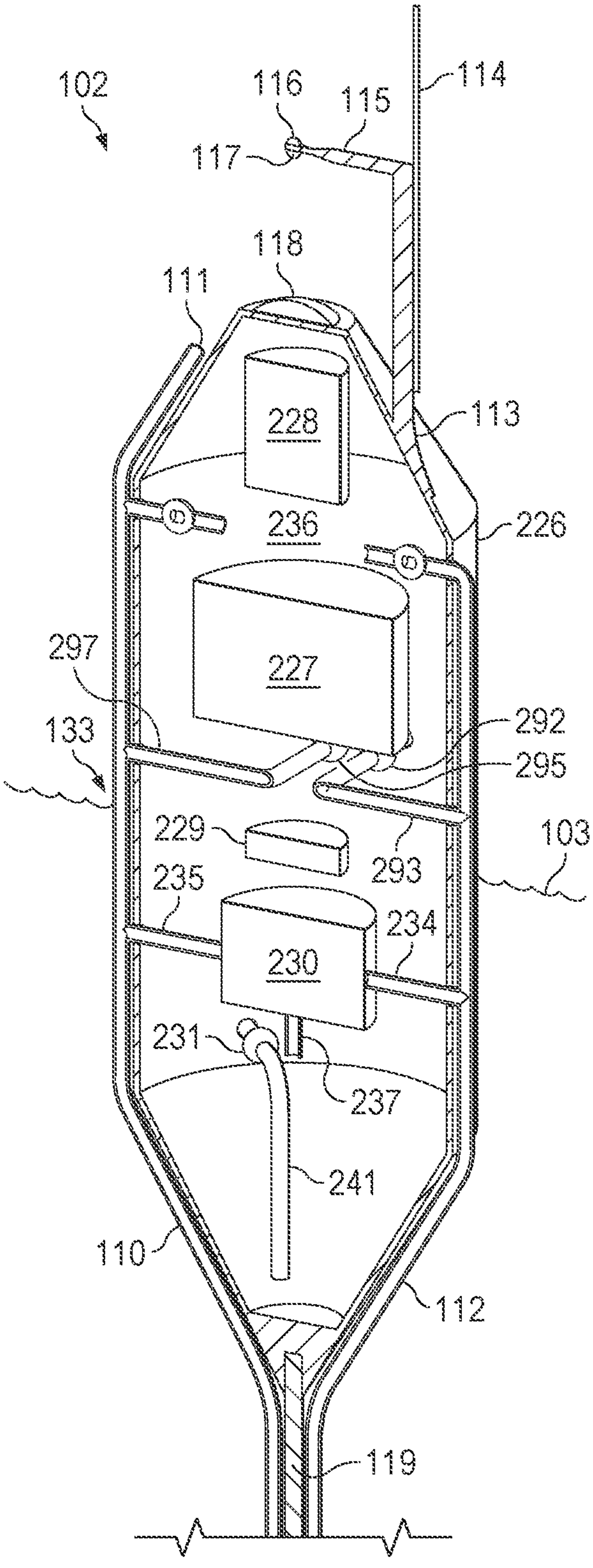
FIG. 12 is a perspective closeup side sectional view of a spar buoy of the embodiment of FIG. 1.

FIG. 12 shows a perspective view of the same side sectional view of the spar buoy 102 illustrated in FIG. 10, the section plane of which is taken along section line 9-9 of FIGS. 7 and 8.

Figure 13:
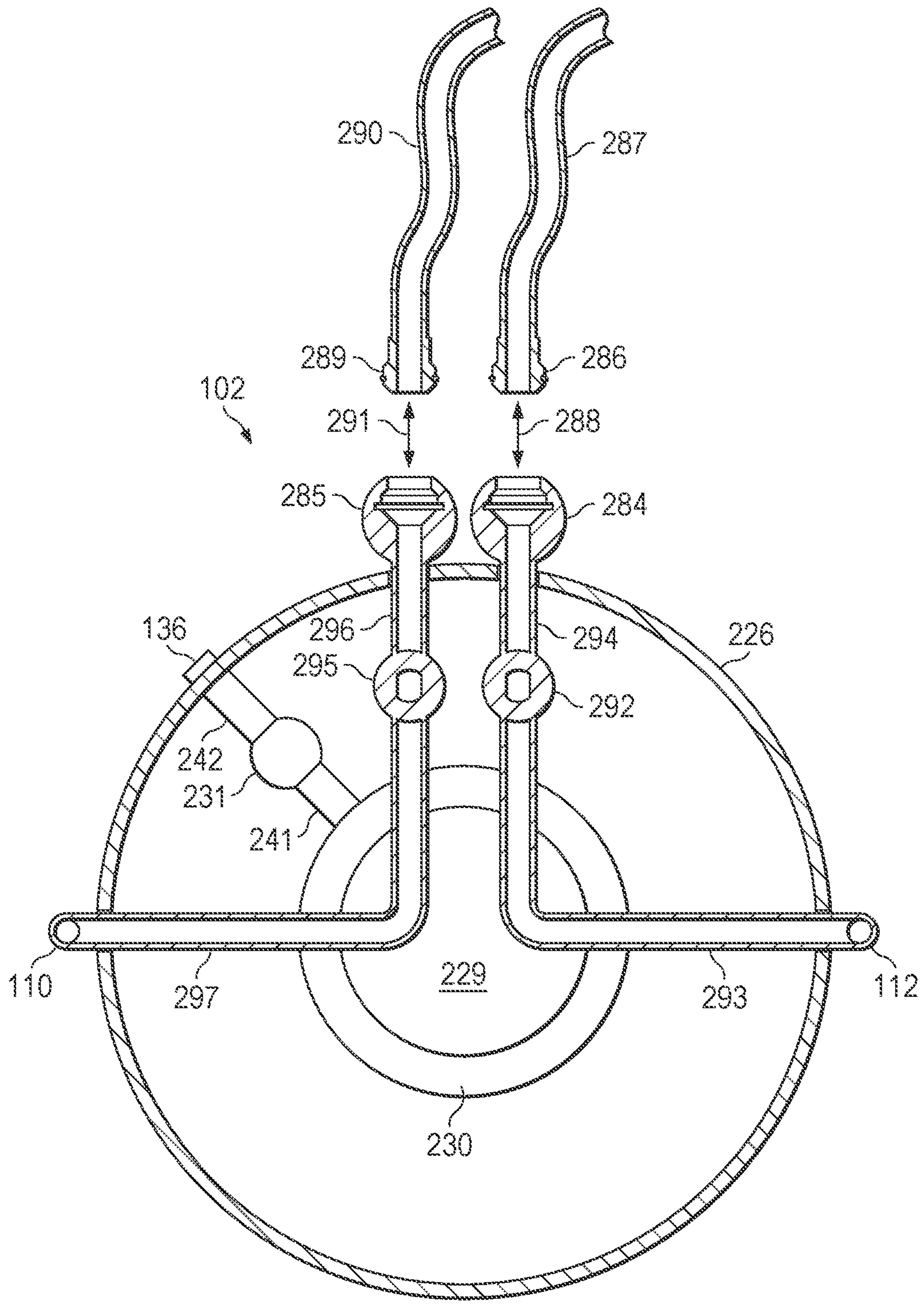
FIG. 13 is a closeup top-down sectional view of the spar buoy of the embodiment of FIG. 1.

FIG. 13 shows a top-down sectional view of the spar buoy 102 of the same first embodiment 100 of the present invention that is illustrated in FIGS. 1-8, and of the same spar buoy 102 that is illustrated in FIGS. 11 and 12. The section plane is taken along section line 13-13 of FIG. 11.

In an embodiment, when the embodiment is directed by an "offload signal," e.g., by a satellite communication received by its satellite communications antenna 118 and translated and/or decoded by its communications module 228, to offload a portion of its store of hydrogen gas, then the embodiment travels to the geospatial location specified in the offload signal, and upon its arrival there, the hydrogen-gas receiving hose connector 286 at an end of a respective hydrogen-gas receiving hose 287 is inserted 288 into, and/or fluidly connected to, the embodiment's hydrogen-gas discharge hose connector 284, thereby establishing a fluid connection between a hydrogen gas consumer and/or receiver (not shown) and the embodiment.

Also upon its arrival at the specified geospatial location, the pressurized-air discharge hose connector 289 at an end of a respective pressurized-air discharge hose 290 is inserted 291 into, and/or fluidly connected to, the embodiment's pressurized-air receiving hose connector 285, thereby establishing a fluid connection between a provider of pressurized air or oxygen (not shown) and the embodiment.

In an embodiment, when a hydrogen gas discharge valve 292 is opened, then pressurized hydrogen gas within the pressurized hydrogen supply pipe 112 is able to flow into and through the hydrogen-gas discharge feed pipe 293, and therethrough into and through the open hydrogen gas discharge valve, and therethrough into and through the hydrogen-gas discharge pipe 294, and therethrough into and through the hydrogen-gas discharge hose connector 284, and therethrough into the hydrogen-gas receiving hose connector 286 and its fluidly connected hydrogen-gas discharge hose 287, and therethrough to the external hydrogen gas consumer and/or receiver (not shown), e.g., another vessel, a land-based electrical utility, and/or a chemical fuel production facility.

In an embodiment, when a pressurized-air inlet valve 295 is opened, then pressurized air (or oxygen) within the pressurized-air discharge hose 290, providing by an external provider of pressurized air or oxygen, e.g., by the same external hydrogen gas consumer and/or receiver to which hydrogen gas is being supplied, is able to flow from the pressurized-air discharge hose 290, and into and through the pressurized-air discharge hose connector 289, and therethrough into and through the pressurized-air receiving hose connector 285, and therethrough into and through the pressurized-air receiving pipe 296, and therethrough into and through the open pressurized-air inlet valve, and therethrough into and through pressurized-air receiving feed pipe 297, and therethrough into the pressurized air ventilation pipe 110.

An embodiment of the present disclosure comprises a hydrogen production source, vessel, and/or buoy, which produces and stores hydrogen; a self-propelled hydrogen storage vessel 100 which receives and stores the hydrogen, transports the hydrogen, and delivers the hydrogen to a receiving structure, vessel, and/or buoy, including, but not limited to, to a another self-propelled hydrogen storage vessel 100 (e.g., perhaps a self-propelled hydrogen storage vessel of a greater hydrogen storage capacity); and a hydrogen receiving structure, vessel, and/or buoy, which receives a portion of the transported hydrogen.

An embodiment of the present disclosure comprises a buoy 102 that comprises a propulsion mechanism and which, at least in part, propels the embodiment through the body of water on which it floats.

Figure 14:
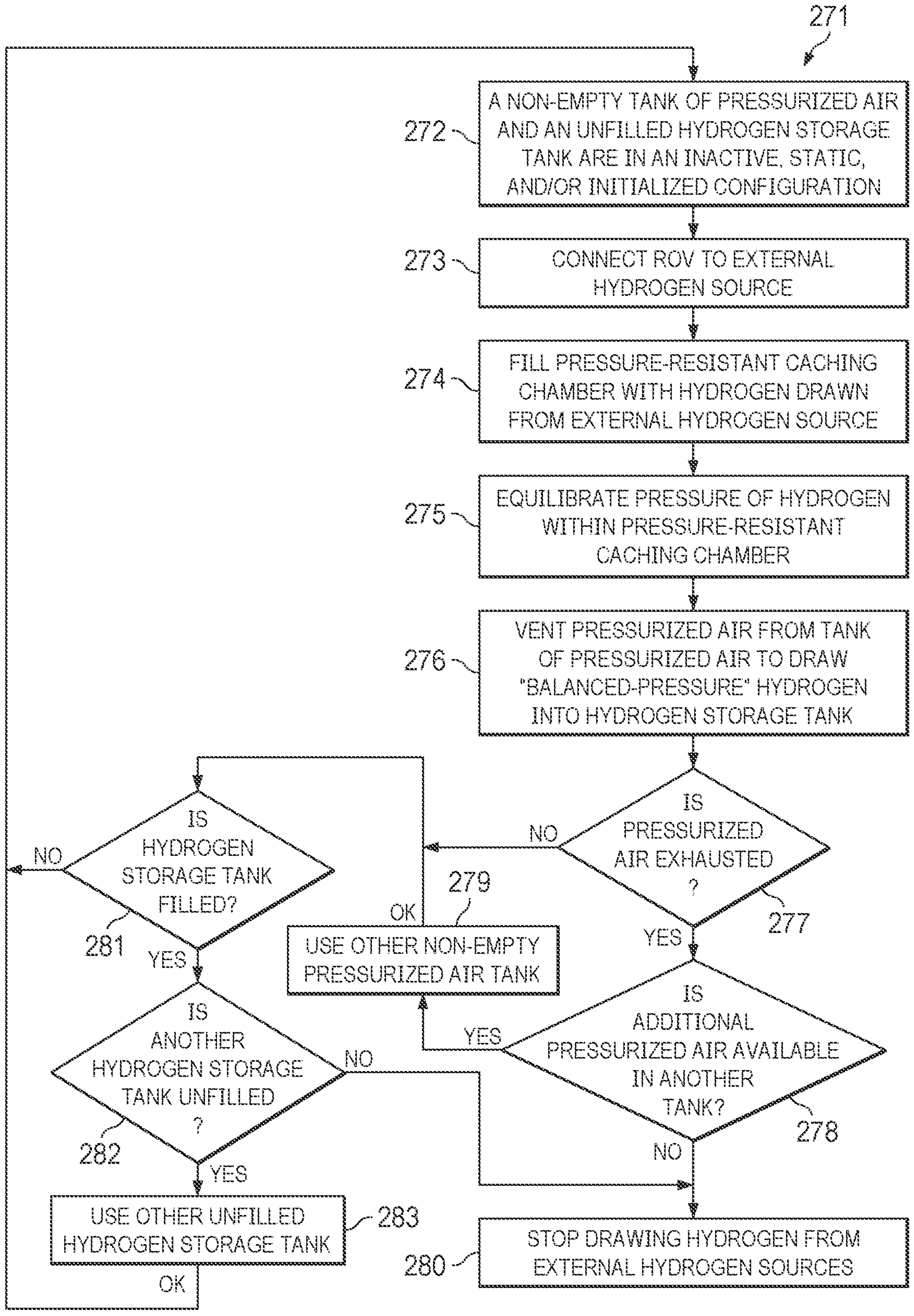
FIG. 14 is a flow chart describing a method of the embodiment of FIG. 1.

FIG. 14 shows a flowchart illustrating the method 271 and/or steps by which an embodiment of the present disclosure acquires, from an external provider, and stores, hydrogen gas.

When an embodiment possesses, within one of its storage tanks, a supply of pressurized air, and when that embodiment also possesses a water-filled volume and/or space within another of its storage tanks which can be evacuated in order to store an approximately equal volume of hydrogen gas, then that embodiment is able to receive and store additional hydrogen gas 272.

In an embodiment, the acquisition of hydrogen gas begins with the establishment of a fluid connection between the embodiment and the external provider of hydrogen gas. An embodiment of the present disclosure achieves, realizes, and/or creates, such a fluid connection through the fluid connection of the embodiment's gas transmission hose (105 in FIG. 9) to the gas exchange hose (109 in FIG. 9) of the external hydrogen-gas supplier.

In an embodiment, a remotely-operated vehicle (ROV) (104 in FIG. 9) of the embodiment transports a distal end of embodiment's gas transmission hose (105 in FIG. 9) toward, and/or to, a distal end of the hydrogen-gas supplier's gas exchange hose (109 in FIG. 9). When a "bobble" receiving port (107 in FIG. 9) of the embodiment's ROV physically attaches itself to a bobble gas exchange connector (108 in FIG. 9), and thereby respectively attaches the distal end of the embodiment's gas transmission hose to the distal end of the hydrogen-supplier's gas exchange hose, a fluid connection is established 273 between the embodiment and the external supplier of hydrogen gas.

In an embodiment, hydrogen gas (potentially at a relatively low pressure) is drawn from the external supplier of hydrogen gas into the embodiment's pressure-resistant caching chamber (139 in FIG. 9) 274 through the action of the embodiment's bi-directional water pump (149 in FIG. 9) drawing water out of the pressure-resistant caching chamber and thereby creating a partial vacuum that draws in hydrogen gas (even relatively low-pressure hydrogen gas) from the external supplier of hydrogen gas.

The pressure of the received, cached, acquired, and/or onboarded, hydrogen gas is equilibrated 275 with the hydrostatic pressure of the water outside the embodiment's hydrogen storage vessel (101 in FIGS. 1-10). The pressure of the onboarded hydrogen gas is equilibrated so that it can be stored within the embodiment's relatively thin-walled and low-cost storage tanks. The pressure of the onboarded hydrogen gas is equilibrated with the outside water by allowing that outside water to flow into the pressure-resistant caching chamber (139 in FIG. 9) until the pressure of the hydrogen gas therein is approximately equal to the pressure of the outside water to which it is fluidly connected.

In order to transfer the pressure-balanced, and/or pressure-equilibrated, hydrogen gas 276 within the pressure-resistant caching chamber (139 in FIG. 9) into a storage tank (141-143 in FIG. 9), air within one of the storage tanks is vented to the atmosphere above the body of water (103 in FIGS. 3 and 11), and the resulting loss of pressure within the pressurized-air tank from which the air is vented, draws water from the storage tank into which the hydrogen gas is transferred from the pressure-resistant caching chamber.

After the hydrogen gas within the pressure-resistant caching chamber (139 in FIG. 9) has been transferred into one of the embodiment's storage tanks (141-143 in FIG. 9), then the embodiment can potentially receive, accept, pull, draw, and/or onboard, another quantity, volume, and/or mass, of hydrogen gas from the same, or from a new, external supplier of hydrogen gas, if there are sufficient resources to do so.

If there is sufficient pressurized air 277 remaining in the storage tank from which pressurized air was vented in order to execute, complete, realize, and/or achieve, the prior transfer of hydrogen gas, then the embodiment has enough pressurized air to complete another iteration, round, and/or cycle, of hydrogen gas onboarding and storage. (I.e., transition from step 277 along the "NO" branch.)

If the prior supply of pressurized air used to execute, complete, realize, and/or achieve, the prior transfer of hydrogen gas has been exhausted (i.e., the transition from step 277 along the "YES" branch), then if there is sufficient pressurized air 278 available in another of the embodiment's storage tanks, then the embodiment has enough pressurized air to complete another iteration, round, and/or cycle, of hydrogen gas onboarding and storage, and the embodiment will use 279 the pressurized air within the new air-containing storage tank for any additional iteration, round, and/or cycle, of hydrogen gas onboarding and storage. (I.e., transition from step 278 along the "YES" branch, and from step 279 along the "OK" branch.)

If there is not sufficient pressurized air remaining in the storage tank from which pressurized air was vented in order to execute, complete, realize, and/or achieve, the prior transfer of hydrogen gas, and there is not sufficient pressurized air remaining in any other storage tank, 278 then the embodiment is no longer able to receive and store additional hydrogen gas 280, and the embodiment must therefore stop such onboarding activity (i.e., the transition from step 278 along the "NO" branch).

After the embodiment has onboarded and stored its maximum capacity of hydrogen gas, it may then transport its stored supply of hydrogen gas to an external consumer of hydrogen gas, e.g., another vessel, a land-based electrical utility, and/or a chemical fuel production facility.

If there is sufficient room, space, and/or displaceable water, remaining in the storage tank into which hydrogen gas was transferred from the pressure-resistant caching chamber (139 in FIG. 9) during the execution, completion, realization, and/or achievement, of the prior transfer of hydrogen gas, and into which additional hydrogen gas may be transferred and stored during a future such transfer, then the embodiment may complete another iteration, round, and/or cycle, of hydrogen gas onboarding and storage 281. (I.e., the transition from step 281 along the "NO" branch.)

On the other hand, if the storage tank into which hydrogen gas was transferred from the pressure-resistant caching chamber (139 in FIG. 9) during the execution, completion, realization, and/or achievement, of the prior transfer of hydrogen gas, has been filled and is incapable of storing additional hydrogen gas (i.e., the transition from step 281 along the "YES" branch), then if there remains sufficient room, space, and/or displaceable water, within another storage tank 282, in which additional hydrogen gas may be stored during a future such transfer, then the embodiment may complete another iteration, round, and/or cycle, of hydrogen gas onboarding and storage. (I.e., the transition from step 282 along the "YES" branch, and from step 283 along the "OK" branch.)

If there is not sufficient space remaining in the storage tank into which hydrogen gas was stored in order to execute, complete, realize, and/or achieve, the prior transfer of hydrogen gas, and there is not sufficient space remaining in any other storage tank, 282 then the embodiment is no longer able to receive and store additional hydrogen gas 280, and the embodiment must therefore stop such onboarding activity (i.e., the transition from step 282 along the "NO" branch).

After the embodiment has onboarded and stored its maximum capacity of hydrogen gas, it may then transport its stored supply of hydrogen gas to an external consumer of hydrogen gas, e.g., another vessel, a land-based electrical utility, and/or a chemical fuel production facility.

If the embodiment has sufficient remaining pressurized air, and sufficient space in which to store additional hydrogen gas, and therefore remains able to receive and store additional hydrogen gas, then the embodiment may return to step 272 and repeat the hydrogen gas onboarding and storage steps 273-280. The embodiment may continue receiving and storing additional hydrogen gas until it reaches step 280, after which it will be unable to store additional gas. (The embodiment may fill its pressure-resistant caching chamber (139 in FIG. 9) one last time in order to receive and store that last quantity, volume, and/or amount, of hydrogen gas.)

Figure 15:
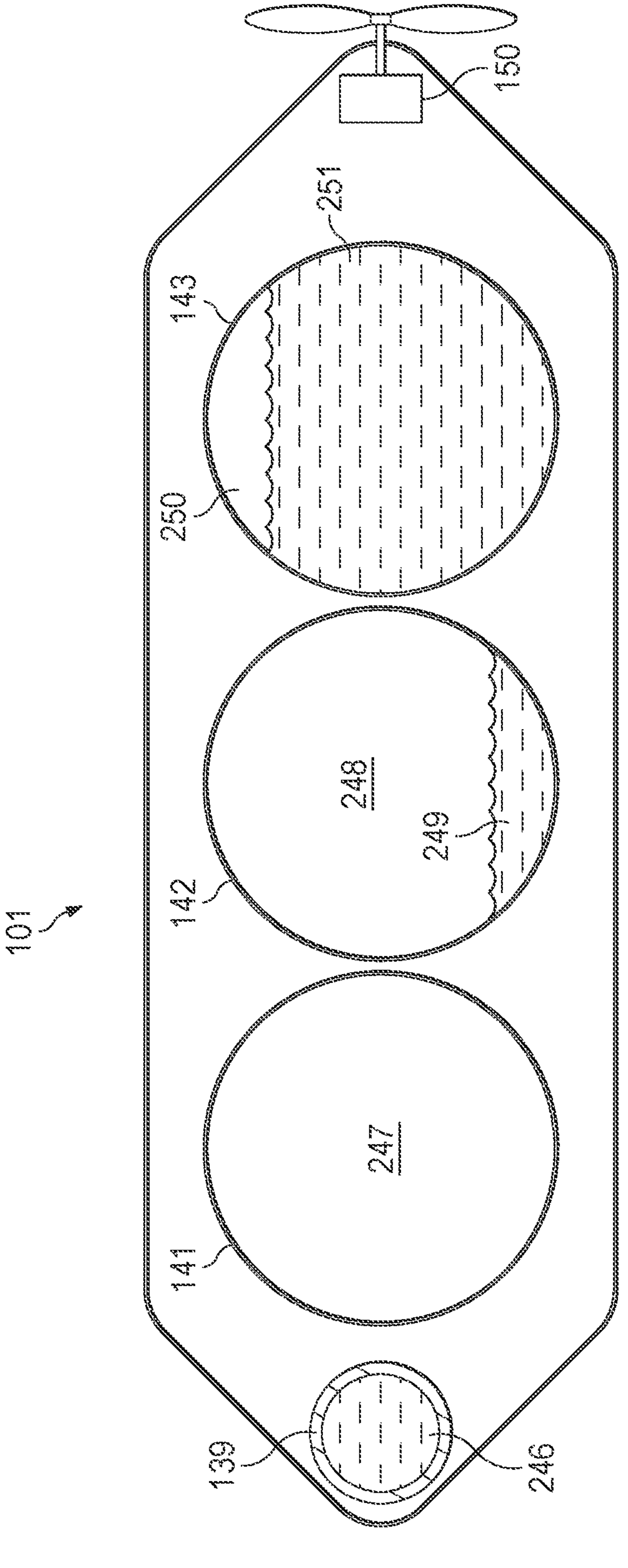
FIG. 15 is a diagrammatic closeup side sectional view of the hydrogen storage vessel of the embodiment of FIG. 1.

FIG. 15 shows a simplified diagrammatic illustration of a first step, state, phase, and/or configuration, in the hydrogen-gas onboarding and storage operation of the embodiment of the present invention that is illustrated in FIGS. 1-10. Illustrated in FIG. 15 is a simplified diagrammatic side sectional view of the hydrogen storage vessel 101 wherein the section plane is taken along section line 9-9 of FIGS. 7 and 8.

FIGS. 15-20 are simplified in order to more clearly illustrate the operational stages, steps, states, phases, and/or configurations, by which the embodiment receives hydrogen gas from an external and/or separate hydrogen gas production and/or storage apparatus (not visible), and/or from an external supplier of hydrogen gas, and processes that gas, and stores that gas, within its hydrogen gas storage apparatus, e.g., 141-143.

FIG. 15 illustrates the state and/or configuration of the embodiment when its hydrogen-gas onboarding and storage operation is at step 272 of the hydrogen-gas onboarding and storage method specified in FIG. 14.

In an embodiment, before the hydrogen storage vessel 101 has received any hydrogen gas from an external gas production and/or storage apparatus (not visible), it is initialized to a first hydrogen-gas onboarding configuration characterized by a water-filled 246 pressure-resistant caching chamber 139, a pressurized oxygen-filled 247 first gas storage tank 141, a second gas storage tank 142 containing pressurized air 248 and water 249, and a third gas storage tank 143 containing pressurized hydrogen gas 250 and water 251.

The initial volume 250, amount, and/or quantity, of pressurized hydrogen gas stored within the embodiment's third gas storage tank 143, and the initial volume 247, amount, and/or quantity, of pressurized oxygen stored within the embodiment's first gas storage tank 141, allows the fuel cell (not shown, 151 in FIG. 9) to generate electrical power with which it can energize its various valves (not shown, 153-176 in FIG. 9), its primary-propeller motor 150, its yaw propeller (not shown, 126 in FIG. 9), its inertial measurement unit (IMU) (not shown, 152 in FIG. 9), and its bi-directional water pump (not shown, 149 in FIG. 9).

Figure 16:
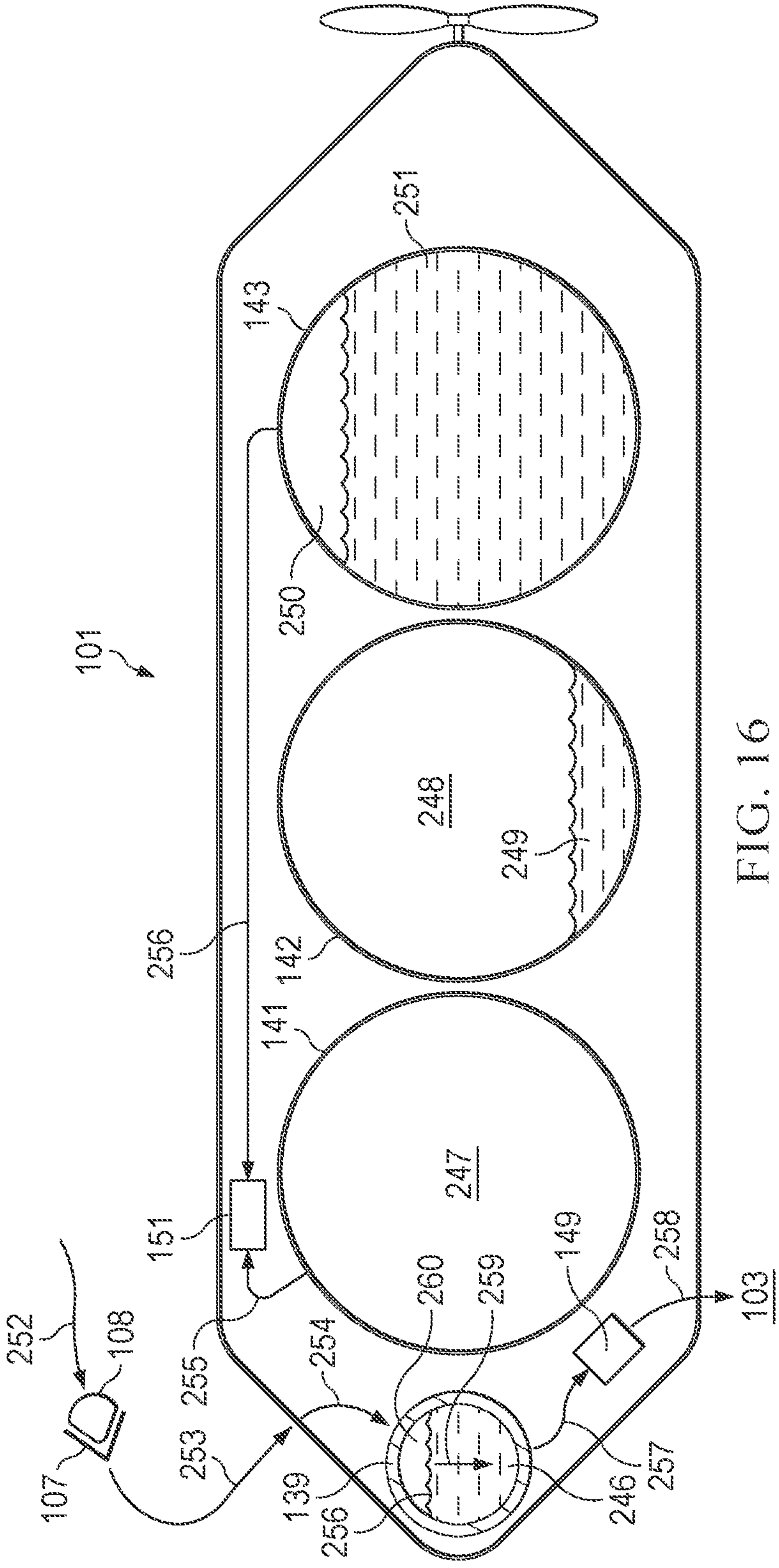
FIG. 16 is a diagrammatic closeup side sectional view of the hydrogen storage vessel of the embodiment of FIG. 1.

FIG. 16 shows a simplified diagrammatic illustration of the execution of two steps (273 and 274 in FIG. 14), and/or tasks, in the hydrogen-gas onboarding and storage operation of the embodiment of the present invention that is illustrated in FIGS. 1-10. Illustrated in FIG. 16 is a simplified diagrammatic side sectional view of the hydrogen storage vessel 101 wherein the section plane is taken along section line 9-9 of FIGS. 7 and 8.

FIG. 16 illustrates the operations executed by the embodiment during its execution and/or completion of steps 273 and 274 of the hydrogen-gas onboarding and storage method specified in FIG. 14.

All valves (not visible, 153-176 in FIG. 9) not specified as being in an open configuration are closed.

In an embodiment, the initiation of a hydrogen-gas receiving and storage cycle begins with the "bobble" receiving port 107 of the embodiment's ROV (not visible, 104 in FIG. 9) fluidly connecting the embodiment's gas transmission hose (not visible, 105 in FIG. 9) to the bobble gas exchange connector 108, and therethrough to the gas exchange hose (not visible, 109 in FIG. 9), of an external hydrogen gas production and/or storage apparatus (not visible).

Following the completion of that fluid connection, the embodiment's bi-directional water pump 149 is energized with electrical power supplied by the embodiment's fuel cell 151.

The fuel cell 151 produces electrical power when it receives a flow 255 of oxygen 247 from the first gas storage tank 141 and a flow of hydrogen 250 from the third gas storage tank 143. When operational, the fuel cell charges and/or recharges a battery (not shown) with which electronic and/or electrical components and/or devices of the embodiment, e.g., of the hydrogen storage vessel 101, may be energized when the fuel cell is not producing electrical power.

Oxygen 247 flows from an interior of the first gas storage tank 141 into an oxygen outflow mouth (not visible, 202 in FIG. 9) of a pipe segment (not visible) fluidly connecting the oxygen outflow mouth to an open oxygen outflow valve (not visible, 159 in FIG. 9), and therethrough into and through an air outflow pipe (not visible, 184 in FIG. 9), and therethrough into and through an open fuel-cell oxygen inflow valve (not visible, 158 in FIG. 9), and then into an oxygen inlet port (not shown) of the fuel cell (not visible, 151 in FIG. 9).

Hydrogen (gas) 250 flows from an interior of the third gas storage tank 143 into a third tank hydrogen transmission mouth (not visible, 210 in FIG. 9) of a pipe segment (not shown) fluidly connecting the hydrogen transmission mouth to an open third tank hydrogen transmission valve (not visible, 163 in FIG. 9), and therethrough into and through a hydrogen transmission pipe (not visible, 186/183/182 in FIG. 9), and then into and through an open fuel-cell hydrogen inflow valve (not visible, 157 in FIG. 9), and then into a hydrogen inlet port (not shown) of the fuel cell 151.

Following its actuation and/or energization, e.g., with electrical power provided by the fuel cell 151, the embodiment's bi-directional water pump 149 causes water 246 to flow 257 from an interior of the pressure-resistant caching chamber 139 and into its internal pumping mechanism.

Bi-directional water pump 149 pumps, pulls, removes, and/or causes to flow 257, water 246 from an interior of the pressure-resistant caching chamber 139, and pulls that water into and through a caching chamber water mouth (not visible, 218 in FIG. 9), and therethrough into and through of a pipe segment (not shown) fluidly connecting the caching chamber water mouth and therethrough into and through an open caching chamber water transmission valve (not visible, 176 in FIG. 9), and therethrough into and through a pipe segment (not visible, 197 in FIG. 9) fluidly connecting the caching chamber water transmission valve to a first port (not shown) of the bi-directional water pump.

Following its actuation and/or energization, e.g., with electrical power provided by the fuel cell 151, the embodiment's bi-directional water pump 149 causes water to flow 258 out from its internal pumping mechanism and into the body of water (103 in FIG. 3) in which the hydrogen storage vessel 101 is submerged.

Water pumped into and through the first port (not shown) of the bi-directional water pump 149, is, by the pumping action of the energized bi-directional water pump, pumped through the bi-directional water pump and out of a second port (not shown) of the bi-directional water pump.

Water pumped out of the second port (not shown) of the bi-directional water pump, is pumped, pushed, and/or inserted into and through, a water pipe (not visible, 196 in FIG. 9) and therethrough into and through an open first exterior water transmission valve (not visible, 173 in FIG. 9), and therethrough into and through a pipe segment (not shown) fluidly connecting the first exterior water transmission valve to the second water exchange port (not visible, 134 in FIG. 9), and therefrom out of the embodiment, and into the body of water (103 in FIGS. 3 and 11) in which the hydrogen storage vessel 101 is submerged.

As the embodiment's energized bi-directional water pump 149 pumps water 246 from the interior of the pressure-resistant caching chamber 139 and into the body of water 103 outside the hydrogen storage vessel 101, the reduction in pressure within the interior of the pressure-resistant caching chamber draws hydrogen gas from the external hydrogen gas production and/or storage apparatus (not shown) and into that depressurized pressure-resistant caching chamber.

Following the fluid connection of the embodiment's ROV (not visible, 104 in FIG. 9), and the gas transmission hose (not visible, 105 in FIG. 9) fluidly connected thereto, to the external hydrogen gas production and/or storage apparatus (not shown) via its gas exchange hose (not visible, 109 in FIG. 9) and bobble gas exchange connector 108, the partial vacuum created within the embodiment's pressure-resistant caching chamber 139 by and/or through the removal of water 246 from an interior of the pressure-resistant caching chamber by the embodiment's bi-directional water pump 149, draws hydrogen gas from the external hydrogen gas production and/or storage apparatus and into the pressure-resistant caching chamber, even if that hydrogen gas is of a lesser pressure than the ambient hydrostatic pressure outside the hydrogen storage vessel 101. As the bi-directional water pump causes the free surface 256 of water 246 within the pressure-resistant caching chamber to fall 259, hydrogen gas 260 is drawn from the external hydrogen gas production and/or storage apparatus (not shown) and into the pressure-resistant caching chamber.

In response to the partial vacuum created within the pressure-resistant caching chamber 139 through the removal 259 of water 246 from that pressure-resistant caching chamber, hydrogen gas flows from the external hydrogen gas production and/or storage apparatus (not shown), and flows 252 through the gas exchange hose (not visible, 109 in FIG. 9) of that external hydrogen gas production and/or storage apparatus, and therethrough into and through the bobble gas exchange connector 108 fluidly and physically connected to the gas exchange hose. Hydrogen gas then flows from the gas exchange connector into and through the "bobble" receiving port 107 of the embodiment's ROV (not visible, 104 in FIG. 9) and therethrough into and through 253 the embodiment's gas transmission hose (not visible, 105 in FIG. 9).

Hydrogen gas thereafter flows out of the embodiment's gas transmission hose (not visible, 105 in FIG. 9) and flows 254 into and through the embodiment's gas transmission hose connector (not visible, 106 in FIG. 9), and therethrough flows into and through a hydrogen gas connector pipe (not visible, 178 in FIG. 9), and therethrough flows into and through an open hydrogen gas connection valve (not visible, 153 in FIG. 9), and therethrough flows into and through a caching chamber gas pipe 177, and therethrough flows into and through a cached hydrogen mouth (not visible, 199 in FIG. 9) of the caching chamber gas pipe. Hydrogen gas flowing out of the mouth of the caching chamber gas pipe, flows into an interior 260 of the pressure-resistant caching chamber 139 where it replaces water 246 drawn out of the pressure-resistant caching chamber by the embodiment's bi-directional water pump 149.

If the pressure of the hydrogen gas provided to the embodiment by the external hydrogen gas production and/or storage apparatus is greater than the hydrostatic pressure of the water (103 in FIGS. 3 and 11) outside the hydrogen storage vessel 101, then the pressure of that hydrogen gas will be sufficient to push hydrogen gas into, and push water 246 out of, the pressure-resistant caching chamber 139, and, as a consequence of this, the bi-directional water pump 149 need not expend a significant amount of electrical energy removing water 246 from the pressure-resistant caching chamber. In most such cases, water 246 pressurized by relatively highly pressurized hydrogen gas will flow passively through the bi-directional water pump, thereby passively flowing from the interior of the pressure-resistant caching chamber and into the body of water 103.

The second operational stage of the hydrogen storage vessel 101 of the embodiment ends when the interior of the pressure-resistant caching chamber 139 is either filled with hydrogen gas (perhaps of a reduced pressure relative the hydrostatic pressure inside and outside the hydrogen storage vessel), or when the external hydrogen gas storage and/or consumption apparatus has yielded all of its available hydrogen gas, e.g., as signaled by a sudden reduction of the pressure of the hydrogen gas within the gas-exchange (not visible, 109 in FIG. 9) and gas-transmission (not visible, 105 in FIG. 9) hoses as detected by a gas pressure sensor within the embodiment's ROV (not visible, 104 in FIG. 9).

Figure 17:
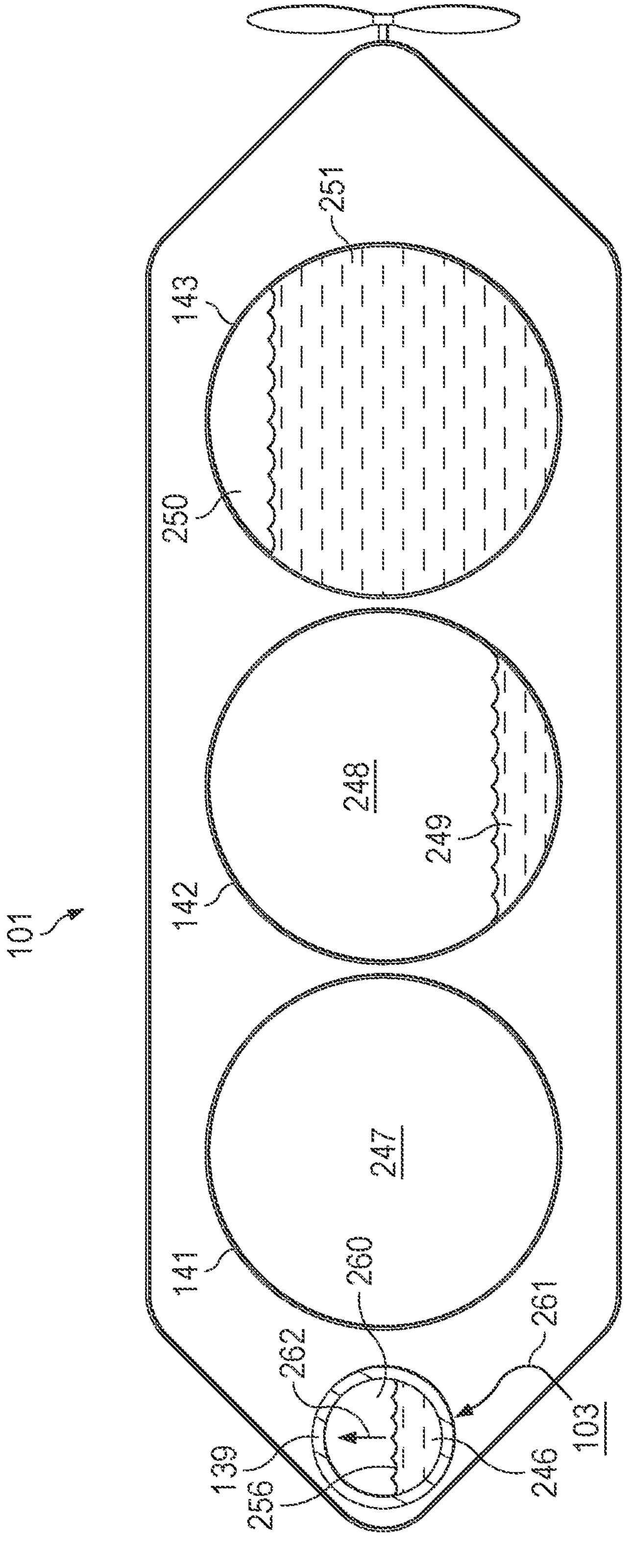
FIG. 17 is a diagrammatic closeup side sectional view of the hydrogen storage vessel of the embodiment of FIG. 1.

FIG. 17 shows a simplified diagrammatic illustration of the execution of a step (275 in FIG. 14), and/or task, in the hydrogen-gas onboarding and storage operation of the embodiment of the present invention that is illustrated in FIGS. 1-10. Illustrated in FIG. 17 is a simplified diagrammatic side sectional view of the hydrogen storage vessel 101 wherein the section plane is taken along section line 9-9 of FIGS. 7 and 8.

FIG. 17 illustrates the operations executed by the embodiment during its execution and/or completion of step 275 of the hydrogen-gas onboarding and storage method specified in FIG. 14.

All valves (not visible, 153-176 in FIG. 9) not specified as being in an open configuration are closed.

In an embodiment, after enough hydrogen gas to fill the interior of the embodiment's pressure-resistant caching chamber 139 has been drawn into the pressure-resistant caching chamber, or, after all of the hydrogen gas that the external hydrogen gas production and/or storage apparatus (not shown) is able to supply has been drawn into the pressure-resistant caching chamber, the embodiment's control system (not visible, 227 in FIG. 11) closes the open valves 153 and 173. It leaves open caching chamber water transmission valve (not visible, 176 in FIG. 9). And, it then opens second exterior water transmission valve (not visible, 174 in FIG. 9), thereby fluidly connecting the interior of the pressure-resistant caching chamber, which is fully or partially filled with hydrogen gas, with the water 103 outside the hydrogen storage vessel 101.

If the pressure of the hydrogen gas was, and/or is, less than the hydrostatic pressure of the water 103 outside the hydrogen storage vessel 101, then water 103 from outside the hydrogen storage vessel will flow 261 into the interior of the pressure-resistant caching chamber 139, thereby equalizing and/or equilibrating the pressure of the hydrogen gas with the hydrostatic pressure of the water 103 outside the hydrogen storage vessel.

When the pressure of the hydrogen gas within the interior of the pressure-resistant caching chamber 139 is less than the hydrostatic pressure of the water 103 outside the hydrogen storage vessel, water 103 from outside the hydrogen storage vessel 101 flows 261 into and through the first water exchange port (not visible, 130 in FIG. 9), and therethrough flows into and through a pipe segment (not shown) fluidly connecting the first water exchange port to an open second exterior water transmission valve (not visible, 174 in FIG. 9), and therethrough flows into and through water pipe (not visible, 197 in FIG. 9) to caching chamber water transmission valve (not visible, 176 in FIG. 9), and therethrough flows into and through caching chamber water mouth (not visible, 218 in FIG. 9), and therethrough into the interior of the pressure-resistant caching chamber, thereby causing the free surface 256 of the water 246 therein to rise 262, and thereby pressurizing the hydrogen gas 260 therein until the pressure of that hydrogen gas is approximately equal to the hydrostatic pressure of the water 103 outside the hydrogen storage vessel.

Figure 18:
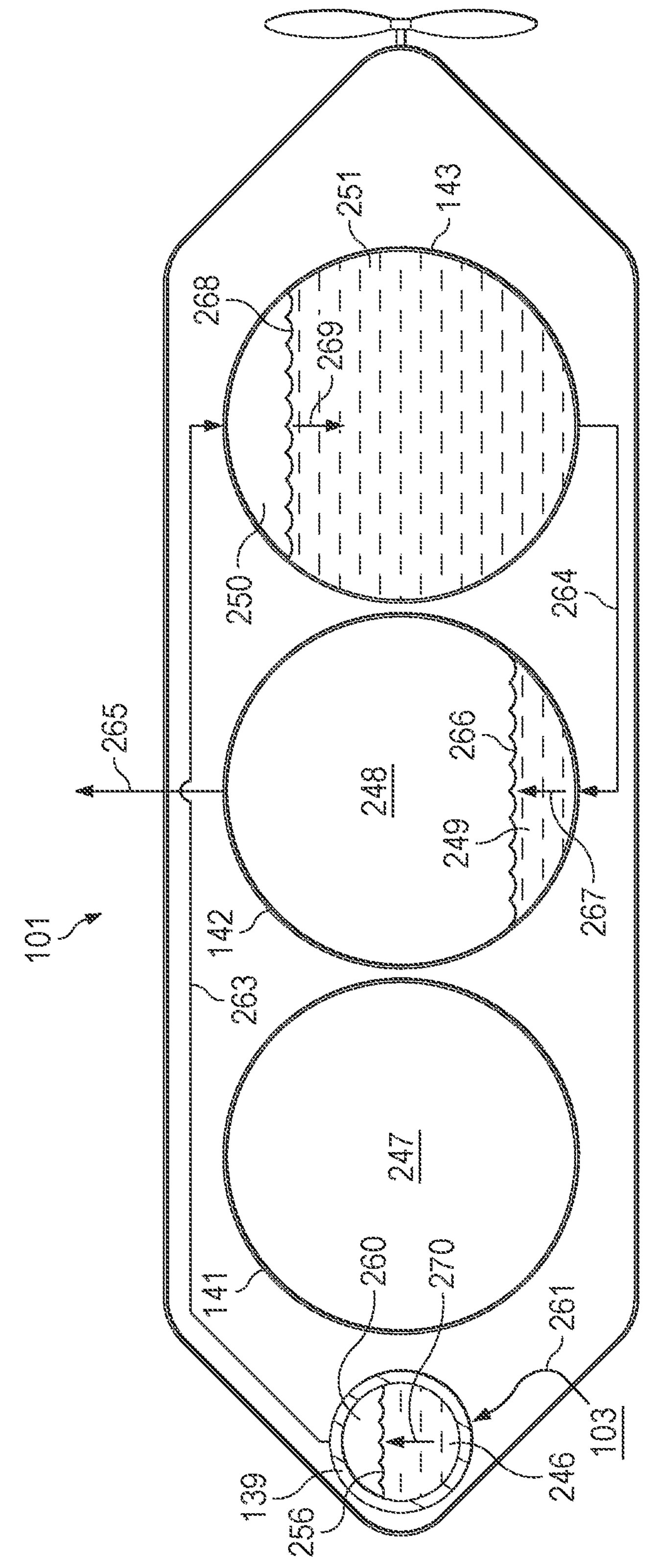
FIG. 18 is a diagrammatic closeup side sectional view of the hydrogen storage vessel of the embodiment of FIG. 1.

FIG. 18 shows a simplified diagrammatic illustration of the execution of a step (276 in FIG. 14), and/or task, in the hydrogen-gas onboarding and storage operation of the embodiment of the present invention that is illustrated in FIGS. 1-10. Illustrated in FIG. 18 is a simplified diagrammatic side sectional view of the hydrogen storage vessel 101 wherein the section plane is taken along section line 9-9 of FIGS. 7 and 8.

FIG. 18 illustrates the operations executed by the embodiment during its execution and/or completion of step 276 of the hydrogen-gas onboarding and storage method specified in FIG. 14.

All valves (not visible, 153-176 in FIG. 9) not specified as being in an open configuration are closed.

In an embodiment, after the pressure of the hydrogen gas 260 drawn into the pressure-resistant caching chamber 139 from the external hydrogen gas production and/or storage apparatus (not shown) has been, and/or become, equilibrated with the ambient hydrostatic pressure inside and outside the hydrogen storage vessel 101, during the execution of, and following the completion of, the third operational stage of the embodiment as illustrated in FIG. 17, then the fluid connection between the pressure-resistant caching chamber and the water 103 outside the hydrogen storage vessel 101 is maintained and/or continued such that water 103 from outside the hydrogen storage vessel may flow 261 into the pressure-resistant caching chamber as the hydrogen gas 260 within that pressure-resistant caching chamber is removed from the pressure-resistant caching chamber.

An upper portion of an interior 260 of the pressure-resistant caching chamber 139, i.e., a portion interfacing, and/or fluidly connected, with the hydrogen gas 260 within the pressure-resistant caching chamber, is fluidly connected 263 to an upper portion of an interior 250 of the embodiment's third gas storage tank 143 i.e., a portion interfacing, and/or fluidly connected, with the hydrogen gas 250 within the third gas storage tank. And, a lower portion of an interior of the third gas storage tank, i.e., a portion interfacing, and/or fluidly connected, with the water 251 within the third gas storage tank, is fluidly connected to a lower portion of an interior of the second gas storage tank 142, i.e., a portion interfacing, and/or fluidly connected, with the water 249 within the second gas storage tank.

After the realization, consummation, and/or creation, of the fluid interconnections of the interiors of the pressure-resistant caching chamber 139, the third gas storage tank 143, and the second gas storage tank 142, an upper portion of the second gas storage tank, i.e., a portion interfacing, and/or fluidly connected, with the compressed air 248 within the second gas storage tank, is fluidly connected 265 to the atmosphere (not visible, above and outside the spar buoy 102 in FIG. 11) through the pressurized air ventilation pipe 110.

As pressurized air vents, leaks, and/or is released, to the atmosphere through the pressurized air ventilation pipe 110, the resulting reduction in the pressure of the air 248 remaining within the second gas storage tank 142, causes water 251 to be drawn from the third gas storage tank 143 and to be added to the water 249 already within the second gas storage tank, thereby causing a free surface 266 of the water 249 within the second gas storage tank to rise 267. As water 251 is removed and/or syphoned from the third gas storage tank, a free surface 268 falls 269. As the volume of water 251 within the third gas storage tank is reduced, and as the free surface 268 of that water falls 269, the hydrogen gas 250 within an upper portion of that third gas storage tank is reduced, thereby causing the relatively more-highly pressurized hydrogen gas 260 within the pressure-resistant caching chamber 139 to flow from the pressure-resistant caching chamber and into the third gas storage tank.

As hydrogen gas 260 flows from the pressure-resistant caching chamber 139 and into the third gas storage tank 143, the pressure of that hydrogen gas 260 is reduced, causing water 103 to be drawn 261 into the pressure-resistant caching chamber from outside the hydrogen storage vessel 101 in order to equalize and/or equilibrate the pressure of the remaining hydrogen gas 260 with the hydrostatic pressure of the water 103 outside the hydrogen storage vessel. As hydrogen gas 260 is removed from the pressure-resistant caching chamber, and is replaced with water 246 from outside 103 the hydrogen storage vessel, a free surface 256 of the water 246 within that pressure-resistant caching chamber rises 270.

This transfer 263 of hydrogen gas 260 from the pressure-resistant caching chamber 139 to, and into, the third gas storage tank 143, continues, and/or is allowed by the control system (not visible, 227 in FIG. 11) to continue, until approximately all of the hydrogen gas 260 within the pressure-resistant caching chamber has been moved, and/or removed, from the interior of the pressure-resistant caching chamber, and moved, and/or added, to the hydrogen gas 250 within the third gas storage tank 143. And the movement, and/or transfer, of that volume of hydrogen gas 260 from the pressure-resistant caching chamber to the third gas storage tank is accomplished through a venting to the atmosphere of an approximately equal volume of compressed air 248 from the second gas storage tank 142, and through a corresponding, and/or concomitant, transfer of an approximately equal volume of water 251 from the third gas storage tank 143 to the water 249 of the second gas storage tank.

After approximately all of the hydrogen gas 260 has been transferred from the pressure-resistant caching chamber 139 to the third gas storage tank 143, the fluid connection 265 of the upper, air-containing, interior of the second gas storage tank 142 to the atmosphere above and outside the embodiment's spar buoy (not visible, 102 in FIG. 11) is broken, and the venting of additional compressed air 248 from that second gas storage tank is stopped.

Driven by the loss of pressure within the air pocket 248 of the second gas storage tank 142, caused by the venting of a portion of that air 248 to the atmosphere above the body of water ((103 in FIGS. 3 and 11), and the concomitant loss of pressure within the pocket of hydrogen gas 250 of the third gas storage tank 143, caused by the transfer of a portion of the water reservoir 251 of the third gas storage tank to the water reservoir 249 of the second gas storage tank, and the concomitant loss of pressure within the pocket of hydrogen gas 260 of the pressure-resistant caching chamber 139, caused by the transfer of a portion of that hydrogen gas 260 to the third gas storage tank, water from outside the hydrogen storage vessel 101 flows 261 into an interior of the pressure-resistant caching chamber.

Water 103 from outside the hydrogen storage vessel 101 flows 261 into and through the first water exchange port (not visible, 130 in FIG. 9), and therethrough flows into and through a pipe segment (not shown) fluidly connecting the first water exchange port to an open second exterior water transmission valve (not visible, 174 in FIG. 9), and therethrough flows into and through water pipe (not visible, 197 in FIG. 9) to an open caching chamber water transmission valve (not visible, 176 in FIG. 9), and therethrough flows into and through caching chamber water mouth (not visible, 218 in FIG. 9), and therethrough into the interior of the pressure-resistant caching chamber, thereby causing the free surface 256 of the water 246 therein to rise 270, and thereby re-pressurizing, preserving, and/or maintaining, the pressure of the hydrogen gas 260 therein as hydrogen gas flows out of the pressure-resistant caching chamber 139 and therefrom flows into the third gas storage tank 143.

Driven by the loss of pressure within the air pocket 248 of the second gas storage tank 142, caused by the venting of a portion of that air 248 to the atmosphere above the body of water ((103 in FIGS. 3 and 11), and the concomitant loss of pressure within the pocket of hydrogen gas 250 of the third gas storage tank 143, caused by the transfer of a portion of the water reservoir 251 of the third gas storage tank to the water reservoir 249 of the second gas storage tank, hydrogen gas 260 flows out of the pressure-resistant caching chamber 139 and therefrom flows into the third gas storage tank 143.

Hydrogen gas 260 flowing from the pressure-resistant caching chamber 139, and flowing therefrom into the third gas storage tank 143, flows into and through a cached hydrogen mouth (not visible, 199 in FIG. 9), and therethrough flows into and through the caching chamber gas pipe (not visible, 177 in FIG. 9), and therethrough flows into and through a first hydrogen transmission pipe (not visible, 179 in FIG. 9), and therethrough flows into and through an open hydrogen transfer valve (not visible, 154 in FIG. 9), and therethrough flows into and through a second hydrogen transmission pipe (not visible, 181 in FIG. 9), and therethrough flows into and through a third hydrogen transmission pipe (not visible, 183 in FIG. 9), and therethrough flows into and through a fourth hydrogen transmission pipe (not visible, 186 in FIG. 9), and therethrough flows into and through an open third tank hydrogen transmission valve (not visible, 163 in FIG. 9), and therethrough flows into and through a third tank hydrogen transmission mouth (not visible, 210 in FIG. 9), and therethrough flows into, and is stored within, the third gas storage tank 143.

Driven by the loss of pressure within the air pocket 248 of the second gas storage tank 142, caused by the venting of a portion of that air 248 to the atmosphere above the body of water ((103 in FIGS. 3 and 11), a portion of the water reservoir 251 of the third gas storage tank flows 264 to the water reservoir 249 of the second gas storage tank.

Water 251 flowing from the third gas storage tank 143, and therefrom flowing into, and being added to, the water 249 of the second gas storage tank 142 flows into and through a third tank water mouth (not visible, 214 in FIG. 9), and therethrough flows into and through an open third tank water valve (not visible, 167 in FIG. 9), and therethrough flows into and through a first water connector pipe (not visible, 190 in FIG. 9), and therethrough flows into and through a second water connector pipe (not visible, 192 in FIG. 9), and therethrough flows into and through an open second tank water valve (not visible, 169 in FIG. 9), and therethrough flows into and through a second tank water mouth (not visible, 216 in FIG. 9), and therethrough flows into the second gas storage tank (not visible, 142 in FIG. 9) where it is added to, increases the volume of, and/or joins, the water reservoir 249 therein.

Pressurized air 248 flowing from an interior of the second gas storage tank 142, and therefrom flowing into the atmosphere outside and above the embodiment's spar buoy (not visible, 102 in FIGS. 1-7), flows into and through a second tank air mouth (not visible, 206 in FIG. 9), and therethrough flows into and through an open second tank air transmission valve (not visible, 160 in FIG. 9), and therethrough flows into and through an air outflow pipe (not visible, 184 in FIG. 9), and therethrough flows into and through an air vent bridging aperture (not visible, 205 in FIG. 9), and therethrough flows into and through an air vent bridging pipe (not visible, 185 in FIG. 9), and therethrough flows into and through the pressurized air ventilation pipe 110 (not visible, 110 in FIG. 9), and therethrough flows into and through the pressurized air exhaust port 111 (not visible, 111 in FIG. 11), and therethrough flows into the atmosphere outside and above the spar buoy (not visible, 102 in FIGS. 1-7).

After the execution, achievement, and/or completion, of operational stages one through four, the embodiment is returned to the first operational stage, step, state, phase, and/or configuration, and/or is again initialized and ready to execute the second operational stage. However, after the execution, and/or completion, of operational stages, steps, states, phases, and/or configurations, one through four, the volume, mass, and/or moles, of hydrogen gas 250 stored, captured, trapped, included, and/or enclosed, within the third gas storage tank 143, is greater than it was at the first operational stage, prior to the execution of operational stages two through four. The volume, mass, and/or moles, of water 251 within the water reservoir of the third gas storage tank 143, is also lesser, and by approximately the same volume.

Similarly, and in complementary fashion, the volume, mass, and/or moles, of compressed air 248 stored, captured, trapped, included, and/or enclosed, within the second gas storage tank 142, is greater than it was at the first operational stage, prior to the execution of operational stages two through four. The volume, mass, and/or moles, of water 249 within the water reservoir of the second gas storage tank 142, is also greater, and by approximately the same volume.

Thus, the venting of a volume of compressed air 248 from the second gas storage tank 142 resulted in the addition of an approximately equal volume of compressed hydrogen gas 250 to the third gas storage tank 143. And, to an approximate degree, the only electrical power consumed during the execution of operational stages two through four, was the energization and operation of the bi-directional water pump (not visible, 149 in FIG. 9), and the opening and closing of a plurality of valves.

While there remains pressurized air 248 within the second storage tank 142, and while there remains available space (i.e., as water 251 that remains displaceable for the purpose of drawing into the third storage tank additional hydrogen gas) within the third storage tank 143, then the embodiment's control system (not visible, 227 in FIG. 11) retains the option of returning to that step (272 of FIG. 14) of the hydrogen-gas onboarding and storage method specified in FIG. 14 at which begins a cycle of hydrogen gas onboarding and storage.

Figure 19:
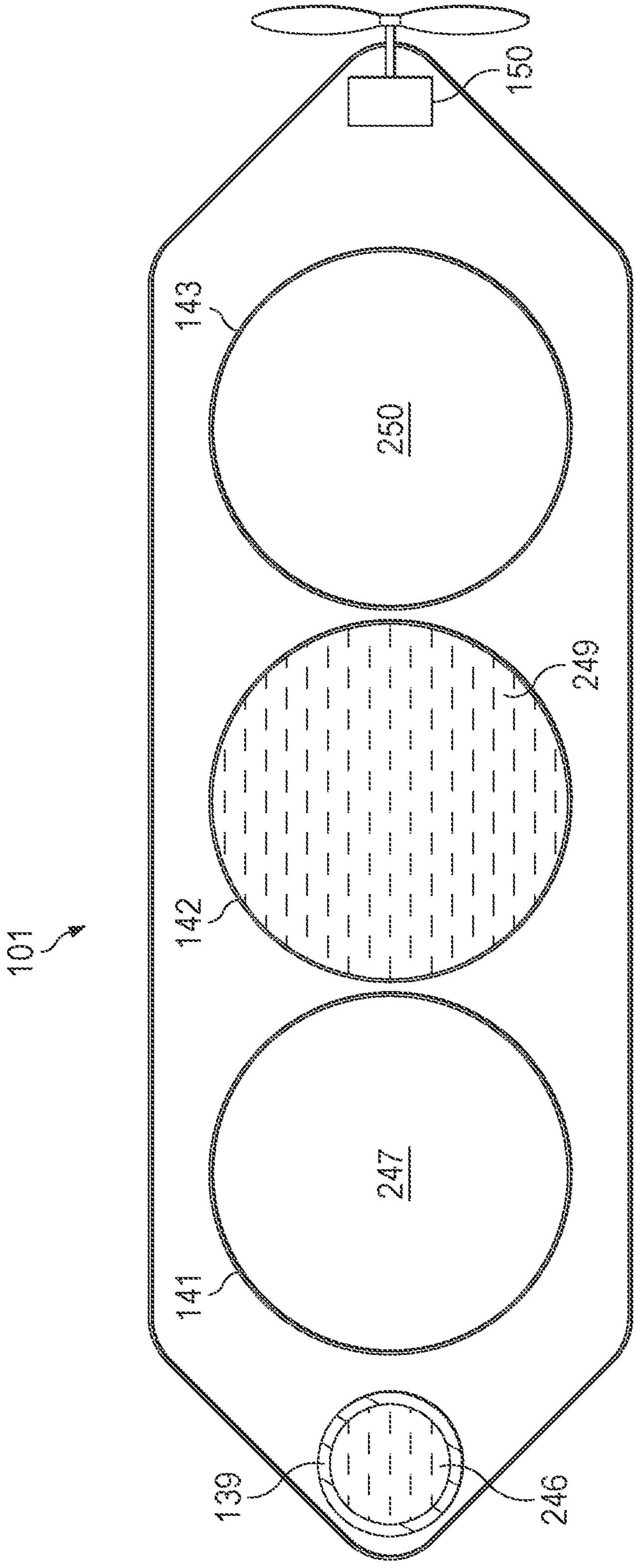
FIG. 19 is a diagrammatic closeup side sectional view of the hydrogen storage vessel of the embodiment of FIG. 1.

FIG. 19 shows a simplified diagrammatic illustration of a transitional step, state, phase, and/or configuration, in the hydrogen-gas onboarding and storage operation of the embodiment of the present invention that is illustrated in FIGS. 1-10. Illustrated in FIG. 19 is a simplified diagrammatic side sectional view of the hydrogen storage vessel 101 wherein the section plane is taken along section line 9-9 of FIGS. 7 and 8.

FIG. 19 illustrates the evaluations, determinations, and/or decisions, executed by the embodiment's control system (not visible, 227 in FIG. 11) during its execution of the hydrogen-gas onboarding and storage method specified in FIG. 14.

As will be observed in FIG. 19, the second storage tank 142, from which pressurized air (not visible, 248 in FIG. 15) was vented to the atmosphere in order to draw water (not visible, 251 in FIG. 15) from the third storage tank 143, and thereby to draw hydrogen gas from the pressure-resistant caching chamber 139 and into that third storage tank, is now completely filled with water that it has drawn from the third storage tank. Thus, there remains no pressurized air within the second storage tank which may be vented to the atmosphere in order to draw additional hydrogen gas out of the pressure-resistant caching chamber. Therefore, the answer to the question, "Is pressurized air exhausted" (277 in FIG. 14), is "YES."

As will be observed in FIG. 19, there remains within the first storage tank 141 a supply of pressurized oxygen 247 portions of which the embodiment's control system (227 in FIG. 11) may vent to the atmosphere in order to execute and/or realize a transfer of hydrogen gas from the pressure-resistant caching chamber 139 and into a storage tank. If the embodiment's control system determines that the amount of oxygen within the first storage tank exceeds the amount needed to energize, through the operation of the fuel cell (not visible, 151 in FIG. 9), the embodiment's electronic components, e.g., the control system, the communications module (not visible, 228 in FIG. 11), and the satellite communications antenna (not visible, 118 in FIG. 11), as well as the embodiment's primary-propeller motor 150, and its yaw propeller (not shown, 126 in FIG. 9). The control system must determine and/or estimate the amount of energy that may be required to propel itself to the geospatial location at which it will disgorge, offload, and/or transfer its store and/or load of hydrogen gas, and/or the amount of energy that may be required to propel itself to the geospatial location at which its store of oxygen 247 will be replenished.

If the embodiment's control system (not visible, 227 in FIG. 11) determines that a sufficient quantity, amount, and/or volume, of its supply of pressurized oxygen 247 in its first storage tank 141 exceeds the amount that it will require in order to complete its future operations, e.g., until it can replenish its supply of pressurized oxygen, then the answer to the question, "Is additional pressurized air available in another tank?" 278, is "YES." And, the control system determines to proceed (i.e., via branch "OK" leading from step 279 to step 281 in FIG. 14) to a determination of whether or not it retains sufficient space in which to store additional hydrogen gas (i.e., step 281).

If the embodiment's control system (not visible, 227 in FIG. 11) determines that the amount of pressurized oxygen 247 remaining in its first storage tank 141 is required in order to satisfy its anticipated energy requirements, then the answer to the question, "Is additional pressurized air available in another tank?" 278, is "NO." And, the control system determines to proceed (i.e., via branch "NO" leading from step 278 to step 280 in FIG. 14) to a cessation of onboarding and storage of any additional hydrogen gas.

As will be observed in FIG. 19, the third storage tank 143 has been completely filled with hydrogen gas 250, and is therefore unable to host, contain, and/or store, any additional hydrogen gas. Therefore, the answer to the question, "Is hydrogen storage tank filled?" 281, is "YES."

However, as will be observed in FIG. 19, the exhaustion of the supply of pressurized air (not visible, 248 in FIG. 15) has resulted in the complete filling of the second storage tank 142 with water 249 that was drawn from the third storage tank in order to cause hydrogen gas to flow into it from the pressure-resistant caching chamber 139. Thus, the second storage tank may now be used to host, contain, and/or store, additional hydrogen gas (in the event that the embodiment onboards any additional hydrogen gas). Therefore, the answer to the question, "Is another hydrogen storage tank unfilled?" 282, is "YES." And, the control system may elect to proceed to the initiation of another cycle (beginning at step 272 of FIG. 14) of hydrogen gas onboarding and storage (i.e., via branch "OK" leading from step 283 to step 272 in FIG. 14).

If the control system (not visible, 227 in FIG. 11) were to determine that the embodiment lacked sufficient space in which to store additional hydrogen gas, then it would cease the onboarding and storage of additional hydrogen gas (i.e., via branch "NO" leading from step 282 to step 280 in FIG. 14).

The configuration of the embodiment illustrated in FIG. 19 represents a completion of an iterative execution the steps 272-276 outlined in FIG. 14, and this iteration of the cyclical steps involved in onboarding and storing hydrogen gas utilizing the pressurized air vented from a particular storage tank, e.g., the second storage tank 142 in FIGS. 14-17, and utilizing the storage capacity of a particular storage tank, e.g., the third storage tank 143 in FIGS. 14-17, continues until the process reaches steps 278 and/or 282, at which point alternate sources of pressurized air (if any) and alternate unfilled hydrogen gas storage containers (if any) are used in a resumption and/or continuation of an iterative execution the steps 272-276 outlined in FIG. 14.

Only when the embodiment runs out of available pressurized gas (air or oxygen), and/or runs out of available space in which to store additional hydrogen gas, does the cyclical process of onboarding and storage of hydrogen gas stop.

With respect to an embodiment configuration such as that illustrated in FIG. 19, the hydrogen-gas onboarding and storage methodology illustrated and/or outlined in FIG. 14 will continue (to the extent that the control system (not visible, 227 in FIG. 11) determines that a portion of the pressurized oxygen stored within the first storage tank 141 is not needed for energy production), and pressure-balanced and/or equilibrated hydrogen gas will be transferred from the pressure-resistant caching chamber 139 to and/or into the second storage tank 142, and a venting to the atmosphere of oxygen 247 from the first storage tank 141 will be used to achieve the transfer of the hydrogen gas from the pressure-resistant caching chamber to the second storage tank.

An embodiment similar to the one illustrated in FIGS. 1-18 utilizes a first storage tank filled with pressurized air instead of with pressurized oxygen. This embodiment utilizes energy produced and/or provided by the fuel cell (not visible, 230 in FIG. 11) within the embodiment's spar buoy (not visible, 102 in FIGS. 1-7 and FIG. 11). The fuel cell within the embodiment's spar buoy uses hydrogen received from the embodiment's third storage tank 143 through the pressurized hydrogen supply pipe (not visible, 112 in FIG. 11), and air, either following its release from storage tanks as pressurized air being vented to the atmosphere, or received from the atmosphere through an upper portion of the pressurized air ventilation pipe (not visible, 110 in FIG. 11). This embodiment is able to utilize all of the pressurized air within its first and second storage tanks in order to effectuate the transfer of hydrogen gas from the pressure-resistant caching chamber 139 and into a storage tank, and this embodiment is able to store hydrogen gas, and/or fill with hydrogen gas, its second and third storage tanks.

Figure 20:
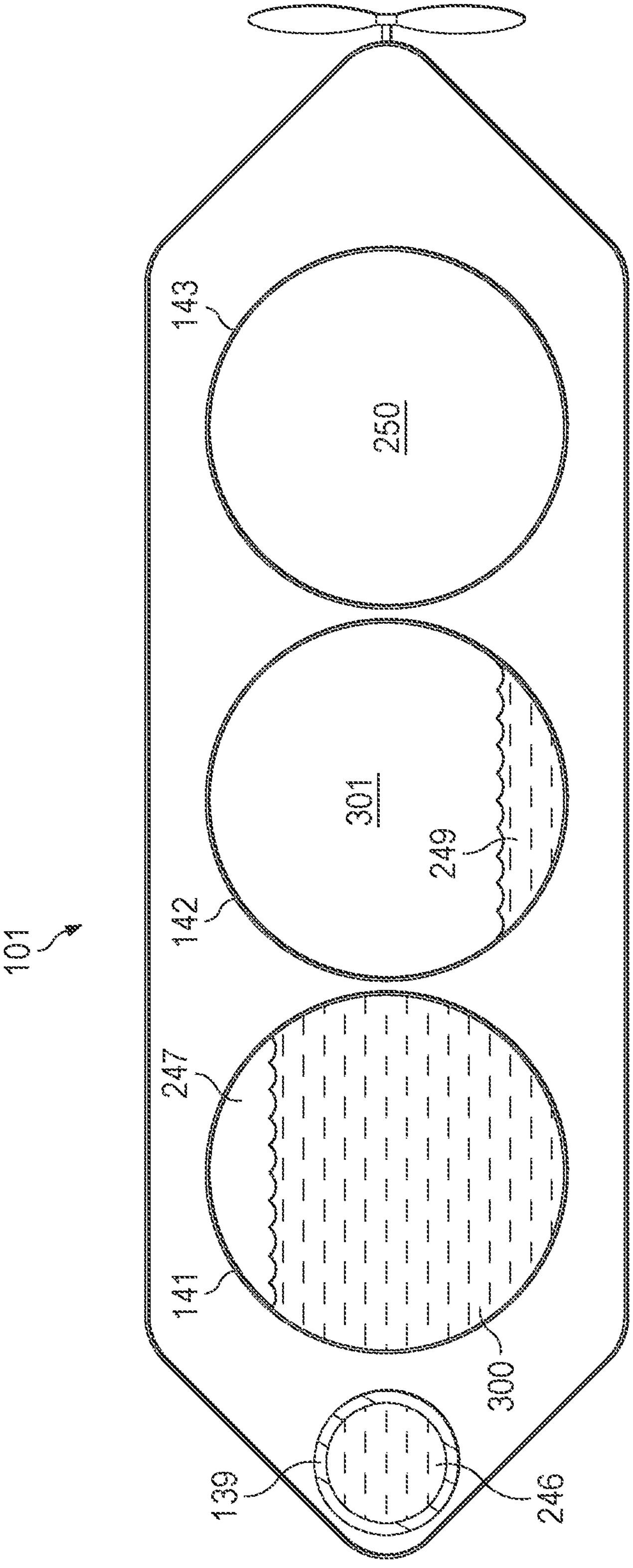
FIG. 20 is a diagrammatic closeup side sectional view of the hydrogen storage vessel of the embodiment of FIG. 1.

FIG. 20 shows a simplified diagrammatic illustration of a transitional step, state, phase, and/or configuration, in the hydrogen-gas onboarding and storage operation of the embodiment of the present invention that is illustrated in FIGS. 1-10. Illustrated in FIG. 20 is a simplified diagrammatic side sectional view of the hydrogen storage vessel 101 wherein the section plane is taken along section line 9-9 of FIGS. 7 and 8.

FIG. 20 illustrates the state and/or configuration of the embodiment when its hydrogen-gas onboarding and storage operation is at step 280 of the hydrogen-gas onboarding and storage method specified in FIG. 14. In order to transition from the configuration illustrated in FIG. 15 to the configuration illustrated in FIG. 19, the embodiment has vented all of its original store of pressurized air (not visible, 248 in FIG. 15) from the second gas storage tank 142, thereby filling that second gas storage tank with water 249 drawn from the third gas storage tank 143, and the embodiment has used that venting action in order to incrementally draw hydrogen gas from the pressure-resistant caching chamber 139 and into the third gas storage tank, thereby eventually filling that third gas storage tank with hydrogen gas 250. In order to transition from the configuration illustrated in FIG. 19 to the configuration illustrated in FIG. 20, the embodiment has vented a portion of its original store of oxygen (247 in FIG. 19) from the first gas storage tank 141, thereby filling a portion of equal volume to that of the vented oxygen with water 300 drawn from the second gas storage tank 142, and the embodiment has used that venting action in order to incrementally draw hydrogen gas from the pressure-resistant caching chamber 139 and into the second gas storage tank, thereby eventually filling a portion of equal volume to that of the vented oxygen with hydrogen gas 301.

Figure 21A:
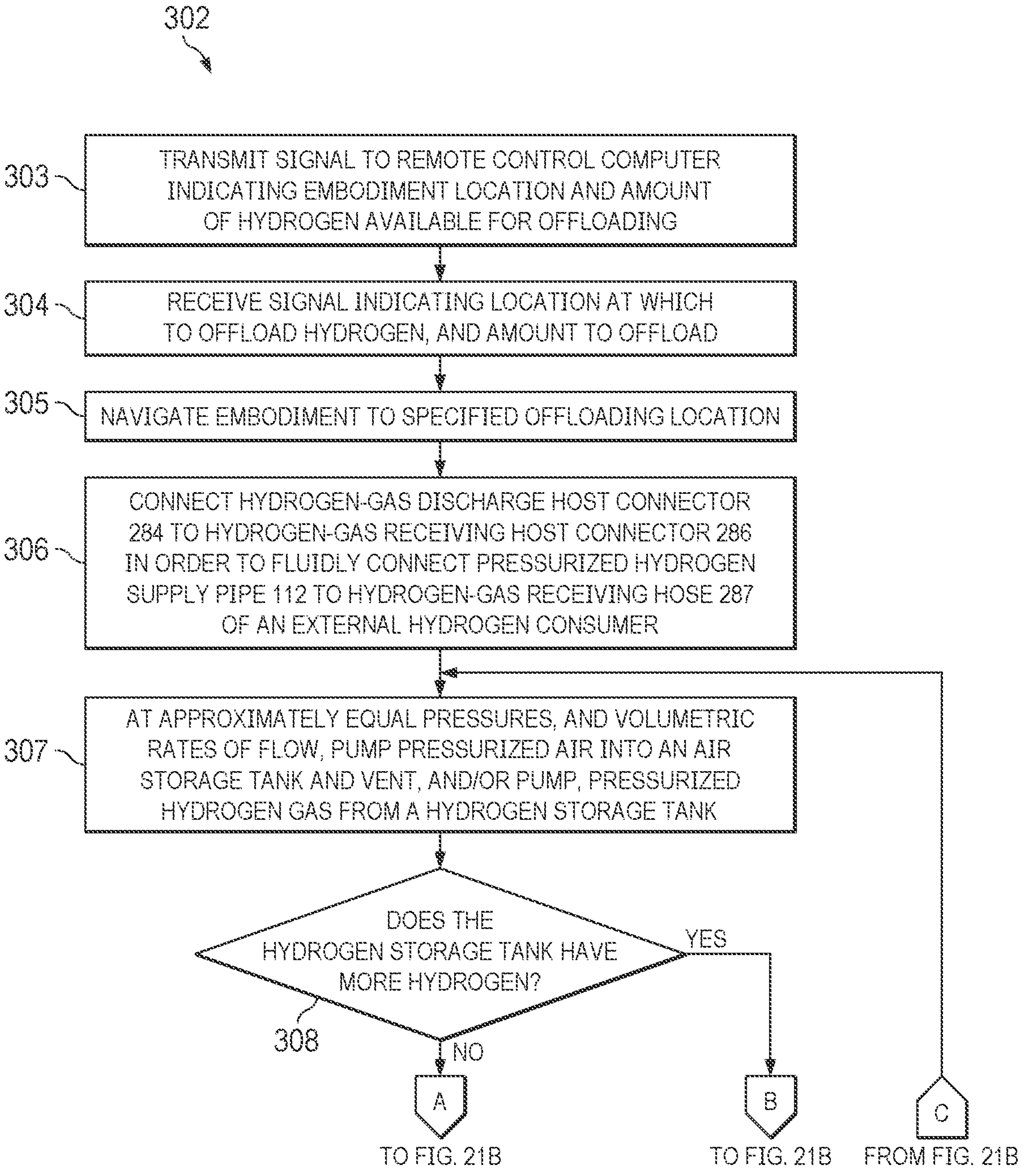
FIG. 21A and FIG. 21B are a flow chart describing a method of the embodiment of FIG. 1.
Figure 21B:
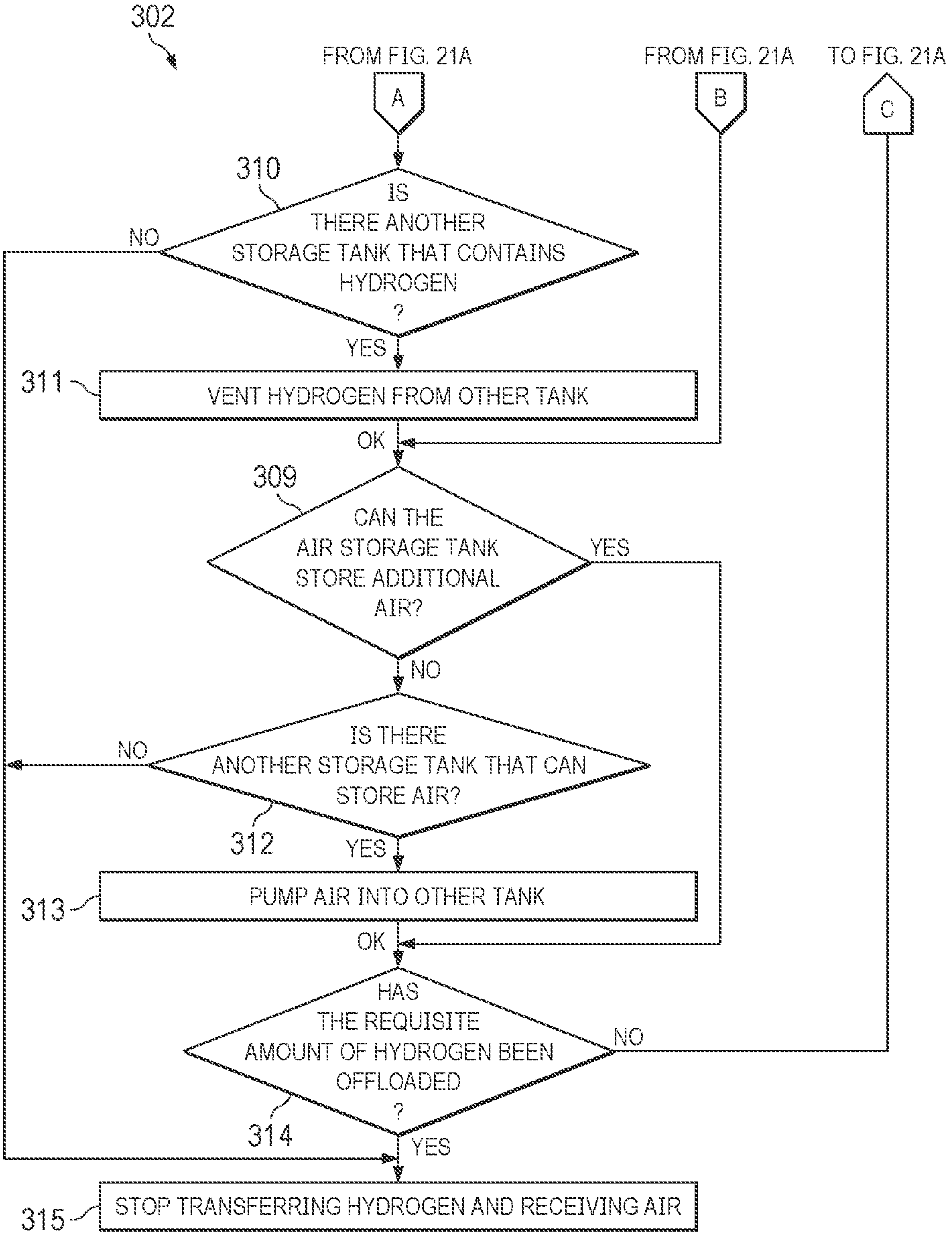

FIG. 21 shows a flowchart illustrating the method 302 and/or steps by which an embodiment of the present disclosure offloads, discharges, and/or transfers, to an external consumer and/or receiver of hydrogen gas, a portion of its store of hydrogen gas.

The embodiment illustrated in FIGS. 1-20 has two primary operational behaviors, activities, modes, and/or tasks. The first is to travel to, and fluidly connect to, external hydrogen gas producing and/or storage devices, e.g., those which capture a renewable energy, such as wind, wave, current, and/or solar, energies, and convert those energies to electrical power, and then use that electrical power to electrolytically synthesize hydrogen gases from water. Once connected to an external hydrogen gas production and/or storage apparatus, the embodiment removes hydrogen gas therefrom, and stores that received hydrogen gas within one or more of its gas storage tanks, e.g., 142 and 143 in FIG. 9.

As the embodiment seeks out external hydrogen gas producing and/or storage devices and receives from them, and stores, hydrogen gas, it periodically communicates with a remote coordinate computer and/or network via radio signals transmitted by its satellite communications antenna (not visible, 118 in FIG. 1) and/or by its radio antenna (not visible, 114 in FIG. 1). The embodiment informs the remote coordination computer of the quantity of hydrogen gas in its stores 303, its remaining unfilled hydrogen storage capacity, the amount of pressurized air remaining, its location, etc.

In turn, and/or in response, the remote coordination computer periodically communicates to the embodiment, via radio signals transmitted to its satellite communications antenna (not visible, 118 in FIG. 1) and/or to its radio antenna (not visible, 114 in FIG. 1), the locations of other external hydrogen gas producing and/or storage devices that are ready to have their stored hydrogen transferred to the embodiment, the location of external consumers of hydrogen ready to receive hydrogen from the embodiment, etc. The remote coordination computer also indicates to the embodiment, at least in the form of a recommended course of action, whether, in light of weather conditions, shipping traffic, etc., it would be best for the embodiment to continue gathering hydrogen from external hydrogen gas producing and/or storage devices, or to stop gathering hydrogen and navigate to the location of an external consumer of hydrogen and there transfer a portion of its stored hydrogen to the external consumer of hydrogen.

When the embodiment receives a specific signal 304, and/or when its internal control system (not visible, 227 in FIG. 11) so determines, then the embodiment stops collecting and storing hydrogen gas provided to it by external hydrogen gas producing and/or storage devices, and the embodiment energizes its primary-propeller motor (not visible, 150 in FIG. 9) in order to rotate the embodiment's primary propeller (not visible, 123 in FIG. 9) and propel the embodiment in a "forward" direction (not visible, 124 in FIG. 1). The embodiment uses its yaw propeller (not visible, 126 in FIG. 9) in order to orient the azimuthal direction in which the embodiment travels, thereby allowing the embodiment to navigate 305 to the location of a waiting external consumer of hydrogen.

Upon arrival at the location of the specified external consumer of hydrogen, the embodiment is fluidly connected 306 to both the external consumer of hydrogen, and to an external source of pressurized air and/or oxygen.

A hydrogen-gas receiving hose connector (not visible, 286 in FIG. 13), fluidly connected to an end of a hydrogen-gas receiving hose (not visible, 287 in FIG. 13), provides a fluid connection to the external consumer of hydrogen. And, when the hydrogen-gas receiving hose connector is connected to the embodiment's hydrogen-gas discharge hose connector (not visible, 284 in FIG. 13), then the embodiment and the external consumer of hydrogen are fluidly connected, and the external consumer of hydrogen is ready to receive hydrogen gas discharged by the embodiment into the hydrogen-gas receiving hose.

A pressurized-air discharge hose connector (not visible, 289 in FIG. 13), fluidly connected to an end of a pressurized-air discharge hose (not visible, 290 in FIG. 13), provides a fluid connection to an external source of pressurized air and/or oxygen. And, when the pressurized-air discharge hose connector is connected to the embodiment's pressurized-air receiving hose connector (not visible, 285 in FIG. 13), then the embodiment and the external source of pressurized air and/or oxygen are fluidly connected, and the embodiment is ready to receive pressurized air and/or oxygen discharged by the external source of pressurized air and/or oxygen from the pressurized-air discharge hose.

In one possible hydrogen transfer process and/or protocol, the embodiment opens the valves which permit pressurized hydrogen gas stored within its second gas storage tank (not visible, 142 in FIG. 9) to flow, at a particular volumetric rate of flow, into and through the hydrogen-gas discharge hose connector (not visible, 284 in FIG. 13) and therethrough into the hydrogen-gas receiving hose (not visible, 287 in FIG. 13) of the external consumer of hydrogen. At approximately the same time, the external source of pressurized air and/or oxygen pumps pressurized oxygen, at approximately the same pressure as that of the hydrogen gas flowing into and through the hydrogen-gas receiving hose, and, at approximately the same volumetric rate of flow as that of the hydrogen gas flowing into and through the hydrogen-gas receiving hose. Thus, pressurized oxygen is pumped into the embodiment (and stored within the embodiment's first gas storage tank) at approximately the same pressure and rate of flow 307 at which hydrogen flows out of the embodiment's second gas storage tank. This parity in the exchange of hydrogen for oxygen maintains the preferred buoyancy of the embodiment's hydrogen storage vessel (not visible, 101 in FIG. 9).

As the embodiment's exchange of stored hydrogen for pressurized oxygen continues, the embodiment monitors the amount of hydrogen 308 remaining in the second gas storage tank (not visible, 142 in FIG. 9) and on the amount of pressurized oxygen 309 within the first gas storage tank (not visible, 141 in FIG. 9).

If, and when, the second gas storage tank (not visible, 142 in FIG. 9) runs out of hydrogen and is no longer able to vent any additional hydrogen to the external consumer of hydrogen 310, then the embodiment's control system determines whether or not additional hydrogen remains within another of the embodiment's gas storage tanks. With respect to the nominal operation of the embodiment illustrated in FIGS. 1-20, the embodiment's control system (not visible, 227 in FIG. 11) reconfigures the opening and closing of valves 311 so that hydrogen is thereafter vented from the third gas storage tank (not visible, 143 in FIG. 9).

If, and when, the first gas storage tank (not visible, 141 in FIG. 9) is no longer able to receive and store any additional pressurized oxygen from the external source of pressurized oxygen 312, then the embodiment's control system determines whether or not another of the embodiment's gas storage tanks can receive and store pressurized air (oxygen is nominally only stored in the first gas storage tank). With respect to the nominal operation of the embodiment illustrated in FIGS. 1-20, the embodiment's control system (not visible, 227 in FIG. 11) reconfigures the opening and closing of valves 313 so that pressurized air is thereafter pumped into and stored within the recently evacuated second gas storage tank (not visible, 142 in FIG. 9). Furthermore, the embodiment notifies the external source of pressurized air and/or oxygen, that it may now pump air rather than relatively pure oxygen.

As the embodiment's exchange of stored hydrogen for pressurized oxygen continues, the embodiment monitors the amount of hydrogen 314 that has been transferred to the external consumer of hydrogen, and it periodically compares that amount with the amount that has been specified for transfer (if any such upper limit has been specified, e.g., by the remote coordination computer). While the amount transferred is less than the amount specified for transfer, or when no limit has been placed on the amount to be transferred, then the embodiment continues to transfer hydrogen gas 307 to the external consumer of hydrogen, and it continues to receive pressurized air and/or oxygen with which to replace the transferred hydrogen gas, and with which to thereby maintain its preferred buoyancy.

When the embodiment has transferred all of its "available" hydrogen (i.e., holding in reserve an amount of hydrogen needed for its own electrical power generation needs) to the external consumer of hydrogen, and/or the embodiment is unable to store any additional pressurized oxygen and/or air, and/or the embodiment has transferred to the external consumer of hydrogen the amount of hydrogen specified, then 315 the embodiment stops venting pressurized hydrogen to the external consumer of hydrogen, and stops receiving and attempting to store additional pressurized substitute gases, e.g., oxygen and/or air.

After the transfer of hydrogen to the external consumer of hydrogen has ceased, the hydrogen-gas receiving hose connector 286 is disconnected from the hydrogen-gas discharge hose connector 284, and the pressurized-air discharge hose connector 289 is disconnected from the pressurized-air receiving hose connector 285. And, at this point, the embodiment is able to navigate to the location where (e.g., as specified by the remote coordination computer) external hydrogen gas producing and storage devices may be found, and from which the embodiment's store of hydrogen may be replenished. Also, at this point, the embodiment will tend to be configured as illustrated in FIG. 15, i.e., having its first gas storage tank (not visible, 141 in FIG. 9) filled with pressurized oxygen (not visible, 247 in FIG. 15), having its second gas storage tank (not visible, 142 in FIG. 9) largely, but not completely, filled with pressurized air (not visible, 248 in FIG. 15), and having its third gas storage tank (not visible, 143 in FIG. 9) partially filled with pressurized hydrogen gas (not visible, 250 in FIG. 15) which it will use for electrical power generation, e.g., for locomotion.

The following discussion of hydrogen transfer will reference labelled features illustrated and specified within FIGS. 9, 13, 19, and 20.

Any and all of the valves within the embodiment, e.g., 153-176, 292, and 295, that are not specified as being in an open configuration are closed.

At the beginning of a transfer of hydrogen to an external consumer of hydrogen, the embodiment will typically have a configuration such as that illustrated in FIG. 20, in which the first gas storage tank 141 contains a relatively small amount of pressurized oxygen 247, and in which the second gas storage tank 142 is largely, but not completely, filled with pressurized hydrogen gas 301, and in which the third gas storage tank 143 is completely filled with pressurized hydrogen gas 250.

A transfer of hydrogen begins with the embodiment's hydrogen-gas discharge hose connector 284 being fluidly connected to an external consumer of hydrogen via a hydrogen-gas receiving hose connector 286, and, fluidly therethrough, to a hydrogen-gas receiving hose 287 of the external consumer of hydrogen. The start of the transfer requires that the embodiment's pressurized-air receiving hose connector 285 is fluidly connected to an external supplier of pressurized oxygen via a pressurized-air discharge hose connector 289, and, fluidly therethrough, to a pressurized-air discharge hose 290. The start of the transfer also requires that the interiors of the first and second gas storage tanks are fluidly connected to the water (103 in FIG. 3) outside the embodiment's hydrogen storage vessel 101, e.g., so that as pressurized oxygen is pumped into an interior of the first gas storage tank 141, the water therein may be displaced and expelled from that tank, and so that as pressurized hydrogen is vented from the second gas storage tank 142 its pressure will not fall below that of the hydrostatic pressure of the ambient water (103 in FIG. 3).

In order to permit pressurized oxygen to flow into the embodiment's first gas storage tank 141, and in order to permit pressurized water to flow into, and replace, evacuated pressurized hydrogen gas, the embodiment's control system 227 opens valves 169-171 thereby fluidly connecting the interior of each of the first and second gas storage tanks with the water (103 in FIG. 3) outside the embodiment's hydrogen storage vessel 101.

When ready to transfer pressurized hydrogen from its second gas storage tank 142 to the external consumer of hydrogen (not shown), the embodiment's control system opens valves 292, and 161-163. The opening of these valves enables pressurized hydrogen gas 301 to flow from an interior of the embodiment's second gas storage tank 142, into and through the second tank hydrogen mouth 207, and therethrough into and through the open second tank hydrogen transmission valve 161, and therethrough into and through the fourth hydrogen transmission pipe 186, and therethrough into and through the open third tank hydrogen transmission valve 163, and therethrough into and through the third tank hydrogen transmission mouth 210, and therethrough into and through the interior of the third gas storage tank 143, and therethrough into and through the third tank hydrogen vent mouth 208, and therethrough into and through the open third tank hydrogen vent valve 162, and therethrough into and through the pressurized hydrogen junction pipe 187, and therethrough into and through the pressurized hydrogen supply pipe 112, and therethrough into and through the hydrogen-gas discharge feed pipe 293, and therethrough into and through the open hydrogen gas discharge valve 292, and therethrough into and through the hydrogen-gas discharge pipe 294, and therethrough into and through the hydrogen-gas discharge hose connector 284, and therethrough into and through the hydrogen-gas receiving hose connector 286, and therethrough into and through the hydrogen-gas receiving hose 287, and therethrough to the external consumer of hydrogen.

Because third tank water valve 167 is closed, water from outside the embodiment's hydrogen storage vessel 101 is unable to flow into and replace the hydrogen gas therein. Therefore, even though both the second 142 and third 143 gas storage tanks are fluidly connected to the external consumer of hydrogen, the hydrogen gas within the second gas storage tank is able to flow out of that gas storage tank and to the external consumer of hydrogen (because as it flows out of that gas storage tank it is quickly replaced by water from outside the hydrogen storage vessel thereby maintaining the pressure of that hydrogen gas), while the hydrogen gas within the third gas storage tank is unable to flow out of that gas storage tank without reducing its pressure. Thus, the interior of the third gas storage tank acts as a fluid channel and/or pipe through which hydrogen gas from the second gas storage tank flows out of the embodiment.

As hydrogen gas 301 flows out of the second gas storage tank 142, water from outside the hydrogen storage vessel 101 flows in through the third water exchange port 135, and therethrough into and through the open third exterior water transmission valve 170, and therethrough into and through the third water connector pipe 193, and therethrough into and through the open second tank water valve 169, and therethrough into and through the second tank water mouth 216, and therethrough into the interior of the second gas storage tank where it adds to the water 249 already there (if any).

When ready to transfer pressurized hydrogen from its second gas storage tank 142 to the external consumer of hydrogen (not shown), the embodiment maintains and/or stabilizes the buoyancy of its hydrogen storage vessel 101 by receiving pressurized oxygen that is pumped into its first gas storage tank 141 thereby replacing the volume of gas lost through the evacuation of hydrogen gas from the second gas storage tank 142. In order to permit pressurized oxygen to be pumped from the external source of pressurized oxygen and into the interior of the first gas storage tank, the embodiment's control system opens valves 295 and 159. (It is important to note that the second tank air transmission valve 160 remains closed during this inflow of pressurized oxygen, thereby preventing a mixing of the inflowing pressurized oxygen with the outflowing pressurized hydrogen.

The opening of valves 295 and 159 enables pressurized oxygen to flow from the external source of pressurized oxygen (not shown), through the pressurized-air discharge hose 290, and therethrough into and through the pressurized-air discharge hose connector 289, and therethrough into and through the pressurized-air receiving hose connector 285, and therethrough into and through the pressurized-air receiving pipe 296, and therethrough into and through the open pressurized-air inlet valve 295, and therethrough into and through the pressurized-air receiving feed pipe 297, and therethrough into and through the pressurized air ventilation pipe 110, and therethrough into and through the pressurized air junction pipe 185, and therethrough into and through the air vent bridging aperture 205, and therethrough into and through the air outflow pipe 184, and therethrough into and through the open oxygen outflow valve 159, and therethrough into and through the first tank air mouth 204, and therethrough into the interior of the first gas storage tank 141 where it increases the volume of the oxygen 247 already there (if any).

As pressurized oxygen 247 flows into the first gas storage tank 141, water 300 from inside the first gas storage tank flows into and through the first tank water mouth 217, and therethrough into and through the open first tank water valve 171, and therethrough into and through the fourth water connector pipe 194, and therethrough into and through the open third exterior water transmission valve 170, and therethrough into and through the third water exchange port 135, and therethrough into water (103 in FIG. 1) surrounding the hydrogen storage vessel 101.

The outflow of pressurized hydrogen from the second gas storage tank 142 continues until the second gas storage tank becomes filled water 249, having exhausted (and/or having transferred to the external consumer of hydrogen) its supply of hydrogen.

The inflow of inflow of pressurized oxygen 247 into the first gas storage tank 141, continues until the first gas storage tank becomes filled with oxygen, having displaced all water 300 therefrom.

At the end of the above described portion of the hydrogen transfer process and/or protocol, the embodiment will tend to have a configuration as illustrated in FIG. 19.

The following discussion of the second phase of the embodiment's hydrogen transfer protocol will reference labelled features illustrated and specified within FIGS. 9, 13, 15, 19, and 20. While the first phase of the embodiment's hydrogen transfer protocol tends to alter the configuration of the embodiment from that illustrated in FIG. 20, to that illustrated in FIG. 19, the second phase of the embodiment's hydrogen transfer protocol tends to alter the configuration of the embodiment from that illustrated in FIG. 19, to that illustrated in FIG. 15. Then, as illustrated in FIG. 14, as the embodiment collects and stores hydrogen from external hydrogen gas producing and storage devices, a first phase of that hydrogen acquisition protocol tends to alter the configuration of the embodiment from that illustrated in FIG. 15, to that illustrated in FIG. 19, and a second phase of the embodiment's hydrogen acquisition protocol tends to alter the configuration of the embodiment from that illustrated in FIG. 19, to that illustrated in FIG. 20.

As the embodiment cyclically gathers and stores hydrogen, and then transfers that stored hydrogen to hydrogen consumers, so too its configuration tends to cyclically change from that illustrated in FIG. 15, to that illustrated in FIG. 20, and then back again to that illustrated in FIG. 15.

Following the filling of the first gas storage tank 141 with oxygen 247, and the transfer of all of the hydrogen 301 from the second gas storage tank 142, if the amount of hydrogen specified for transfer (if any) has not yet been transferred to the external consumer of hydrogen, or, if in the absence of a specified amount of hydrogen to be transferred, if the embodiment still contains transferable hydrogen which it can yet transfer, then the hydrogen transfer process continues. However, pressurized air (not oxygen) will now be pumped into the second (now water-filled 249) gas storage tank (rather than into the first gas storage tank), and hydrogen 250 will now be vented from the third gas storage tank (rather than from the second gas storage tank).

During the execution of the second phase of the hydrogen transfer protocol, during which hydrogen is vented from the third gas storage tank 143, and pressurized air is pumped into the second gas storage tank 142, all of the valves within the embodiment, e.g., 153-176, 292, and 295, that are not specified as being in an open configuration are closed. In particular, the valves: 159, 161, 162, and 171, which were open during the first phase of the hydrogen transfer protocol, during which hydrogen was vented from the second gas storage tank, and pressurized oxygen was pumped into the first gas storage tank 141, are now closed. And, the valves 160 and 167, which were closed during the first phase of the hydrogen transfer protocol, are now opened.

At the start of, and/or the transition to, the second phase of the hydrogen transfer protocol, the embodiment's hydrogen-gas discharge hose connector 284 is still fluidly connected to the hydrogen-gas receiving hose 287 of the external consumer of hydrogen, and the embodiment's pressurized-air receiving hose connector 285 is still fluidly connected to the pressurized-air discharge hose 290 of the external source of pressurized air.

When ready to continuing transferring pressurized hydrogen to the external consumer of hydrogen (not shown), and, in particular, when ready to begin transferring pressurized hydrogen 250 from its third gas storage tank 143 to the external consumer of hydrogen, the embodiment's control system opens valves 292 and 162. The opening of these valves enables pressurized hydrogen gas 250 to flow from an interior of the embodiment's third gas storage tank, into and through the third tank hydrogen vent mouth 208, and therethrough into and through the open third tank hydrogen vent valve 162, and therethrough into and through the hydrogen vent bridging aperture 209, and therethrough into and through the pressurized hydrogen junction pipe 187, and therethrough into and through the pressurized hydrogen supply pipe 112, and therethrough into and through the hydrogen-gas discharge feed pipe 293, and therethrough into and through the open hydrogen gas discharge valve 292, and therethrough into and through the hydrogen-gas discharge pipe 294, and therethrough into and through the hydrogen-gas discharge hose connector 284, and therethrough into and through the hydrogen-gas receiving hose connector 286, and therethrough into the hydrogen-gas receiving hose 287, and therethrough to the external consumer of hydrogen.

As hydrogen 250 flows out of the third gas storage tank 143, water from outside the hydrogen storage vessel 101 flows in through the third water exchange port 135, and therethrough into and through the open third exterior water transmission valve 170, and therethrough into and through the third water connector pipe 193, and therethrough into and through the second water connector pipe 192, and therethrough into and through the first water connector pipe 190, and therethrough into and through the open third tank water valve 167, and therethrough into and through the third tank water mouth 214, and therethrough into the interior of the third gas storage tank where it creates, and then augments, a water reservoir 251.

The opening of valves 295 and 160 enables pressurized air to flow from the external source of pressurized air (not shown), through the pressurized-air discharge hose 290, and therethrough into and through the pressurized-air discharge hose connector 289, and therethrough into and through the pressurized-air receiving hose connector 285, and therethrough into and through the pressurized-air receiving pipe 296, and therethrough into and through the open pressurized-air inlet valve 295, and therethrough into and through the pressurized-air receiving feed pipe 297, and therethrough into and through the pressurized air ventilation pipe 110, and therethrough into and through the pressurized air junction pipe 185, and therethrough into and through the air vent bridging aperture 205, and therethrough into and through the air outflow pipe 184, and therethrough into and through the open second tank air transmission valve 160, and therethrough into and through the second tank air mouth 206, and therethrough into the interior of the second gas storage tank 142 where it creates, and then augments, a reservoir of pressurized air 248.

As pressurized air 248 flows into the second gas storage tank 142, water 249 from inside the second gas storage tank flows into and through the second tank water mouth 216, and therethrough into and through the open second tank water valve 169, and therethrough into and through the third water connector pipe 193, and therethrough into and through the open third exterior water transmission valve 170, and therethrough into and through the third water exchange port 135, and therethrough into water (103 in FIG. 1) surrounding the hydrogen storage vessel 101.

The outflow of pressurized hydrogen from the third gas storage tank 143 continues until only a portion (250 in FIG. 15) of the amount of hydrogen gas originally present within the third gas storage tank remains, with the portion remaining being determined by the embodiment's control system 227 to be sufficient to provide for the electrical power generation needs of the embodiment until such time as the embodiment gathers additional hydrogen from external hydrogen gas production and storage devices.

The inflow of inflow of pressurized air 248 into the second gas storage tank 142, continues until the second gas storage tank contains a volume of air equal to the volume of hydrogen vented from (and the volume of water 251 drawn into) the third gas storage tank 143.

At the end of the above described portion of the hydrogen transfer process and/or protocol, the embodiment will tend to have a configuration as illustrated in FIG. 15.

When the embodiment's control system 227 determines that buoyancy needs to be adjusted in order to raise the "front end" of the embodiment's hydrogen storage vessel 101, e.g., in order to reduce the depth of the yaw propeller housing 137, then the control system may add, to the extent possible, hydrogen gas into the forward trim tank 147, and it may remove hydrogen gas from the aft trim tank 148.

One way available to the control system to accomplish an addition of hydrogen gas to the forward trim tank is for it to open the third tank hydrogen transmission valve 163 and to open the forward trim tank gas inlet valve 155. At the same time, the control system opens the forward trim tank discharge valve 175 and opens the first exterior water transmission valve 173. The control system then energizes the bi-directional water pump 149 so as to draw water (if any) from the interior of the forward trim tank, and discharge that water into the water (103 in FIG. 1) outside the hydrogen storage vessel. The partial vacuum created within the forward trim tank due to the removal of water therefrom, causes hydrogen gas to be drawn from the interior of the third gas storage tank 143, through the fourth 186 and third 183 hydrogen transmission pipes, and into the forward trim tank.

One way available to the control system to accomplish a removal of hydrogen gas from the aft trim tank 148 is for it to open valves 176, 174, 172, and 166, so that the bi-directional water pump 149 can pump water (103 in FIG. 1) from outside the embodiment's hydrogen storage vessel 101, and/or from an interior of the pressure-resistant caching chamber 139, into an interior of the aft trim tank 148. The control system can also open valves 165 and 154 so that hydrogen gas pushed out of the aft trim tank, i.e., in response to the pumping of water into that aft trim tank, will be pushed into the pressure-resistant caching chamber, making that hydrogen gas available for storage within the second 142 and/or third 143 of the embodiment's gas storage tanks.

When the embodiment's control system 227 determines that buoyancy needs to be adjusted in order to lower the "front end" of the embodiment's hydrogen storage vessel 101, e.g., in order to increase the depth of the yaw propeller housing 137, then the control system may remove, to the extent possible, hydrogen gas from the forward trim tank 147, and it may add, to the extent possible, hydrogen gas to the aft trim tank 148. The process is similar to that explained above for the addition of hydrogen gas to the forward trim tank, and removal of hydrogen gas from the aft trim tank, and involves the selective opening of valves, and use of the bi-directional water pump 149 to drive the alteration of the volumes of gases within the forward and aft trim tanks.

One way available to the control system 227 to accomplish a removal of hydrogen gas from the forward trim tank 147 is for it to open the caching chamber water transmission valve 176, and open the first exterior water transmission valve 173. The control system can then energize the bi-directional water pump 149 so that it draws water from the interior of the pressure-resistant caching chamber 139, thereby creating a partial vacuum within the pressure-resistant caching chamber. The control system can then close those open valves, and open the hydrogen transfer valve 154, and the forward trim tank gas inlet valve 155. The control system can also then open the forward trim tank discharge valve 175 and the second exterior water transmission valve 174. This configuration of open valves allows the partial vacuum within the pressure-resistant caching chamber to draw hydrogen gas (if any) out of the forward trim tank, and to draw water (103 in FIG. 1) from outside the hydrogen storage vessel 101 into the forward trim tank to replace the removed hydrogen gas.

One way available to the control system 227 to accomplish an addition of hydrogen gas to the aft trim tank 148 involves two steps. The first step involves the control system opening the hydrogen transfer valve 154 and opening the third tank hydrogen transmission valve 163, thereby allowing hydrogen gas to flow from the third gas storage tank into the pressure-resistant caching chamber 139. The control system also opens the caching chamber water transmission valve 176, and opens the storage tank water valve 172, and opens the third tank water valve 167. Then when the control system energizes the bi-directional water pump 149 so that it draws water from the interior of the pressure-resistant caching chamber, that water is pumped into the third gas storage chamber 143, where it pressurizes the hydrogen gas therein, which then flows from the third gas storage tank 143 and into the pressure-resistant caching chamber. When an adequate amount of hydrogen gas has been transferred from the third gas storage tank and into the pressure-resistant caching chamber, the control system stops the bi-directional water pump and closes the opened valves.

The second step involves the control system opening the hydrogen transfer valve 154 and opening the aft trim tank gas inlet valve 165, thereby allowing hydrogen gas within the pressure-resistant caching chamber 139 to flow into the aft trim tank 148. The control system also opens the aft trim tank discharge valve 166, and opens the storage tank water valve 172, and opens the caching chamber water transmission valve 176. Then when the control system energizes the bi-directional water pump 149 so that it draws water from the interior of the aft trim tank 148, that water is pumped into the pressure-resistant caching chamber where it pressurizes the hydrogen gas therein, which then flows from the pressure-resistant caching chamber and into the aft trim tank. When the hydrogen gas has been transferred from the pressure-resistant caching chamber and into the aft trim tank, the control system stops the bi-directional water pump and closes the opened valves.

The control system 227 may release and/or vent any air or other gases trapped within the interior of the hydrogen storage vessel 101 into the body of water (103 in FIG. 1) outside the hydrogen storage vessel by opening an air purge valve 164.

Figure 22:
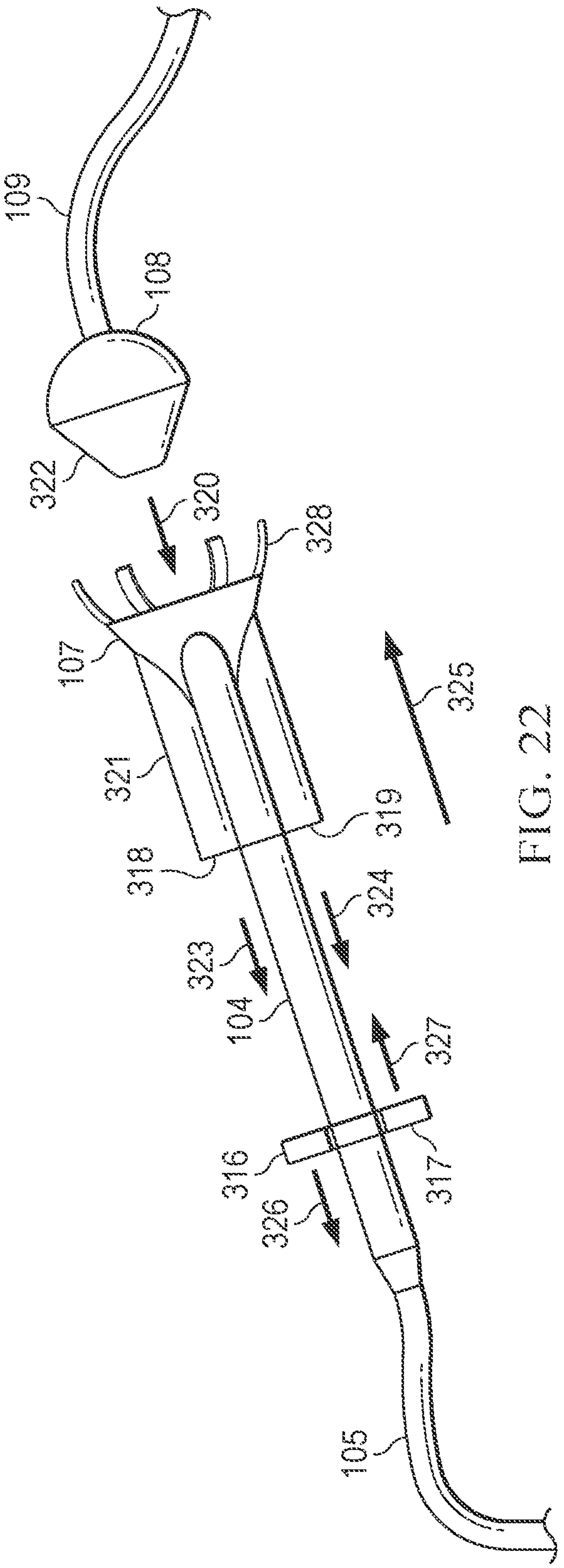
FIG. 22 is a closeup view of an ROV of the embodiment of FIG. 1.

FIG. 22 shows a closeup side view of the remotely-operated vehicle (ROV) 104 of the same embodiment of the present invention that is illustrated in FIGS. 1-21. The illustration in FIG. 22 shows the ROV configured to navigate and physically connect to a bobble gas exchange connector 108 that is fluidly connected to an external hydrogen gas production and/or storage apparatus (not shown).

An electrical cable, and a communications cable, are attached to, and/or embedded within, the gas transmission hose 105 which physically and fluidly connects the ROV and the embodiment's hydrogen storage vessel 101. That electrical cable transmits electrical power from the embodiment's fuel cell (not shown, 151 in FIG. 9) to the ROV and enables the ROV to energize any or all of its ROV thrusters, e.g., 316-319. The communications cable continues through an interior of the hydrogen storage vessel, and the continues up the spar buoy connection cable 119, and is then electrically connected to the control system 227 positioned within an interior of the spar buoy.

Four forward ROV thrusters, e.g., 318 and 319, suck 320 water from the front of the ROV into the ROV's "bobble" receiving port 107, and through the four cylindrical casings, e.g., 321, in which each respective forward ROV thruster's turbine (not visible) is positioned. This water sucking 320 action tends to help the ROV to draw the frustoconical guide head 322 into the ROV's "bobble" receiving port. The water sucked 320 from before the ROV is expelled and/or discharged at a rear end of each of the four forward ROV thrusters. The water expelled, e.g., 323 and 324, from and/or by the four forward ROV thrusters generates a thrust that tends to propel the ROV in a forward direction 325.

Four rear ROV thrusters, e.g., 316 and 317, are bi-directional, and through a combination of forward- and backward-directed thrusts, the rear ROV thrusters can turn and/or steer the ROV. As an example, when rear ROV thruster 316 expels 326 water toward the rear of the ROV, and rear ROV thruster 317 expels 327 water toward the front of the ROV, the resulting thrust would tend to turn the ROV in a clockwise direction (relative to the ROV orientation in the illustration of FIG. 22).

The embodiment's control system (not visible, 227 in FIG. 11) sends signals to the ROV control system (not shown) which complements the ROV's control of its steering and propulsion, and its homing and/or approach to the bobble gas exchange connector 108 of an external hydrogen gas production and/or storage apparatus (not shown). The ROV's control system sends to the embodiment's control system data related to the ROV's motions, orientation, and sensor outputs. An inertial measurement unit (IMU) (not shown) within the ROV transmits to the ROV control system data indicative of the speed, direction, and orientation, of the ROV.

Included within the ROV 104 is a hydrophone (not shown), which detects audio signals emitted by the kinds of bobble gas exchange connectors to which the embodiment is designed to connect. Also included with the ROV is an optical sensor (not shown), e.g., a camera, which detects optical signals emitted by the kinds of bobble gas exchange connectors to which the embodiment is designed to connect. The ROV may distinguish the audio and optical signals emitted by the kinds of bobble gas exchange connectors to which the embodiment is designed to connect, on the basis of the frequency of the sound and/or light emitted, on a pulse pattern, and/or on another distinguishable aspect, attribute, and/or feature of each or either respective signal.

As the ROV searches for, and approaches, a detected bobble gas exchange connector 108, a set of claw hooks, e.g., 328, which are radially arrayed about a forward perimeter of the ROV's "bobble" receiving port 107, are extended and/or rotated away from a longitudinal axis of the ROV thereby ensuring that they do not impede an entry of a targeted bobble gas exchange connector 108 into the "bobble" receiving port.

Figure 23:
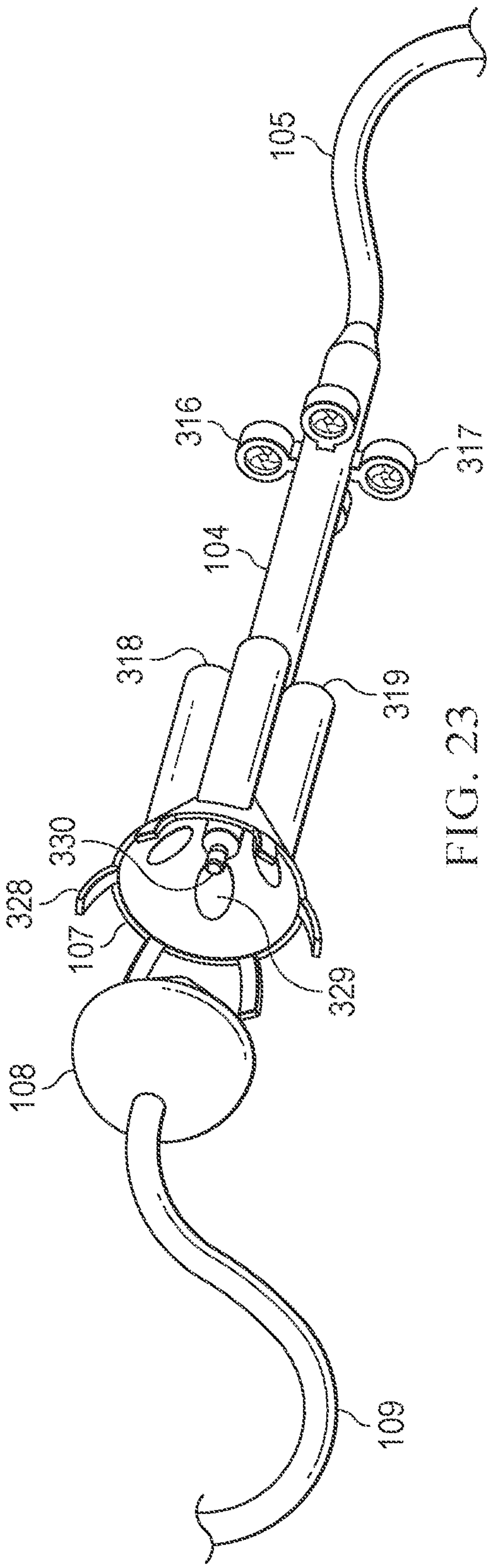
FIG. 23 is a perspective closeup view of an ROV of the embodiment of FIG. 1.

FIG. 23 shows a perspective side view of the same closeup side view of the remotely-operated vehicle (ROV) 104 that is illustrated in FIG. 22.

An forward thruster inlet aperture 329 of one of the ROV's four forward ROV thrusters, e.g., 318 and 319, is visible in the illustration of FIG. 23. A thruster turbine (not visible) within the respective forward thruster's cylindrical casing (not visible, e.g., 321 in FIG. 22) draws water in through the respective forward thruster inlet aperture, and expels that water through an opening and/or aperture at the other end of the respective forward thruster's cylindrical casing.

Visible within an interior of the ROV's "bobble" receiving port 107 is a gas receiving hose connector 330 which fluidly connects the embodiment's gas transmission hose 105 with the gas exchange hose 109 of an external hydrogen gas production and/or storage apparatus.

Figure 24:
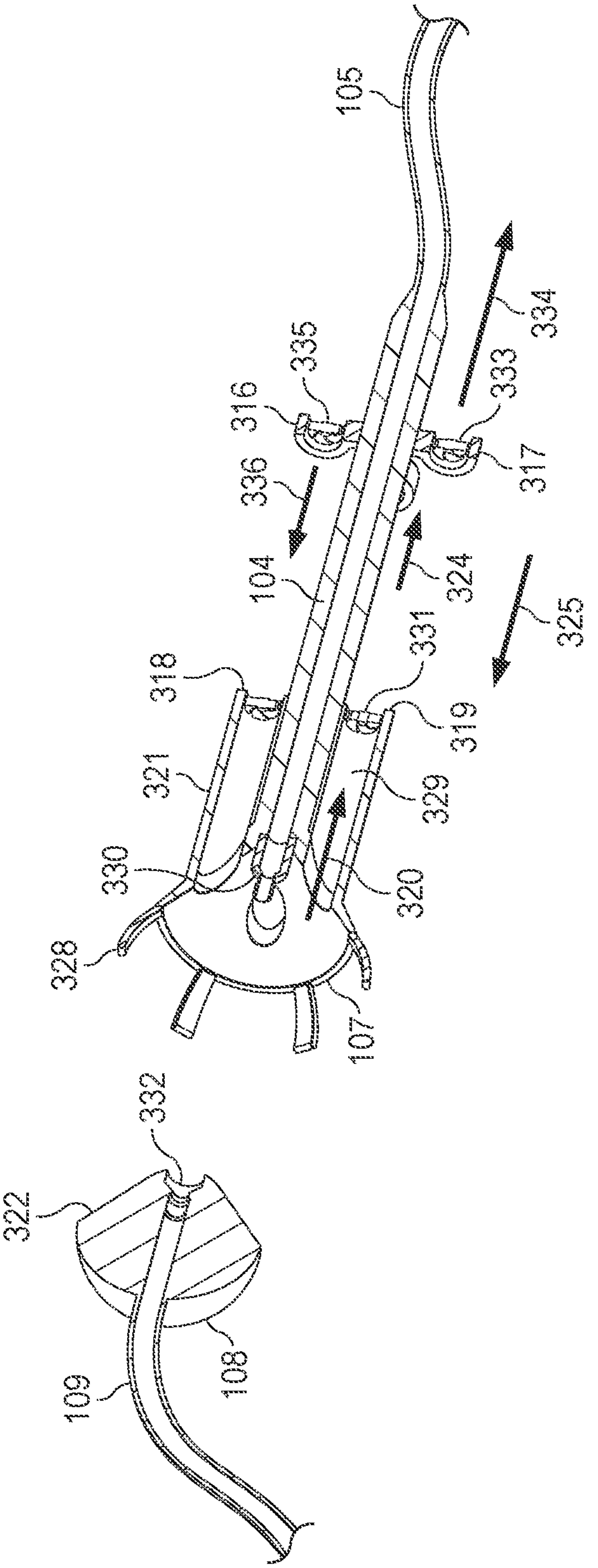
FIG. 24 is a perspective closeup sectional view of an ROV of the embodiment of FIG. 1.

FIG. 24 shows a perspective side sectional view of the remotely-operated vehicle (ROV) 104 that is illustrated in FIG. 23. The vertical section plane is taken a longitudinal axis of the ROV.

When the forward thruster turbine 331 rotates in response to its energization by the ROV's control system (not shown), it draws 320 in water through a forward thruster inlet aperture 329, and pumps that effluent 324 toward an aft and/or back end of the ROV (e.g., toward the rear ROV thrusters, e.g., 316 and 317) thereby tending to produce a thrust which propels the ROV in a forward direction 325. The water drawn 320 into and through the forward thruster inlet aperture 329 also tends to create a partial vacuum within the concave interior of the “bobble” receiving port 107, which tends to help draw the target bobble gas exchange connector 108 into that “bobble” receiving port thereby facilitating the ROV’s completion of a physical and fluid connection between the ROV’s gas receiving hose connector 330 and the gas exchange hose connector 332.

When a bi-directional rear thruster turbine, e.g., 333 of rear thruster 316, rotates in a first direction in response to its energization by the ROV’s control system (not shown), it expels 334 water in a backward direction thereby producing forward thrust, e.g., adding to the forward thrust (if any) produced by the ROV’s four forward ROV thrusters, e.g., 318 and 319. By contrast, when the ROV’s control system energizes a rear thruster turbine, e.g., 335 of rear thruster 317, in a second and/or opposite direction of rotation, the rear thruster expels 336 water in a forward direction thereby producing backward thrust, e.g., countering and/or opposing the forward thrust (if any) produced by the ROV’s four forward ROV thrusters. Through bi-directional rotations of the individual rear thrusters, the ROV’s control system is able to turn, and/or steer, the ROV thereby enabling the ROV to approach and make contact with a target bobble gas exchange connector 108.

Figure 25:
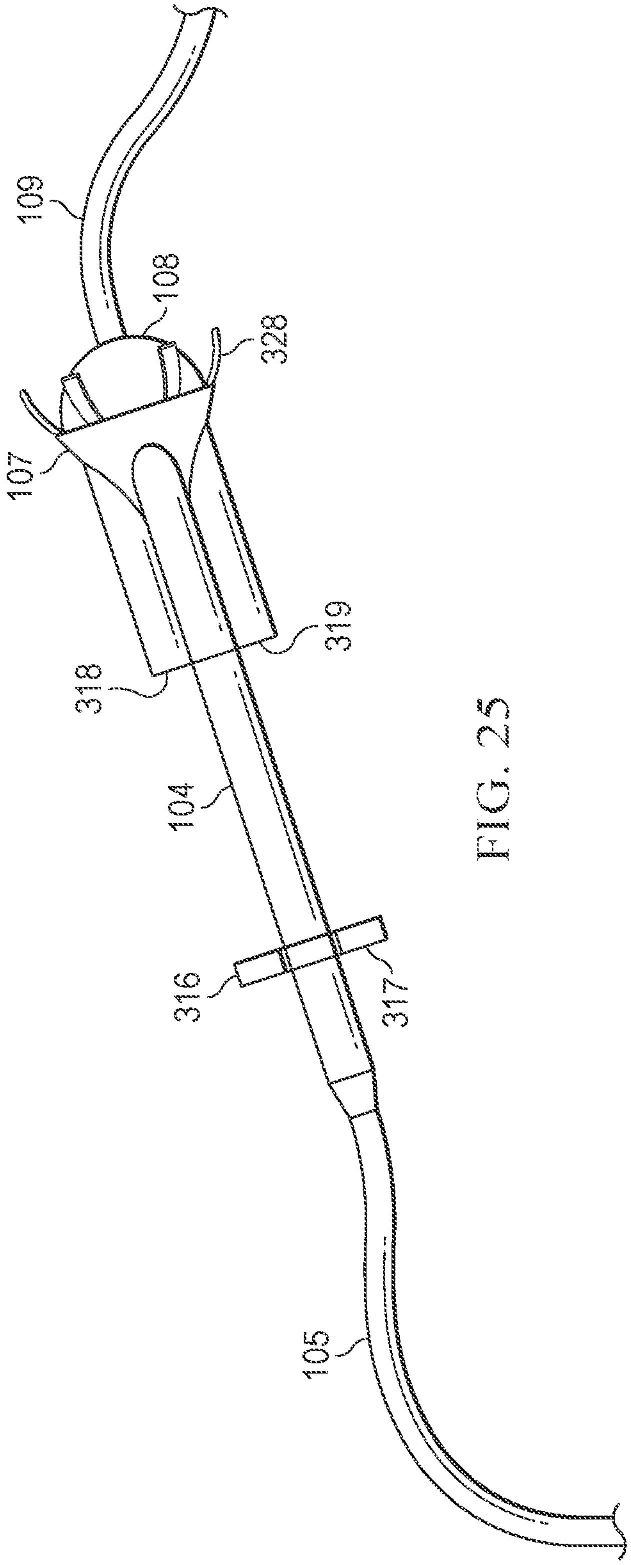
FIG. 25 is a closeup view of an ROV of the embodiment of FIG. 1.

FIG. 25 shows a side view of the same closeup side view of the remotely-operated vehicle (ROV) 104 that is illustrated in FIGS. 22-24.

FIG. 25 shows the ROV configured immediately after it has successfully navigated to the target bobble gas exchange connector 108, and made physical contact with, and loosely secured, that bobble gas exchange connector. The suction created by the four forward ROV thrusters, e.g., 318 and 319, resulting from their pull of water from the concave interior of the ROV’s “bobble” receiving port 107, holds the bobble gas exchange connector within the concave interior of the “bobble” receiving port.

After this initial moment of contact between the ROV’s “bobble” receiving port 107 and the bobble gas exchange connector 108, the ROV’s claw hooks, e.g., 328, are still extended outward away from the bobble gas exchange connector, as they were during the ROV’s navigation, and approach, to the target bobble gas exchange connector. At this point in the ROV connection operation, the claw hooks are not yet closed around the bobble gas exchange connector, so as to better secure it within the ROV’s “bobble” receiving port, and the linkage of the ROV’s “bobble” receiving port and the bobble gas exchange connector is dependent upon the suction, within the ROV’s concave “bobble” receiving port, produced by the four forward ROV thrusters, e.g., 318 and 319.

At this point, the male gas receiving hose connector (not visible, 330 in FIG. 24) of the ROV has connected with, and locked itself into position within, the female gas exchange hose connector 332 (not visible, 332 in FIG. 24), thereby creating a fluid connection between the external hydrogen gas production and/or storage apparatus (not shown), via its gas exchange hose 109, and the embodiment’s hydrogen storage vessel 101, via its gas transmission hose 105.

Figure 26:
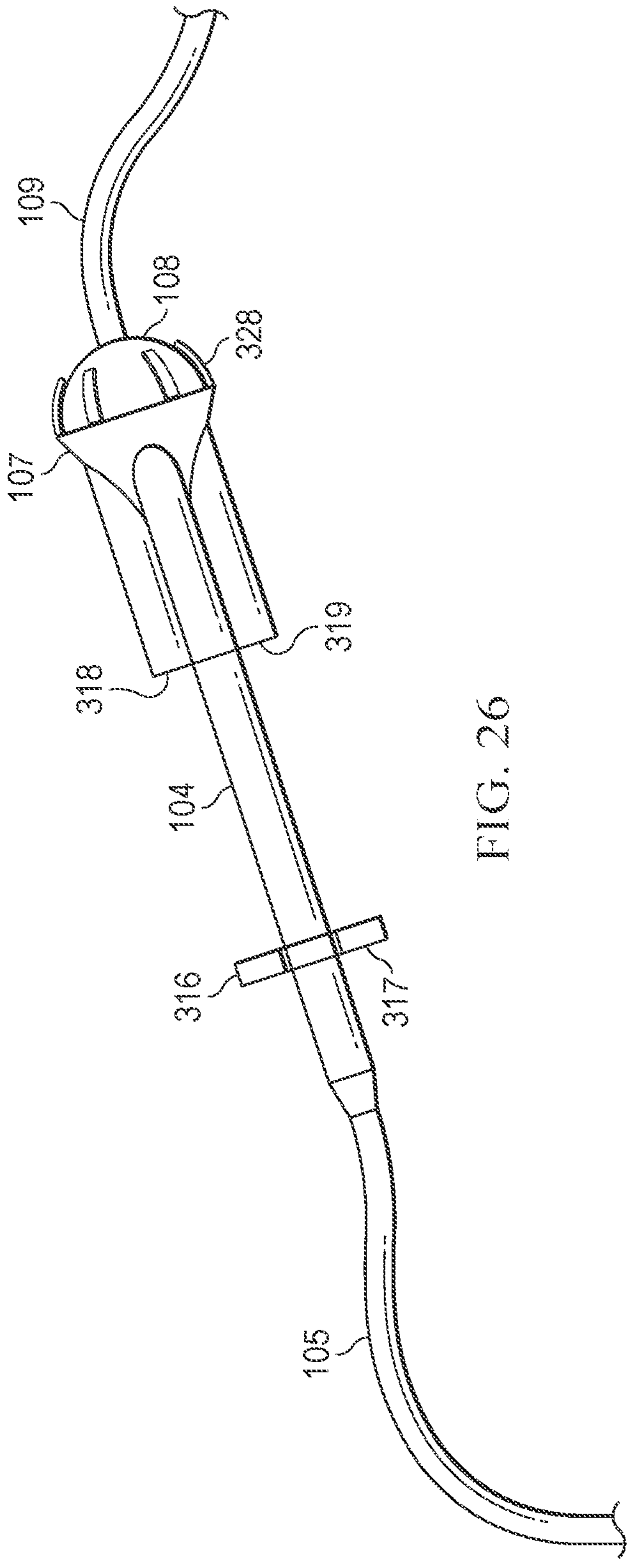
FIG. 26 is a closeup view of an ROV of the embodiment of FIG. 1.

FIG. 26 shows a side view of the same closeup side view of the remotely-operated vehicle (ROV) 104 that is illustrated in FIGS. 22-25.

FIG. 26 shows the ROV configured shortly after it has made physical contact with, and secured within the concave interior of its “bobble” receiving port 107, the bobble gas exchange connector 108. The configuration illustrated in FIG. 26 is the configuration that would immediately follow the configuration illustrated in FIG. 25.

In order to better secure the bobble gas exchange connector within its “bobble” receiving port, the ROV has rotated its claw hooks, e.g., 328, inwardly, thereby closing in, clamping down, and/or locking in, the bobble gas exchange connector within the cavity of the ROV’s “bobble” receiving port.

Figure 27:
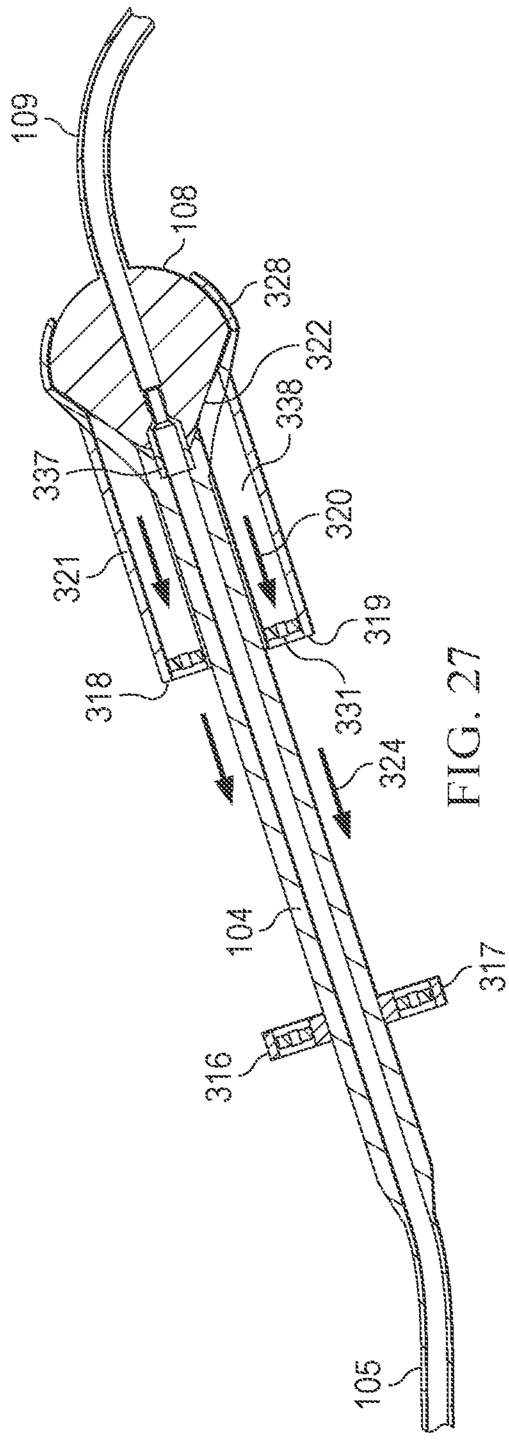
FIG. 27 is a perspective closeup sectional view of an ROV of the embodiment of FIG. 1.

FIG. 27 shows a side sectional view of the remotely-operated vehicle (ROV) 104 as it is configured in the illustration of FIG. 26. The vertical section plane is taken a longitudinal axis of the ROV.

The frustoconical guide head 322 of the bobble gas exchange connector 108, which is positioned at an end of, and fluidly connected to, the gas exchange hose 109 which, in turn, is fluidly connected to an external hydrogen gas production and/or storage apparatus (not shown), is positioned within the “bobble” receiving port 107 of the embodiment’s ROV 104. In the configuration illustrated in FIG. 27, the claw hooks, e.g., 328, of the ROV are rotating inwardly, toward the center of the “bobble” receiving port such that they exert a force on the far side of the bobble gas exchange connector that tends to push the frustoconical guide head of the bobble gas exchange connector tightly into the “bobble” receiving port 107, securely holding the bobble gas exchange connector within and against the concave interior of the “bobble” receiving port.

In this configuration, as was true of the configuration illustrated in FIGS. 25 and 26, the gas receiving hose connector 330 of the ROV 104, and the gas exchange hose connector 332 of the bobble gas exchange connector 108, are interconnected 337 thereby creating a fluid connection between the gas exchange hose 109 of the external hydrogen gas production and/or storage apparatus (not shown) and the gas transmission hose 105 of the embodiment.

A continued energization of the four forward ROV thrusters, e.g., 318 and 319, and the continued rotation of the turbines, e.g., 331, thereof, will continue to draw, e.g., 320, water from, and/or reduce the pressure of water within, the interior channels, e.g., 338, within the respective four cylindrical casings, e.g., 321. The continued energization of the four forward ROV thrusters will add to the positional security, and connection stability, of the bobble gas exchange connector 108 with the “bobble” receiving port 107 of the ROV.

Figure 28:
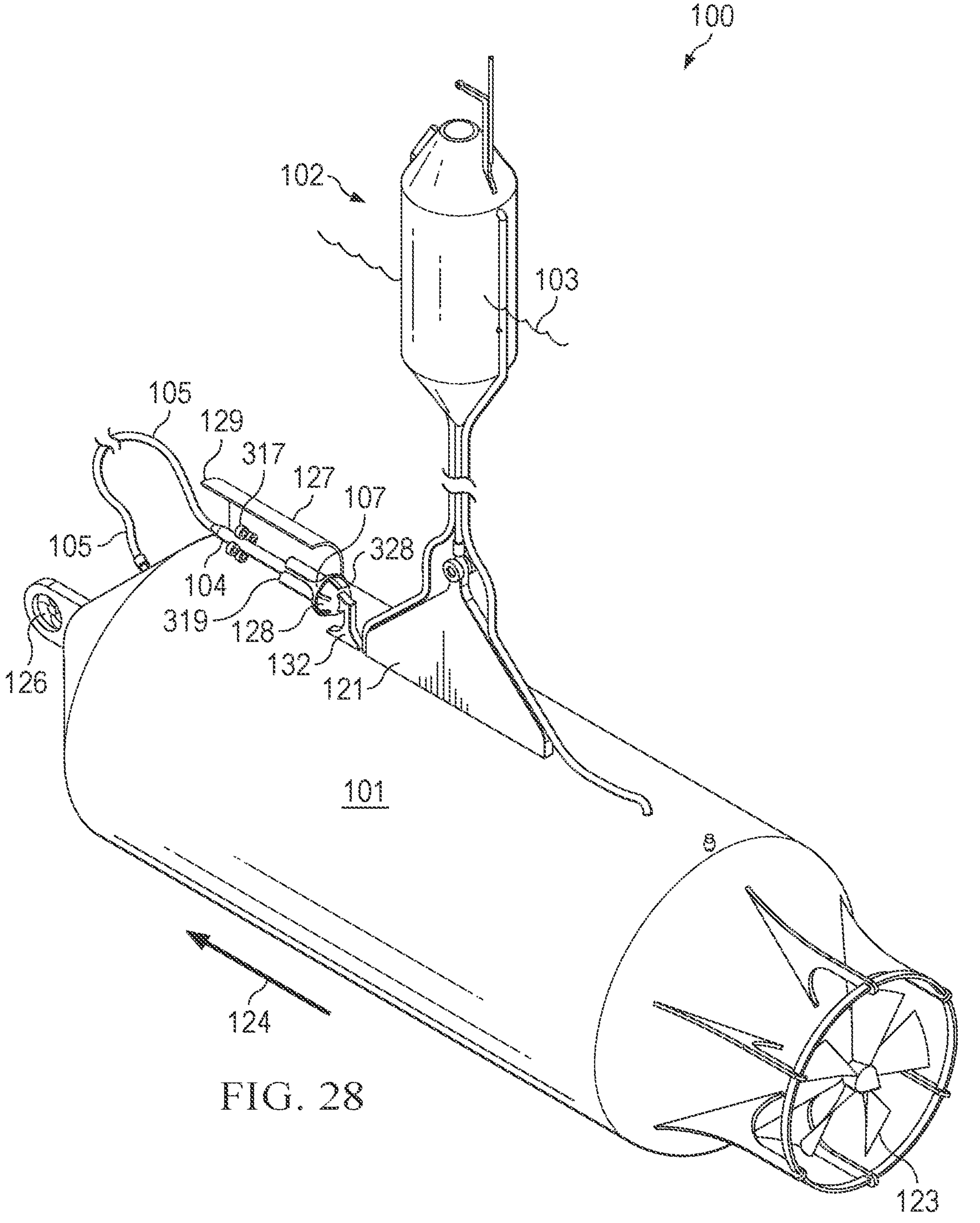
FIG. 28 is a perspective side view of the embodiment of FIG. 1.

FIG. 28 shows a side perspective view of the same first embodiment 100 of the present invention that is illustrated in FIGS. 1-27. The ROV awning 127 has been vertically sectioned in order to better expose the ROV secured within that awning, and the section plane is taken along section line 9-9 of FIGS. 7 and 8. The rest of the embodiment has not been sectioned.

The embodiment illustrated in FIG. 27 is configured in a way that facilitates the cruising 124, movement, travel, navigation, propulsion, and/or translation, of the embodiment, e.g., when its primary propeller 123 is energized in order to produce a forward thrust, and its yaw propeller 126 is energized when needed to set, control, alter, and/or adjust, an azimuthal orientation of the embodiment.

The embodiment’s control system (not visible, 227 in FIG. 11) has transmitted signals to the remotely-operated vehicle (ROV) 104 instructing it, if not guiding it, to dock with the ROV anchor bobble 128, after which the ROV closes its claw hooks, e.g., 328, around the ROV anchor bobble to secure itself and lock its position within the ROV awning 127.

Following its arrival, near, adjacent, and/or proximal, to an external hydrogen gas production and/or storage apparatus (not shown), and following the cessation of the embodiment's propulsion by its primary propeller 123, the embodiment's control system (not visible, 227 in FIG. 11) will signal to the ROV to retract its claw hooks, e.g., 328, and energize its rear thrusters, e.g., 317, so as to produce a backward thrust, and thereby detach itself from the ROV anchor bobble 128. The control system will then signal to the ROV to back itself out from under the ROV awning 127, passing backward through the forward mouth 129 and/or aperture of the ROV awning, until it is free of the ROV awning, after which the ROV will seek out the bobble gas exchange connector 108 of the external hydrogen gas production and/or storage apparatus and thereto connect in order to offload hydrogen from the external hydrogen gas production and/or storage apparatus.

Figure 29:
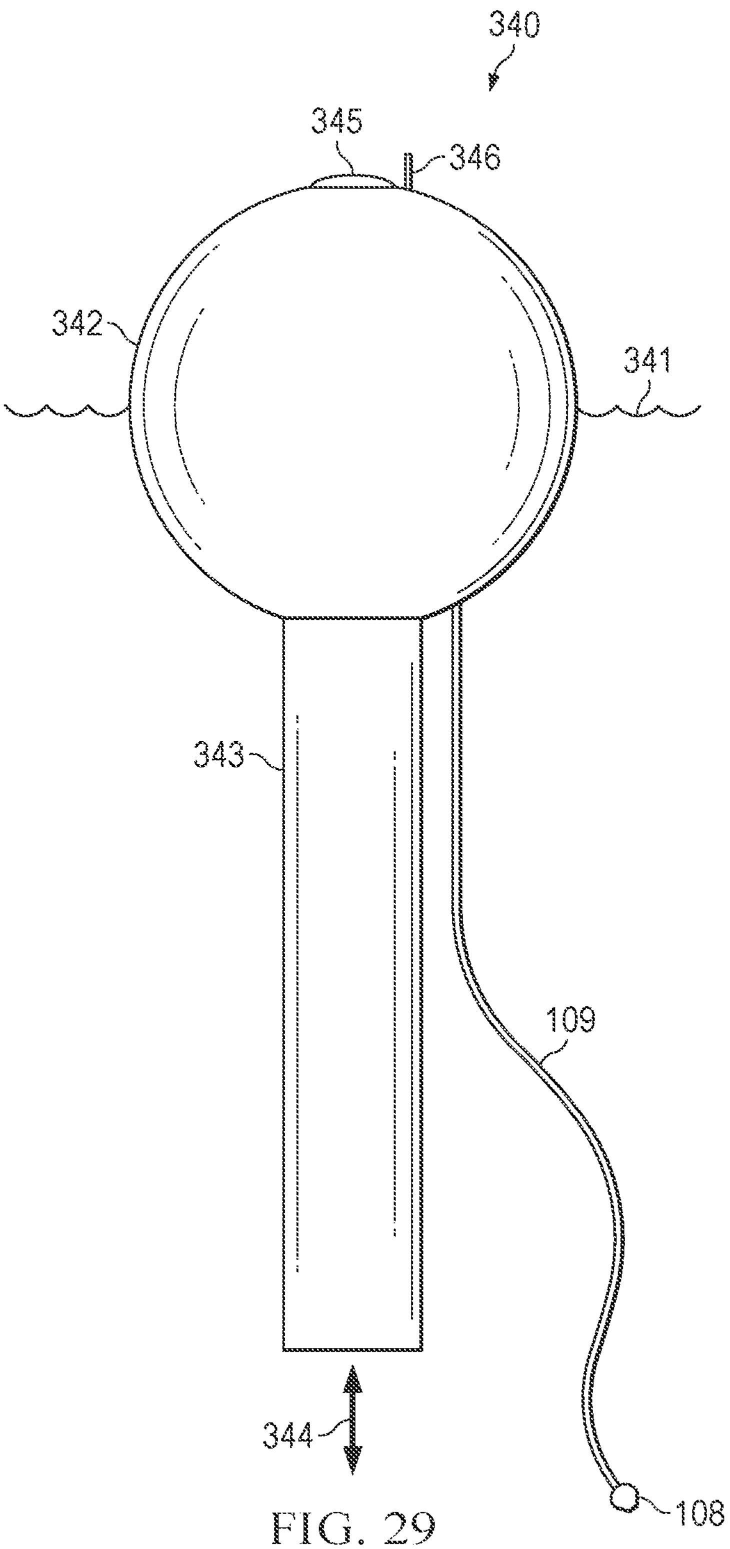
FIG. 29 is a side view of an external wave-energy hydrogen gas production and/or storage apparatus from which an embodiment of the present disclosure receives hydrogen gas.

FIG. 29 shows a side view of an external hydrogen gas production and/or storage device 340 and/or apparatus that floats adjacent to an upper surface 341 of a body of water over which waves travel. The device comprises an upper hollow buoyant buoy 342 from which depends a central depending tube 343. When moved up and down by waves, water within the central depending tube moves up and down, with water at a lower mouth of the tube moving 344 in and out of the lower mouth.

The device 340 is adapted and configured to produce hydrogen gas by electrolysis of water, wherein the electrolyzer is energized with electrical power created through a conversion of wave energy into electricity.

After an embodiment of the present disclosure (not visible), such as the embodiment 100 illustrated in FIGS. 1-28, approaches the hydrogen gas production and/or storage device 340, and attaches and/or connects the "bobble" receiving port (not visible, 107 in FIGS. 1-8) of its ROV to the bobble gas exchange connector 108 of the hydrogen gas production and/or storage device, the embodiment requests that the hydrogen gas production and/or storage device begin a transfer of its store of hydrogen gas to the embodiment.

The embodiment transmits, from, and/or via, its satellite communications antenna (not visible, 118 in FIG. 1-8) and/or its radio antenna (not visible, 114 in FIGS. 1-8), a signal, requesting the initiation of a hydrogen gas transfer, to the hydrogen gas production and/or storage device 340. The hydrogen gas production and/or storage device detects the embodiment's signal from, and/or via, its own satellite communications antenna 345 and/or its own radio antenna 346. Upon receipt of the "begin-transfer" signal, the hydrogen gas production and/or storage device opens a set of valves that results in a fluid connection between its store of hydrogen gas and its gas exchange hose 109.

The embodiment receives hydrogen gas from the hydrogen gas production and/or storage device until the embodiment's gas storage tanks are filled with hydrogen gas to their maximum extent, and/or until the hydrogen gas production and/or storage device's supply and/or store of hydrogen gas is exhausted.

Figure 30:
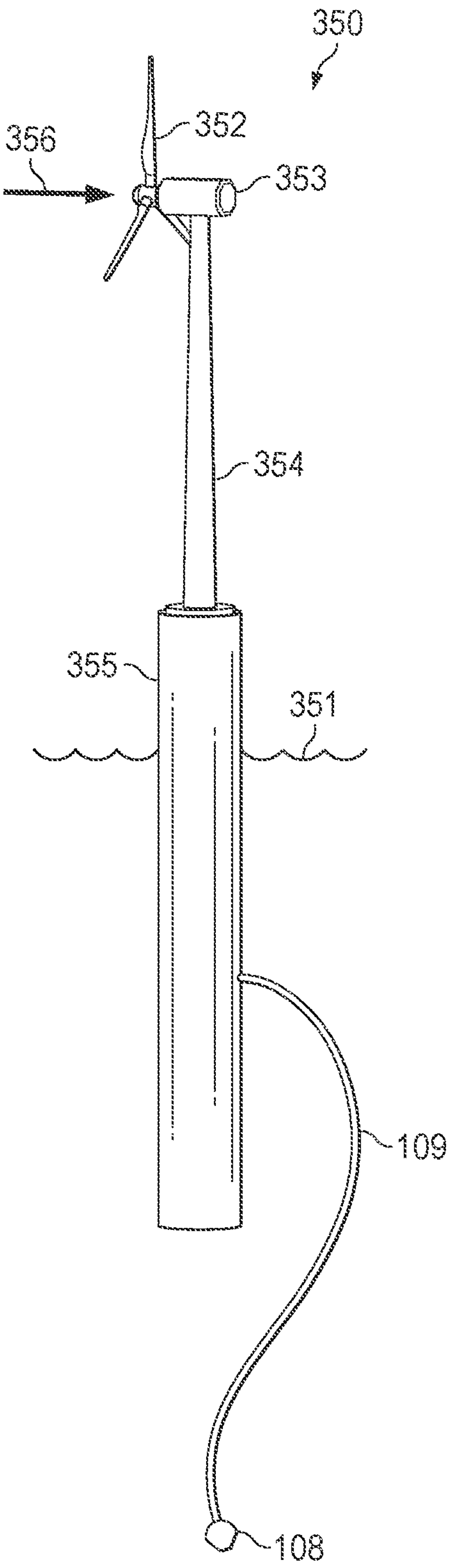
FIG. 30 is a side view of an external wind-energy hydrogen gas production and/or storage apparatus from which an embodiment of the present disclosure receives hydrogen gas.

FIG. 30 shows a perspective side view of an external hydrogen gas production and/or storage device 350 and/or apparatus that floats adjacent to an upper surface 351 of a body of water. The device comprises wind turbine 352 and 353 mounted atop a tower 354 and/or strut which is itself mounted atop a buoyant spar buoy 355 which floats within the body of water 351. When wind blows 356 at the wind turbine, it causes the wind turbine's plurality of turbine blades, e.g., 352, to rotate which energizes the wind turbines generator (not visible, but inside the wind turbine's nacelle 353).

The hydrogen gas production and/or storage device 350 utilizes a portion of the electrical power produced by its wind turbine to energize an electrolyzer which electrolyzes water to produce hydrogen gas which it stores (not shown) within its spar buoy 355. Embedded atop the wind turbine's nacelle 353 is a satellite communications antenna (not shown), and attached to an exterior side of the tower 354 is a radio antenna (not shown).

After an embodiment of the present disclosure (not visible), such as the embodiment 100 illustrated in FIGS. 1-28, approaches the hydrogen gas production and/or storage device 350, and attaches and/or connects the "bobble" receiving port (not visible, 107 in FIGS. 1-8) of its ROV to the bobble gas exchange connector 108 of the hydrogen gas production and/or storage device, the embodiment requests that the hydrogen gas production and/or storage device begin a transfer of its store of hydrogen gas to the embodiment.

An embodiment of the present disclosure contains a gas storage compartment and/or tank adapted and/or configured to receive, store, and discharge carbon dioxide, as well as a gas storage compartment and/or tank adapted and/or configured to receive, store, and discharge methanol. The embodiment contains an apparatus that consumes a portion of its stored hydrogen in order to produce electrical power which it uses to energize and operate a mechanism, module, and/or system, that converts a portion of its received and stored hydrogen, as well as a portion of its stored carbon dioxide, into methanol which it stores in its methanol storage compartment. The embodiment subsequently discharges the methanol to a methanol receiving structure, mechanism, vessel, and/or buoy. The methanol receiving structure, mechanism, and/or vessel may be located on land. The methanol receiving structure, mechanism, vessel, and/or buoy, may be located at, on, adjacent to, or under, the body of water on which the embodiment floats.

Similarly, other embodiments of the present disclosure may contain gas storage compartments adapted and/or configured to receive, store, and discharge any precursor chemical (whether gaseous, liquid, particulate, slurry, or solid), as well as contain gas storage compartments adapted and/or configured to receive, store, and discharge any chemical product. Such embodiments may consume a portion of their stored hydrogen in order to provide and/or generate energy that may be used to operate a mechanism, module, and/or system, that will converts a portion of its received and stored hydrogen, into a chemical product (e.g., a fuel) which it may then store in its chemical-product storage compartment, and which it may subsequently deliver to a chemical-product receiving structure, mechanism, vessel, and/or buoy.

The embodiment transmits, from, and/or via, its satellite communications antenna (not visible, 118 in FIG. 1-8) and/or its radio antenna (not visible, 114 in FIGS. 1-8), a signal, requesting the initiation of a hydrogen gas transfer, to the hydrogen gas production and/or storage device 350. The hydrogen gas production and/or storage device detects the embodiment's signal from, and/or via, its own satellite communications antenna (not shown) and/or its own radio antenna (not shown). Upon receipt of the "begin-transfer" signal, the hydrogen gas production and/or storage device opens a set of valves that results in a fluid connection between its store of hydrogen gas and its gas exchange hose 109.

The embodiment receives hydrogen gas from the hydrogen gas production and/or storage device until the embodiment's gas storage tanks are filled with hydrogen gas to their maximum extent, and/or until the hydrogen gas production and/or storage device's supply and/or store of hydrogen gas is exhausted.

We claim:

1. A gas conveyance apparatus, comprising:
- a gas storage vessel adapted to submerge below a surface of a body of water, comprising:
  - a plurality of gas storage tanks;
  - a chamber;
  - a lower gas receiving valve fluidly connected to the chamber by a gas receiving hose;
  - a plurality of gas transfer pipes which fluidly connect the gas storage tanks, the chamber, and the body of water; and
  - a plurality of gas transfer valves which regulate a flow of gas and water through the gas transfer pipes;
- a buoy adapted to float adjacent to an upper surface of the body of water, comprising:
  - an upper gas receiving valve fluidly connected to the gas storage tanks; and
  - a gas discharge valve fluid connected to the gas storage tanks; and
- a connector coupled to the buoy and to the gas storage vessel, said connector adapted to suspend the gas storage vessel from the buoy, comprising:
  - a gas discharge channel fluidly connecting the gas storage tanks of the gas storage vessel to the gas discharge valve of the buoy; and
  - a gas receiving channel fluidly connecting the gas storage tanks of the gas storage vessel to the upper gas receiving valve of the buoy.

2. The gas conveyance apparatus of claim 1, further comprising an electrically-powered propeller on the gas storage vessel adapted to produce a thrust parallel to a longitudinal axis of the gas storage vessel.

3. The gas conveyance apparatus of claim 1, further comprising an electrically-powered propeller on the gas storage vessel adapted to produce a thrust normal to a longitudinal axis of the gas storage vessel.

4. The gas conveyance apparatus of claim 1, further comprising a lower-gas-receiving-valve conveyance vehicle comprising at least one thruster and adapted to reposition the lower gas receiving valve.

5. The gas conveyance apparatus of claim 1, further comprising a control system configured to open and close the upper and lower gas receiving valves, the gas transfer valves, and the gas discharge valve.

6. The gas conveyance apparatus of claim 5, wherein the control system is configured to open the lower gas receiving valve when said lower gas receiving valve is connected to a source of gas.

7. The gas conveyance apparatus of claim 5, wherein the chamber comprises a pressure-resistant caching gas chamber having a greater burst pressure limit compared to a burst pressure limit of any of said gas storage tanks, said pressure-resistant caching gas chamber fluidly connected to a water pump.

8. The gas conveyance apparatus of claim 7, wherein the control system is configured to activate the water pump to transfer water from the pressure-resistant caching gas chamber to the body of water, and to draw gas from the lower gas receiving valve into the pressure-resistant caching gas chamber.

9. The gas conveyance apparatus of claim 7, wherein the control system is configured to activate the water pump to transfer the water from the body of water to the pressure-resistant caching gas chamber, and to push the gas from the pressure-resistant caching gas chamber into a selected one of said plurality of gas storage tanks.

10. The gas conveyance apparatus of claim 1, wherein the gas is one of hydrogen, air, nitrogen, carbon dioxide, ammonia, and methane.

11. The gas conveyance apparatus of claim 4, wherein the lower-gas-receiving-valve conveyance vehicle is one of a remotely-operated vehicle, and an autonomous underwater vessel.

12. The gas conveyance apparatus of claim 4, further comprising a housing for storing the lower-gas-receiving-valve conveyance vehicle.

13. The gas conveyance apparatus of claim 4, wherein the lower-gas-receiving-valve conveyance vehicle comprises a bobble receiving port.

14. The gas conveyance apparatus of claim 1, further comprising a fuel cell, the fuel cell configured to convert hydrogen and oxygen into electrical power and water.

15. The gas conveyance apparatus of claim 1, wherein the gas storage vessel has an elongate shape with a horizontal length greater than a vertical height.

16. The gas conveyance apparatus of claim 1, wherein the buoy has a tubular shape with a vertical height greater than a horizontal width.

17. The gas conveyance apparatus of claim 1, wherein the buoy is a spar buoy.

18. The gas conveyance apparatus of claim 1, wherein the buoy comprises a communications module.

19. The gas conveyance apparatus of claim 1, wherein the connector is selected from a cable, a chain, a wire, a linkage, and a rope.

20. The gas conveyance apparatus of claim 7, wherein the pressure-resistant caching gas chamber has a wall having a thickness greater than a wall of each one of the plurality of gas storage tanks.

21. The gas conveyance apparatus of claim 7, wherein the pressure-resistant caching gas chamber has a wall comprising a material different from a material of a wall of each one of the plurality of gas storage tanks.

* * * * *